United States Patent
Ogata

(10) Patent No.: US 9,851,894 B2
(45) Date of Patent: Dec. 26, 2017

(54) DISPLAY CONTROL DEVICE, DISPLAY CONTROL METHOD, AND PROGRAM

(75) Inventor: Tetsuji Ogata, Tokyo (JP)

(73) Assignee: Sony Corporation, Tokyo (JP)

( * ) Notice: Subject to any disclaimer, the term of this patent is extended or adjusted under 35 U.S.C. 154(b) by 791 days.

(21) Appl. No.: 13/514,330

(22) PCT Filed: Dec. 8, 2010

(86) PCT No.: PCT/JP2010/071959
§ 371 (c)(1),
(2), (4) Date: Jun. 7, 2012

(87) PCT Pub. No.: WO2011/074446
PCT Pub. Date: Jun. 23, 2011

(65) Prior Publication Data
US 2012/0236027 A1    Sep. 20, 2012

(30) Foreign Application Priority Data

Dec. 16, 2009   (JP) ................................. 2009-284758

(51) Int. Cl.
  *G09G 5/00* (2006.01)
  *G06F 3/0488* (2013.01)
  (Continued)

(52) U.S. Cl.
  CPC ...... *G06F 3/04883* (2013.01); *A63B 69/3623* (2013.01); *G09G 5/14* (2013.01);
  (Continued)

(58) Field of Classification Search
  CPC ..... G06F 3/04883; H04N 5/2625; G09G 5/14
  See application file for complete search history.

(56) References Cited

U.S. PATENT DOCUMENTS

2002/0181741 A1    12/2002  Masukura et al.
2004/0125115 A1*    7/2004  Takeshima et al. .......... 345/634
(Continued)

FOREIGN PATENT DOCUMENTS

CN    101441882 A    5/2009
CN    201266371 Y    7/2009
(Continued)

*Primary Examiner* — Tapas Mazumder
(74) *Attorney, Agent, or Firm* — Wolf, Greenfield & Sacks, P.C.

(57) ABSTRACT

The present invention relates to a display control device, a display control method, and a program, enabling realization of various playing display using frame images subjected to compositing processing as a motion transition image.

A recording medium has recorded therein, as a series of recording frame image data, each of composited image data generated by sequentially performing image compositing processing for each input of frame image data, each of composited image data being enabled of moving image display in which a moving subject image in each frame image data is sequentially placed so as to be arrayed in a predetermined direction, with each recording frame image data being playable. In accordance with operation of an operation input unit such as a touch panel, a frame position to be played is determined out of the series of recording frame image data, and playing of the recording frame image data at the determined frame position is executed. Thus, a scene which the user desires to view out of the motion transition image can be easily viewed.

13 Claims, 35 Drawing Sheets

(51) Int. Cl.
*G09G 5/14* (2006.01)
*H04N 5/232* (2006.01)
*H04N 5/262* (2006.01)
*H04N 5/783* (2006.01)
*H04N 21/472* (2011.01)
*H04N 21/854* (2011.01)
*G11B 27/034* (2006.01)
*G11B 27/34* (2006.01)
*A63B 69/36* (2006.01)

(52) U.S. Cl.
CPC ............ *G11B 27/034* (2013.01); *G11B 27/34* (2013.01); *H04N 5/23293* (2013.01); *H04N 5/2625* (2013.01); *H04N 5/783* (2013.01); *H04N 21/47217* (2013.01); *H04N 21/854* (2013.01); *G09G 2340/10* (2013.01)

(56) References Cited

U.S. PATENT DOCUMENTS

| | | |
|---|---|---|
| 2005/0216839 A1 | 9/2005 | Salvucci |
| 2006/0209087 A1 | 9/2006 | Takeshima et al. |
| 2007/0003214 A1 | 1/2007 | Toyoda et al. |
| 2008/0152298 A1 | 6/2008 | Ubillos |
| 2010/0022276 A1* | 1/2010 | Park et al. .................. 455/566 |
| 2010/0039447 A1 | 2/2010 | Nakao |
| 2013/0222421 A1 | 8/2013 | Otsuka |
| 2013/0321459 A1 | 12/2013 | Hayakawa et al. |

FOREIGN PATENT DOCUMENTS

| | | |
|---|---|---|
| JP | 2000-187478 A | 7/2000 |
| JP | 2003-304444 A | 10/2003 |
| JP | 2008-187678 A | 8/2008 |
| JP | 2010-045727 A | 2/2010 |
| WO | WO 2008/083360 A1 | 7/2008 |

* cited by examiner

FINAL FRAME OF MOTION TRANSITORY IMAGE

DISPLAY CONTROL DEVICE, DISPLAY CONTROL METHOD, AND PROGRAM

TECHNICAL FIELD

The present invention relates to a display control device, a display control method, and a program, and particularly relates to technology for displaying an image expressing motion transition of a subject.

BACKGROUND ART

A "motion transition image" such as shown in FIG. 34 is used for confirming formation in sports, or the like, for example.

With a motion transition image, a person or object performing a motion (moving subject) is clipped out at characteristic times (key frames), which are arrayed spatially, thereby facilitating comprehension of the transition of the motion. This has a feature in that even though the moving subject is not moving spatially, an image showing the moving subject moving spatially is generated nonetheless. Generally, this is realized by drawing pictures, but may also be realized by cutting out and arraying photographs by hand.

CITATION LIST

Patent Literature

PTL 1: Japanese Patent No. 3449993
PTL 2: Japanese Unexamined Patent Application Publication No. 2004-180259
PTL 3: Japanese Unexamined Patent Application Publication No. 2007-259477
PTL 4: Japanese Unexamined Patent Application Publication No. 2002-359777

SUMMARY OF INVENTION

Technical Problem

Conventionally, in the case of automatically generating such motion transition images, images of key frames to be processed are taken from multiple frames obtained from video of a video camera of continuous shooting with a camera or the like. The portions of the key frames which are the subject to be handled are clipped out, and these are arrayed, and so forth, with this technique.

However, with conventional motion transition images, there has been a problem in that it has been difficult to realize both a wide motion range and sufficient expression of motion transition at the same time.

For example, FIG. 34 is an example of generating a motion transition image using key frames FK1 through FK20 taken from moving image data obtained by shooting a person performing a golf swing, using a video camera.

In order to composite a great number of key frame images as one composite image as with this FIG. 34, each clipping out width wa at the time of arraying the key frame images has to be narrow, as a matter of course.

Accordingly, the range of motion of the moving subject cannot be covered, and part of the moving subject which was intended is cut out. For example, as can be seen from the images in FIG. 34, at certain timings through the process of the swing, the tip portion of the golf club and so forth are missing from the images. Not only is this visually undesirable, this is also unsuitable when considering usage for form check or the like.

Now, in order to a part of the moving subject (e.g., the person performing the swing and the golf club) to not be missing, the clipping out width needs to be wider.

As indicated in FIG. 35 with clipping out width wb, this is an example where the clipping out width from each key frame image is wider, in this case, the number of key frame images which can be arrayed as one image is smaller. For example, FIG. 35 illustrates a motion transition image generated by extracting eight key frames FK1, FK4, FK7, FK10 FK11, FK14, FK17, and FK20, from the twenty key frames FK1 through FK20 in FIG. 34.

In this case, each key frame image can be kept from a part of the moving subject (the person performing the swing and the golf club) being missing. However, due to the number of key frames which can be arrayed on one image being reduced, the motion transition image does not readily represent smooth motion. That is to say, motion transition cannot be expressed in a sufficiently fine manner for checking form and the like.

As can be seen from the examples in FIG. 34 and FIG. 35, widening the clipping out width to cover the entire motion range of the moving subject reduces the number of key frames existing within the final image that is generated, thus lacking expression of the motion transition. Narrowing the clipping out width increases the number of key frames the moving subject can be expressed in a temporally fine manner, but the range of motion of the moving subject cannot be covered, so part of the intended moving subject is undesirably cut out.

Also, while such a motion transition image originally has been a composited image obtained by simply arraying multiple key frames to yield a still image expressing motion transition, there is also demand for realizing a moving-image-like motion transition image with higher visual effects.

In a case of having generated and recorded such a motion transition image, it is suitable for the motion transition image to be able to be played and confirmed after shooing, in a way that is easily understood by the user and also with good operability.

Accordingly, it is an object of the present invention to, in a case of recording as a motion transition image a composite image data enabling sufficient motion expression using a great number of frame images, enable varied playing of the motion transition image with simple operations as playing thereof.

Solution to Problem

A display control device according to the present invention includes a playing processing unit configured to perform playing processing, from a recording medium in which is recorded as a series of recording frame image data, each of composited image data generated by sequentially performing image compositing processing for each input of frame image data, each of composited image data being enabled of moving image display in which a moving subject image in each frame image data is sequentially placed so as to be arrayed in a predetermined direction; and a display control unit configured to determine a frame position to be played out of the series of recording frame image data, in accordance with a user instruction, cause the playing processing unit to execute playing of the recording frame image data at the determined frame position, and perform display control of the played recording frame image data.

In this case, in accordance with a dragging operation (e.g., an operation of tracing over the touch panel with a finger) detected as the user instruction, the display control unit causes the playing processing unit to execute playing of the recording frame image data from a frame position of the recording frame image data of which playing output is currently being performed, to recording frame image data at a frame position ahead or behind, and performs display control of the played recording frame image data.

For example, the display control unit determines an end frame position which is a frame position ahead of or behind a start frame position, the frame start position being a frame position of the recording frame image data of which playing output is currently being performed, in accordance with a dragging operation amount per time increment and dragging operation direction detected as the user instruction, causes the playing processing unit to execute playing of the recording frame image data from the start frame position to the end frame position sequentially, and performs display control of the played recording frame image data.

Also, in accordance with a flicking operation (e.g., an operation of flicking over the touch panel with a finger) detected as the user instruction, the display control unit causes the playing processing unit to execute playing of the recording frame image data from a frame position of the recording frame image data of which playing output is currently being performed, to recording frame image data at a frame position ahead or behind, and performs display control of the played recording frame image data.

For example, the display control unit determines an end frame position which is a frame position ahead of or behind a start frame position, the frame start position being a frame position of the recording frame image data of which playing output is currently being performed, in accordance with a flicking operation speed and flicking operation direction detected as the user instruction, causes the playing processing unit to execute playing of the recording frame image data from the start frame position to the end frame position sequentially, and performs display control of the played recording frame image data.

Also, in accordance with a pointing operation (e.g., an operation of touching a certain position on the touch panel) detected as the user instruction, the display control unit causes the playing processing unit to execute playing of the recording frame image data from a frame position of the recording frame image data of which playing output is currently being performed, to recording frame image data at a frame position ahead or behind, and performs display control of the played recording frame image data.

For example, the display control unit determines an end frame position which is a frame position ahead of or behind a start frame position, the frame start position being a frame position of the recording frame image data of which playing output is currently being performed, in accordance with a pointing operation position detected as the user instruction, causes the playing processing unit to execute playing of the recording frame image data from the start frame position to the end frame position sequentially, and performs display control of the played recording frame image data.

A display control method according to the present invention includes a step of detecting, during reading out and playing display of certain recording frame image data from a recording medium in which is recorded as a series of recording frame image data, each of composited image data generated by sequentially performing image compositing processing for each input of frame image data, each of composited image data being enabled of moving image display in which a moving subject image in each frame image data is sequentially placed so as to be arrayed in a predetermined direction, a user instruction as to the playing display; and a step of determining a frame position to be played out of the series of recording frame image data, in accordance with recording frame image data the detected operation input, and performing display control of the recording frame image data of which the frame position has been determined.

The program according to the present invention is a program for causing a computation processing device to execute the above steps.

With the present invention, the existence of a recording medium to be played is a prerequisite. In the recording medium is recorded, as a series of recording frame image data, each of composited image data generated by sequentially performing image compositing processing for each input of frame image data, each of composited image data being enabled of moving image display in which a moving subject image in each frame image data is sequentially placed so as to be arrayed in a predetermined direction.

Each of composited image data as used here means the following

First, original frame image data as used here means one of each frame making up a moving image each individual image of still images imaged continuously for example, or the like. That is to say, this broadly indicates image data making up one image.

At the time of performing image compositing processing on such input multiple frame image data to generate a motion transition image, processing is performed regarding the frame image data to separate the moving subject layer and background layer within the image. At each point in time that frame image data is input, the newest frame image data that has been input is composited as to the already-existing composited image data at that point in time. At this time, a great number of moving subject images can be arrayed by shortening the width of each frame, but there will be portions in this case where the moving subject of the newest frame image data and the moving subject of the previous frame image data overlap. Accordingly, layer image compositing processing performed such that the moving subject layer of the newest frame image data that has been input is given first priority, and the moving subject layer according to the image compositing processing from before last time is given second priority. Accordingly, a composited image is generated in a state where a portion of the moving subject is overlapped upon the moving subject of the previous frame.

The composited image data thus generated is recorded in the recording medium as a series of recording frame image data.

At the time of playing, each composited image data (recording frame image data) is played as each frame of the moving image and displayed, whereby moving image display from which the compositing process can be known, still image display at a certain stage of the compositing processing, or the like, can be executed. Further, at this time, dragging operations, flicking operations, pointing operations, and so forth are handled, thereby enabling the user to be easily presented with a scene which the user desires to view in each state of the compositing process.

Also, the display control device according to the present invention from another aspect is a display control device configured to control display contents of a display screen, including a control signal generating unit configured to generate control signals, so as to control the display contents such that images, representing a same moving subject at different times from each other obtained by consecutively imaging the same moving subject, are simultaneously displayed on each of divided display regions of a display screen having a preset number of regions and having divided display regions situated in a predetermined order, and such that images representing the same moving subject displayed in each of the divided display regions are situated in an order corresponding to the time sequence of the same moving subject, and so as to perform display control such that, at a time of a display content including images representing the same moving subject at a time different from the display content displayed on the display screen in accordance with user instruction or dynamic playing processing, each image of the same moving subject including the same moving subject at the different time is displayed in each of the divided display regions, in a state of maintaining the order in accordance with the time sequence of the same moving subject; and a control signal output unit configured to output the control signals so as to control the display content of the display screen.

A display control method according to the present invention from another aspect is a display control method to control display contents of a display screen, so as to control the display contents such that images, representing a same moving subject at different times from each other obtained by consecutively imaging the same moving subject, are simultaneously displayed on each of divided display regions of a display screen having a preset number of regions and having divided display regions situated in a predetermined order, and such that images representing the same moving subject displayed in each of the divided display regions are situated in an order corresponding to the time sequence of the same moving subject, and perform display control such that, at a time of a display content including images representing the same moving subject at a time different from the display content displayed on the display screen in accordance with user instruction or dynamic playing processing, each image of the same moving subject including the same moving subject at the different time is displayed in each of the divided display regions, in a state of maintaining the order in accordance with the time sequence of the same moving subject.

The program according to another aspect of the present invention is a program for causing a computation processing device to execute the above steps.

In this case, display contents such that images, representing a same moving subject at different times from each other obtained by consecutively imaging the same moving subject, are simultaneously displayed on each of divided display regions of a display screen having a preset number of regions and having divided display regions situated in a predetermined order, as used here means a display where a great number of moving subjects are arrayed.

The above display contents are controlled such that images representing the same moving subject displayed in each of the divided display regions are situated in an order corresponding to the time sequence of the same moving subject. For example, images of states at each point in time of the same moving subject as the same person or the like for example (e.g., each state of the process of a golf swing) are displayed on display arrayed in time sequence order.

Further, at the time of a display content including images representing the same moving subject at a time different from the display content displayed on the display screen in accordance with user instruction or dynamic playing processing, display control is performed such that each image of the same moving subject including the same moving subject at the different time is displayed in each of the divided display regions, in a state in which the order of the same moving subject in accordance to time sequence is retained. That is to say, at the time of displaying the same moving subject at a different point in time as that of the display state, display is performed in each of the divided display regions, in a state in which the order of the same moving subject in accordance to time sequence is retained.

Advantageous Effects of Invention

According to the present invention, by playing composited image data at each state as a motion transition image, dynamically displaying the process of compositing the image is enabled, and also a playing image of a state which the user desires to view in the compositing process can be provided with operations that are easy for the user.

Particularly, by correlating positions on the temporal axis of the moving image with position on the spatial axis according to a touch panel or the like at the time of playing, more intuitive operations are enabled.

DESCRIPTION OF EMBODIMENTS

Embodiments of the present invention will be described in the following order.
[1. Configuration of Image Processing Device]
[2. Processing Example of Generating/Recording Motion Transition Image]
[3. Processing Example of Playing Display of Motion Transition Image]
<3-1: Dragging Operation>
<3-2: Flicking Operation>
<3-3: Pointing Operation>
<3-4: Other Operations>
[4. Display Processing]
[5. Program]
[1. Configuration of Image Processing Device]

Figure 1:
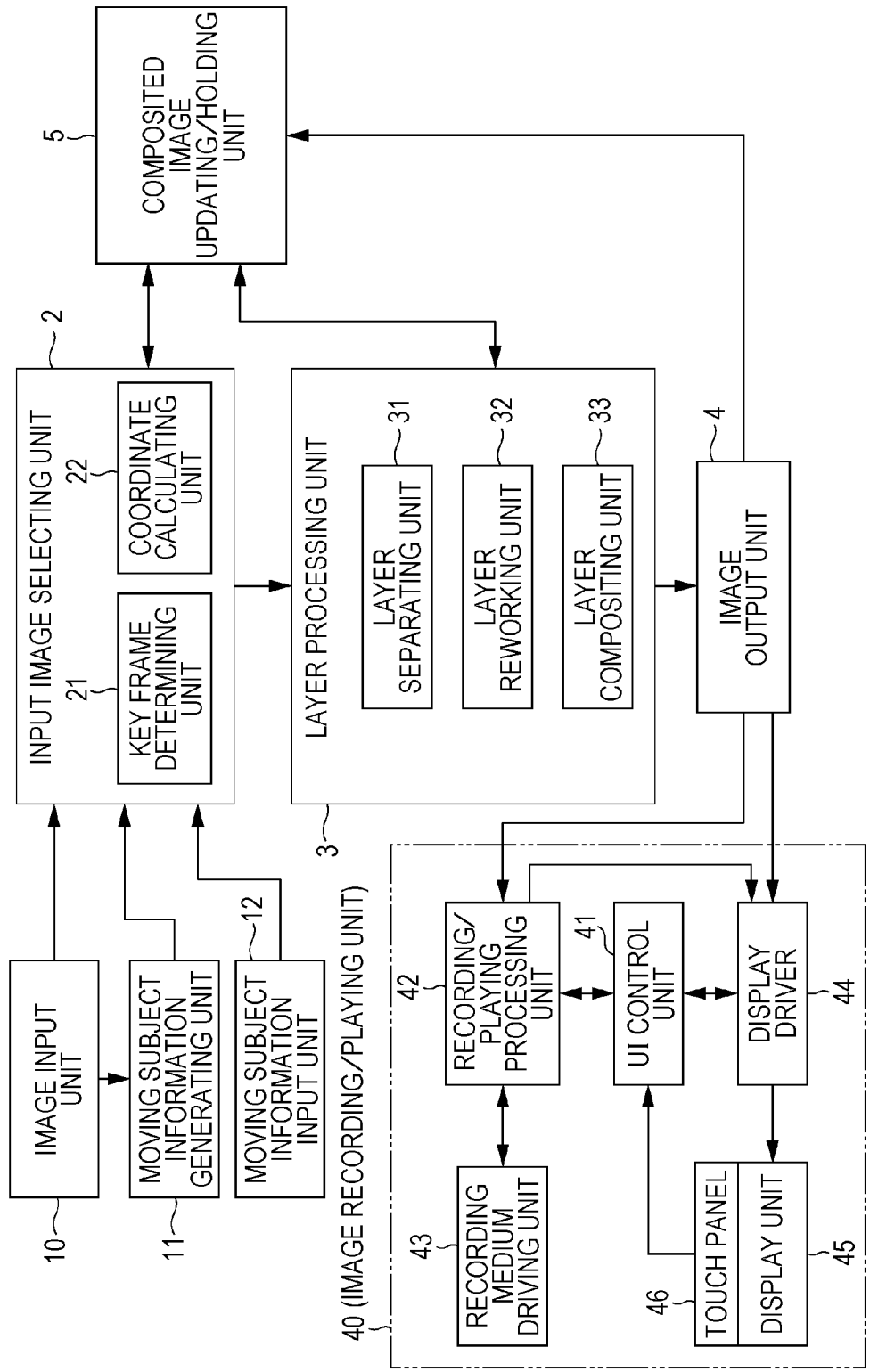
FIG. 1 is a block diagram of an image processing device according to an embodiment, including a display control device according to the present invention.

FIG. 1 illustrates a configuration example of an image processing device 1 according to an embodiment.

The image processing device 1 is a device which performs image compositing processing as a motion transition image, and also has a device unit which performs recording/playing, and displaying of a motion transition image (display control device unit) as an image recording/playing unit 40.

FIG. 1 illustrates, as the configuration of the image processing device 1 according to the present example, an input image selecting unit 2, a layer processing unit 3, an image output unit 4, a composited image updating/holding unit 5, an image input unit 10, a moving subject information generating unit 11, a moving subject information input unit 12, and the image recording/playing unit 40.

These part are not necessarily restricted to configuration members within the same housing. In particular, the image input unit 10, moving subject information generating unit 11, moving subject information input unit 12, and output device 40 can be conceived as being separate configuration members. Also, an arrangement may be made where only one of the moving subject information generating unit 11 and moving subject information input unit 12 is provided.

Further, other recording/playing/displaying equipment may be assumed for the image recording/playing unit 40, as a matter of course.

Also, the input image selecting unit 2, layer processing unit 3, image output unit 4, and composited image updating/holding unit 5 may each be configured as a hardware block, but can be realized as a functional block realized by a software program in a computation processing device such as a microcomputer or the like.

This image processing device 1 may be provided within an imaging device (video camera or the like) or video playing device or the like, for example, or may be configured as a standalone image-processing-dedicated device. Further, this may be configured that to execute image processing function realized by collaboration between software and hardware in a personal computer or the like.

The image input unit 10 performs input of a frame image data group serving as the base for a motion transition image (still image or moving image) to be generated.

Frame image data is one of each frame configuring a moving image, or each individual image of still images shot consecutively for example, or the like. That is to say, we will use the term "frame image data" to broadly mean image data configuring one image.

If the image processing device 1 is mounted on an imaging device, the image input unit 10 will be equivalent to a lens system, photoreceptor device, and a series of imaging system members which perform image signal processing to obtain imaged image signals.

Also, if imaged images obtained with an external imaging apparatus are to be taken in, the image input unit 10 may be a reception processing system of image signals transferred/transmitted/downloaded or the like from an external device. For example, a tuner unit as to broadcast waves, an external device interface unit such as a USB (Universal Serial Bus) interface or the like, or further a cable or wireless network communication unit or the like can be assumed.

Also, in the event that image signals such as imaged image data or the like is recorded in a recording medium such as a memory card (solid-state memory), an optical disc, or the like, the image input unit 10 is realized as playing system member or playing program which performs playing as to these recording media.

Depending on the image input unit 10, each frame image data serving as a moving image and multiple frame image data obtained by a continuous shooting of still images or the like, are input, and the image input unit 10 supplies these frame image data to the input image selecting unit 2 and moving subject information generating unit 11.

Note that the image input unit 10 may perform pre-processing. Appropriate conversion into a form necessary for processing, such as rendering a received moving image file into individual frames, conversion of a received interlaced image into a progressive image, and so forth, is performed. Also, enlarging/reduction may be performed.

The moving subject information generating unit 11 uses the original image group (frame image data group) received from the image input unit 10 or other external information (depth information or the like), to generate moving subject information.

Moving subject information is information whereby which part of at least input frame image data is a moving subject and which part is background, can be distinguished.

The moving subject information generating unit 11 generates moving subject information corresponding to each frame image data input, and supplies to the input image selecting unit 2.

The moving subject information may be expressed as a moving subject image, and in this case, expresses whether the pixels are a moving subject or background as pixel values. Also, there may be cases where information representing the location of this subject is expressed by expressions or vectors.

In the event that multiple moving subjects exist, the moving subject information generating unit 11 maybe, besides separating the moving subject and background, separate each of the moving subjects, and separate according to depth. In this case, in the event of representing the moving subject information as an image, this will be a multi-value image (or multi-channel image) representing at which depth each pixel is, and not a binary image indicating whether moving subject or background.

Also, generating of the moving subject information does not have to be performed within the device of the image processing device 1 according to the present example, and moving subject information generated by another device or program may be received. The moving subject information input unit 12 represents a member which externally receives moving subject information regarding each frame image data input at the image input unit 10. The moving subject information input unit 12 externally inputs the moving subject information corresponding to each input frame image data, and supplies to the input image selecting unit 2.

Note that accordingly, it is sufficient for at least one of the moving subject information generating unit 11 and moving subject information input unit 12 to be provided. Note however, moving subject information generated at the moving subject information generating unit 11 and moving subject information input at the moving subject information input unit 12 may be used in tandem, and from this perspective, providing both the moving subject information generating unit 11 and moving subject information input unit 12 is also useful.

The input image selecting unit 2 performs processing for generating a motion transition image with regard to the frame image data sequentially supplied from the image input unit 10. That is to say, image data necessary for use in the compositing processing at the layer processing unit 3 is selected, and appropriate combinations of images are output to the layer processing unit 3. Also, the input image selecting unit 2 outputs moving subject information corresponding to the frame image data output to the layer processing unit 3, and information necessary for compositing processing such as coordinate information for compositing and so forth, to the layer processing unit 3.

In FIG. 1, a key frame determining unit 21 and coordinate calculating unit 22 are shown within the input image selecting unit 2. The key frame determining unit 21 performs key frame determination processing, and selection of frame image data to be output to the layer processing unit 3, based thereupon. Also, the coordinate calculating unit 22 performs coordinate calculation for compositing processing.

Key frames are multiple images which have different temporal axes remaining in the same still image serving as the path of motion transition, as a final output image serving as a motion transition image (a final frame image in the case of a moving image). For example, it can be generally expected that frames imaged at equidistant intervals per appropriate time increment would be key frames in a temporally continuous frame image data group, but the time does not have to be at equidistant intervals, and can be changed to intervals suitable for visually recognizing the motion transition of the imaging object.

A key frame determining unit 21 performs processing to select frame image data serving as key frames from the frame image data sequentially supplied from the image input unit 10.

In the event of generating a motion transition moving image, the input full-frame image data is supplied to the layer processing unit 3 but handling thereof regarding imaging compositing at the layer processing unit 3 differs depending on whether key frames or not.

Figure 2:
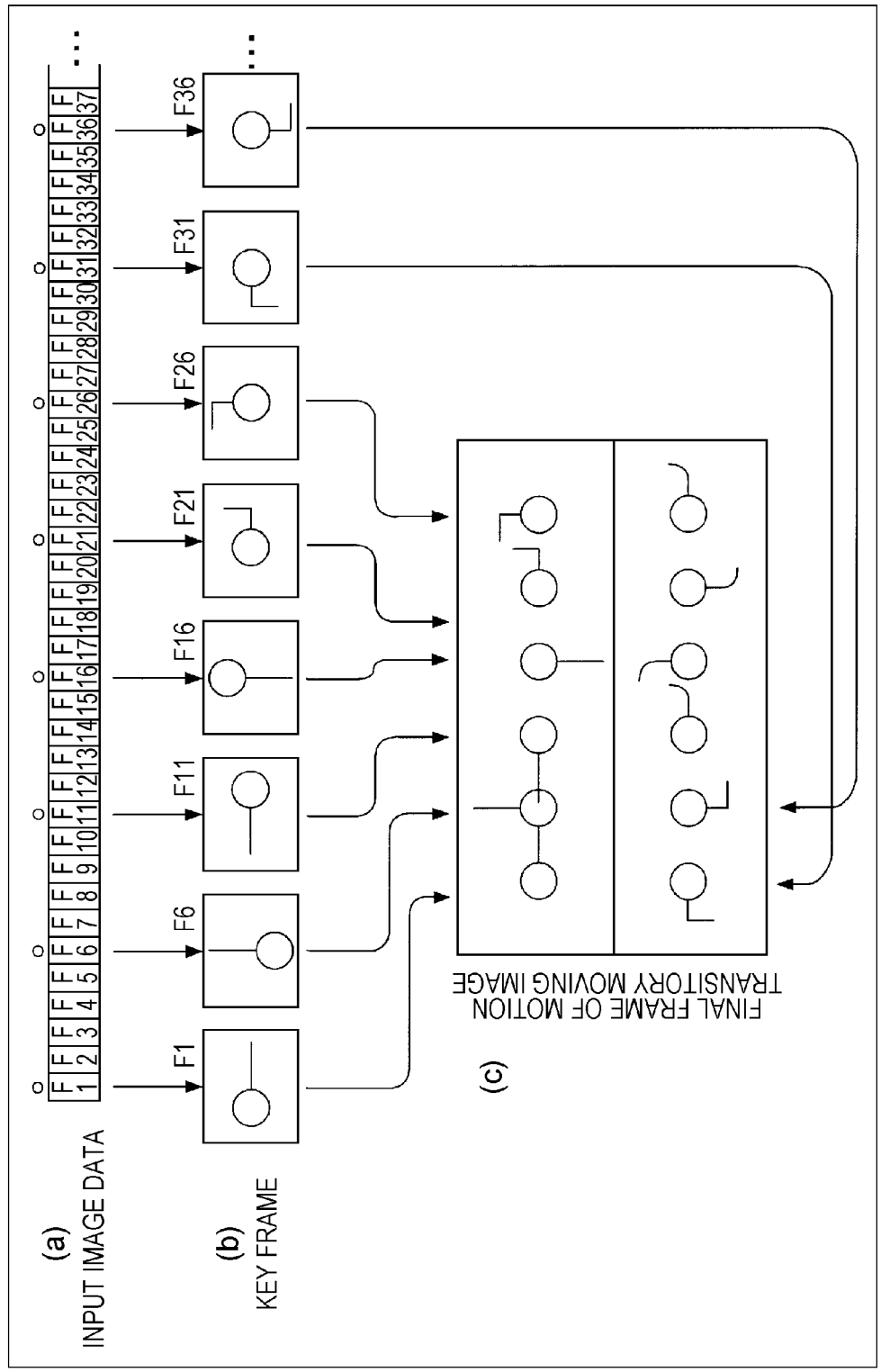
FIG. 2 is an explanatory diagram of generating processing of a motion transition image according to an embodiment.

FIG. 2 illustrates about key frames. (a) in FIG. 2 schematically illustrates image data input to the input image selecting unit 2. Let us say that this is moving data for example, and that F1, F2, F3, . . . in the drawing each illustrate one frame image data.

The input image selecting unit 2 selects key frames from such temporally consecutive frames serving as a moving image. As one example, in the event that every five frames is taken as key frames, the frames F1, F6, F11, F16, F21, . . . denoted by circles are key frames. (b) in FIG. 2 illustrates the image contents of these key frames as shapes.

In a case of generating a motion transition moving image, frame image data other than the key frames (e.g., F2, F3, etc.) is also used for the compositing processing.

Note however, that in the process of compositing, new frame image data is composited as to the composited image data so far, while retaining the key frames.

In (c) in FIG. 2, an example of an image of a final frame of the motion transition moving image is shown, in which image content the images of key frames are arrayed at almost equidistant intervals at the final frame, by compositing new frame image data to the composited image data with only the key frames retained. Details will be described later.

The layer processing unit 3 includes a layer separating unit 31, a layer reworking unit 32, and a layer compositing unit 33, and performs generating processing of motion transition images.

The layer separating unit 31 separates the layer so the frame image data input thereto, using moving subject information. A layer is each of a moving subject portion and a background portion and the like separated from one frame image data. The layer separating unit 31 separates the relevant range for performing layer compositing such that the input image and the previous key frame image are separated into background and moving subject, based on the moving subject information for example, and generates images for each layer. In the event that multiple moving subjects exist and the depth thereof can be found, separation is performed into layers of the number of the individual moving subjects+the number of backgrounds.

Figure 3:
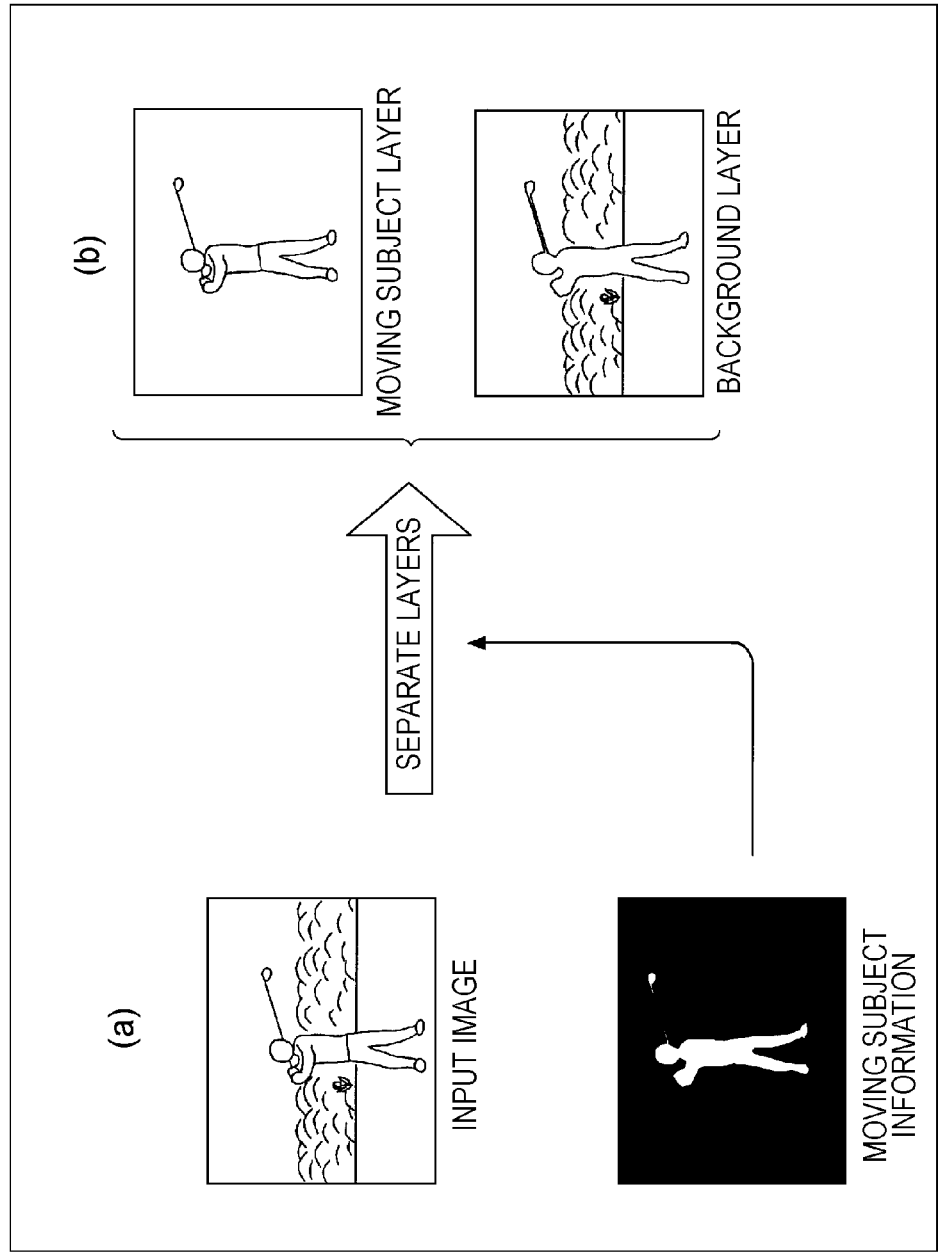
FIG. 3 is an explanatory diagram of layer separating processing according to an embodiment.

(a) in FIG. 3 illustrates an input image (one certain frame image data), and moving subject information regarding that frame image data.

As described above, the input image selecting unit 2 outputs the frame image data F1, F2, F3 . . . sequentially supplied from the image input unit 10 to the layer processing unit 3.

Also, the input image selecting unit 2 is supplied from the moving subject information generating unit 11 or moving subject information input unit 12 with moving subject information corresponding to each frame image data. At the time of supplying the frame image data to the layer processing unit 3, the input image selecting unit 2 supplies the moving subject information corresponding to the frame image data to the layer processing unit 3 as well.

Shown at the upper tier and lower tier in (a) in FIG. 3 is frame image data provided in this way to the layer processing unit 3, and the moving subject information thereof. Here, the moving subject information is represented in binary values. That is to say, this is information where pixels which are the moving subject are "1", and pixels which are the background other than the moving subject are "0", or the like. The white-out portion at the lower tier in (a) in FIG. 3 represents "1", i.e., the moving subject, and the back portion represents "0", i.e., the background.

The layer separating unit 31 separates the input frame image data into layers, using such moving subject information.

(b) in FIG. 3 illustrates the moving subject layer and background layer after separation. The moving subject layer at the upper tier in (b) in FIG. 3 is an image where the moving subject portion of the input image in (a) in FIG. 3 (i.e., only the pixels with moving subject information="1") have been cut out.

Also, the background layer at the lower tier in (b) in FIG. 3 is an image where the background portion of the input image in (a) in FIG. 3 (i.e., only the pixels with moving subject information="0") have been cut out.

Note that multi-value moving subject information of three values or more may be used, assuming a case where there will be multiple moving subjects. In this case, the moving subject information generating unit 11 or moving subject information input unit 12 generates (or obtains) moving subject information with different values according to the depth (front-back relation in the depth direction of the image) of the multiple moving subjects.

In such a case, the layer separating unit 31 can separate into layers of the number of moving subjects+the number of backgrounds.

The layer reworking unit 32 performs reworking, such as clipping of the separated layers, enlarging/reducing, coordinates moving, and so forth. That is to say, various types of processing are performed on each layer that has been separated, so as to be reworked into a form which can be composited. The processing which the layer reworking unit 32 performs is often geometric computations such as "enlarge/reduce", "rotate", "parallel movement" and so forth, but also include image processing such as enhancing moving portions. Enlarging/reducing is decided depending on the number of key frames, the size of the output image, and so forth.

The layer reworking unit 32 performs various types of processing on each layer subjected to layer separation, so as to be reworked into a form which can be composited, but the motion transition image generally does not have the entire region of the input frame image data as the object, and is performed in a form with a part clipped out.

Further, a range where the moving subject is valid, and the region where background is retained in the final image, are also different.

Figure 4:
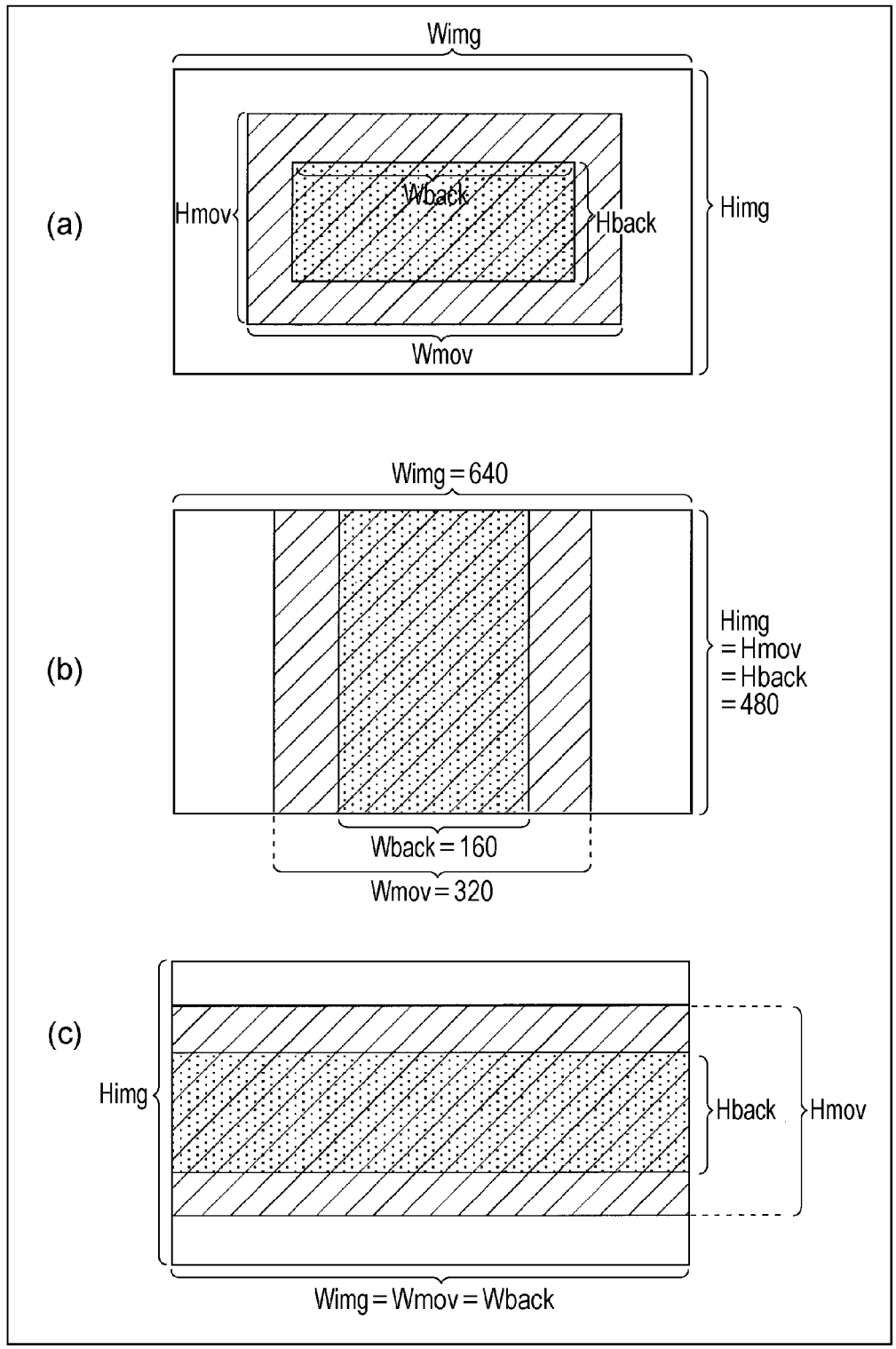
FIG. 4 is an explanatory diagram of an example of setting a region for an input image, according to an embodiment.

With the width and height of the image, which is the input frame image data, as (Wimg, Himg), the width and height of the transitory motion valid region as (Wmov, Hmov), and the width and height of the remaining background region as (Wback, Hback), a region form such as shown in (a), (b), and (c) in FIG. 4 can be assumed. Note that (a), (b), and (c) in FIG. 4 are each an example, and not restricted to these.

The transitory motion valid regions shown in (a), (b), and (c) in FIG. 4 are ranges where the primary moving subject is clipped out. Also, the remaining background region is a region used as a background image in the compositing processing.

The values of the transitory motion valid region (Wmov, Hmov) and the values of the remaining background region as (Wback, Hback) may have the same width or the same height depending on the transitory direction of the subject, i.e., the direction in which the image is temporally progressing at the time of expressing the motion transition image.

As shown with the motion transition image described later with FIG. 6 through FIG. 15, in the event of transition moving of the moving subject images in the horizontal direction, the height (Hmov, Hback) is often preferably the same value as with the height of the original frame image data (Himg), as in the example in (b) in FIG. 4.

Also, in the event of moving the moving subject images in the vertical direction, the width (Wmov, Wback) is often preferably the same value as with the width of the original frame image data (Wimg), as in the example in (c) in FIG. 4.

In the event that the moving subject is a person who is standing, such as with form checking in sports or the like, horizontal transition will occur often, and in the event that the object is Judo groundwork or the like, the probability that this will be vertical transition is great. Thus, the direction of transition and the accompanying size of images strongly depend on the object of imaging.

Figure 5:
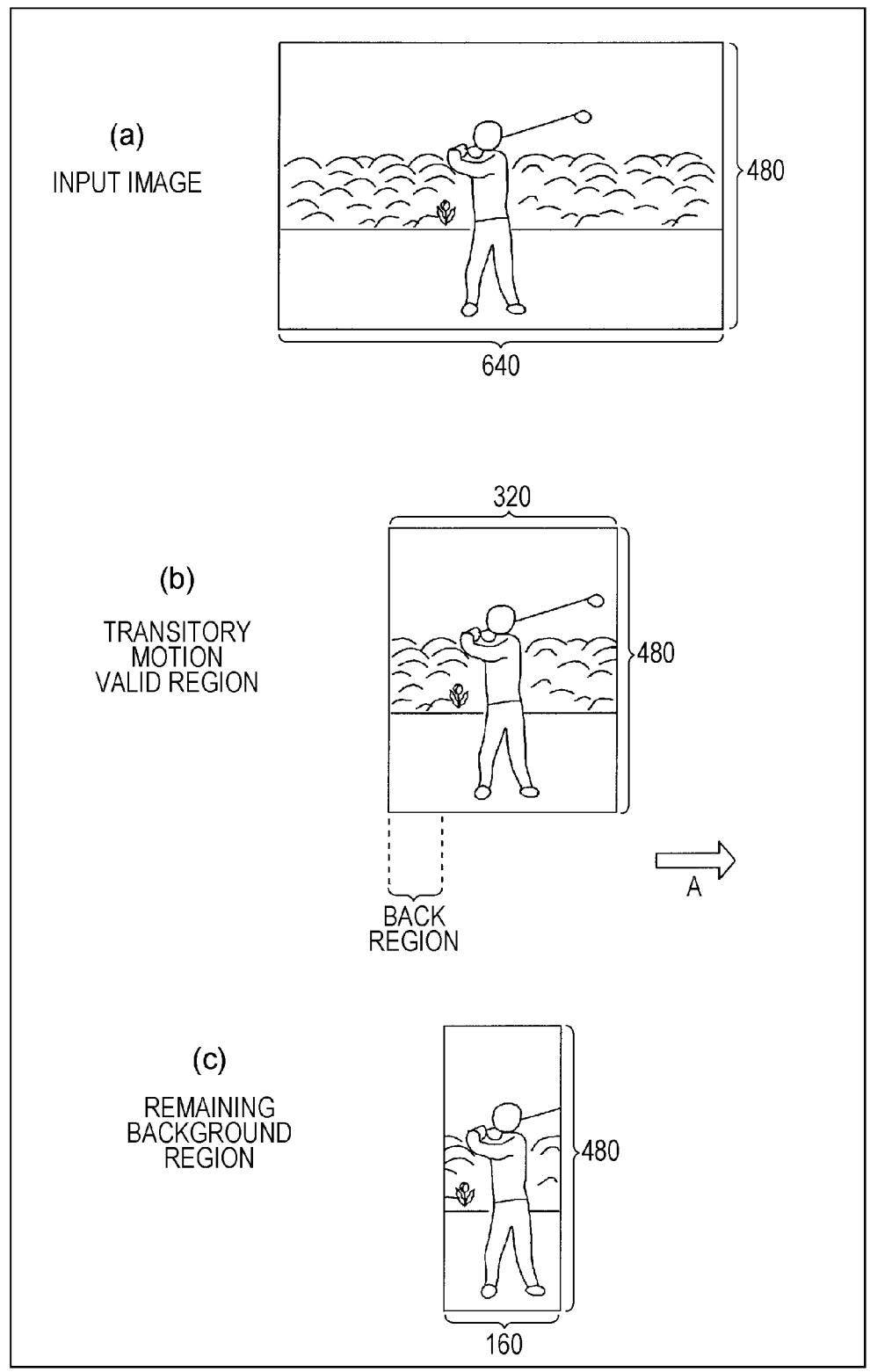
FIG. 5 is an explanatory diagram of a transitory motion valid region and remaining background region according to an embodiment.

FIG. 5 illustrates an example of setting the transitory motion valid region and remaining background region for actual frame image data, with regard to the example in (b) in FIG. 4.

(a) in FIG. 5 is the original input frame image data, and we will say that the size of the frame image data is VGA (640×480). We will say that the centers of the transitory motion valid region and the remaining background region match the center of the frame image data which is the input image.

We will say that, as shown in (b) in FIG. 5, the transitory motion valid region is a region of width Wmov=320, height Hmov=480.

We will say that, as shown in (c) in FIG. 5, the remaining background region is a region of width Wback=160, height Hback=480.

Of course, this is but one example, and in practice it is sufficient for the images to be used for compositing processing to be clipped out with settings suitable in accordance with the size of the subject and motion.

The layer compositing unit 33 performs compositing processing using the reworked layers, and composited images from the prior time or before. That is to say, the image to be output is composited based on the image reworked by the layer reworking unit 32, composited images from the prior time or before, moving subject information, and so forth. Compositing as used here is to perform determination of which layer's pixels to reflect in the output image based on the moving subject information, and generated the output image. While selection may be made from pixels of a single layer, there may be cases where pixels of multiple layers are mixed and output.

As for the processing by the layer compositing unit 33, image compositing processing is performed to generate composited image data, in accordance with the input of frame image data. At this time, layer image compositing processing is performed as to a partial region of already-existing composited image data at the point in time that the frame image data was input. In this case, the moving subject layer of the newest input frame image data has first priority, and the moving subject layer of the frame image data relating to composited images from the prior time or before has second priority.

Specific processing examples will be described later.

The image output unit 4 outputs the composited image composited at the layer processing unit 3 to the image recording/playing unit 40.

The image recording/playing unit 40 as used here is a member which performs recording operations to a recording medium, playing operations, and displaying operation, illustrated in exemplary form.

The image output unit 4 sequentially outputs composited image data generated at the layer processing unit 3 for each input of frame image data, to the image recording/playing unit 40, as frame image data for recording to be recorded in the recording medium.

Also, the image output unit 4 sequentially outputs composited image data generated at the layer processing unit 3 for each input of frame image data, to the image recording/playing unit 40, so as to be displayed on a display unit 45 as a motion transition moving image.

Note that various specific output destinations of the composited image data by the image output unit 4 besides the image recording/playing unit 40 can be conceived in accordance with system form, such as output to another display device, output to another recording device, network output, and so forth.

Also, in the event that the frame image data according to the compositing processing this time is a key frame, the image output unit 4 outputs this to the composited image updating/holding unit 5 and performs updating/storage in order to enable the composited image data from this to be usable as already-existing composited image data of the previous time in when performing the next processing. On the other hand, in the event that the frame image data according to the compositing processing this time is not a key frame, the composited image data this time is not output to the composited image updating/holding unit 5, since it will not be used as already-existing composited image data of the previous time in when performing the next processing.

The composited image updating/holding unit 5 holds the composited image data at each point in time in the generating processing of the motion transition image.

For example, at the time of generating a motion transition image, the composited images output from the image output unit 4 at each point in time are updated and held. For example, past composited image data necessary in the composition processing process are updated and held, as that from the last time, the time before last, and so on. Also, the information of the key frames at the time of generating each composited image, the moving subject information of the key frames, and so forth, as also recorded and held.

The image recording/playing unit 40 includes a user interface control unit (UI control unit) 41, a recording/playing processing unit 42, a recording medium driving unit 43, a display driver 44, a display unit 45, and a touch panel 46.

The UI control unit 41 is formed of a microcomputer, for example. The UI control unit 41 controls the parts within the image recording/playing unit 40, and executes recording operations of the composited image data supplied from the image output unit 4 to the recording medium, and also display operations thereof. Also, playing operations from the recording medium and display operations of the composited display data that has been played are executed.

Note that each frame image data serving as composited image data supplied from the image output unit 4 to the image recording/playing unit 40 to be recorded in the recording medium will also be referred to as "recording frame image data", so as to distinguish from the original frame image data which the input image selecting unit 2 inputs.

Under control of the UI control unit 41, the recording/playing processing unit 42 performs processing for recording the recording frame image data, such as compression processing, appending with error correction code, encoding for recording data format, and so forth, for example. Also, the recording/playing processing unit 42 controls the recording medium driving unit 43 so as to execute recording driving as to the recording medium.

Also, under control of the UI control unit 41, the recording/playing processing unit 42 performs playing processing of the recording frame image data from the recording medium. That is to say, the recording medium driving unit 43 is controlled so as to executed data readout from the recording medium. The recording frame image data that has been read out is subjected to predetermined decoding processing, error correction processing, and so forth, and recording frame image data forming each frame of the moving image is played. The recording frame image data is then supplied to the display driver 44 for display playing.

The recording medium driving unit 43 is a member which performs recording/playing driving of a recording medium. Various types of recording media can be assumed, such as optical discs, magnetic disks, hologram discs, memory cards with built-in solid-state memory, hard disks, solid state memory, and so forth.

In the event that an optical disc is used, for example, the recording medium driving unit 43 is formed as a disc driving unit having an optical pickup, spindle mechanism, servo mechanism, and so forth. That is to say, it is sufficient for this to be a member which performs writing/reading of information in accordance with the recording medium to be employed.

The display unit 45 is a display device such as a liquid crystal panel, organic EL panel, or the like.

Under control of the UI control unit 41, the display driver 44 executes video display on the display unit 45.

This display driver 44 performs processing for displaying the composited image data supplied form the image output unit 4 on the display unit 45, at the time of executing the compositing processing at the layer processing unit 3 described above.

Also, in the event that plying is performed by the operations of the recording/playing processing unit 42 and recording medium driving unit 43 described above, processing is performed to display the played recording frame image data on the display unit 45.

The touch panel 46 is formed upon the screen of the display unit 45, and provided for user operations. The user can perform later-described operations (dragging operations, flicking operations, pointing operations, etc.) using the touch panel 46, in accordance with the contents of display on the display unit 45.

The operation information at the touch panel 46 (information such as a touch position by the user or the like) is supplied to the UI control unit 41. The UI control unit 41 executes playing operations necessary for the recording/playing processing unit 42 in accordance with operation information such as the touch position and so forth, and the display contents at that time.

[2. Processing Example of Generating/Recording Motion Transition Image]

An example of processing to generate a motion transition image, executed primarily by the input image selecting unit 2, layer processing unit 3, image output unit 4, and composited image updating/holding unit 5, of such an image processing device 1, will be described.

Here, a case of generating a motion transition image such as in FIG. 6 through FIG. 15 will be given as an example, and a more specific processing example will be described with FIG. 16 through FIG. 22.

First, the motion transition moving image generated at the image processing device 1 according to the present example will be described.

Key frames are selected from the frame image data input as described above, but frames other than the key frames are used for compositing processing. Note however, that already-existing composited image data serving as the object of compositing with new frame image data is an image in which only the key frames have been reflected.

In the example of FIG. 6 through FIG. 15 below, we will say that the key frames have been selected as with (a) in FIG. 2.

Figure 6:
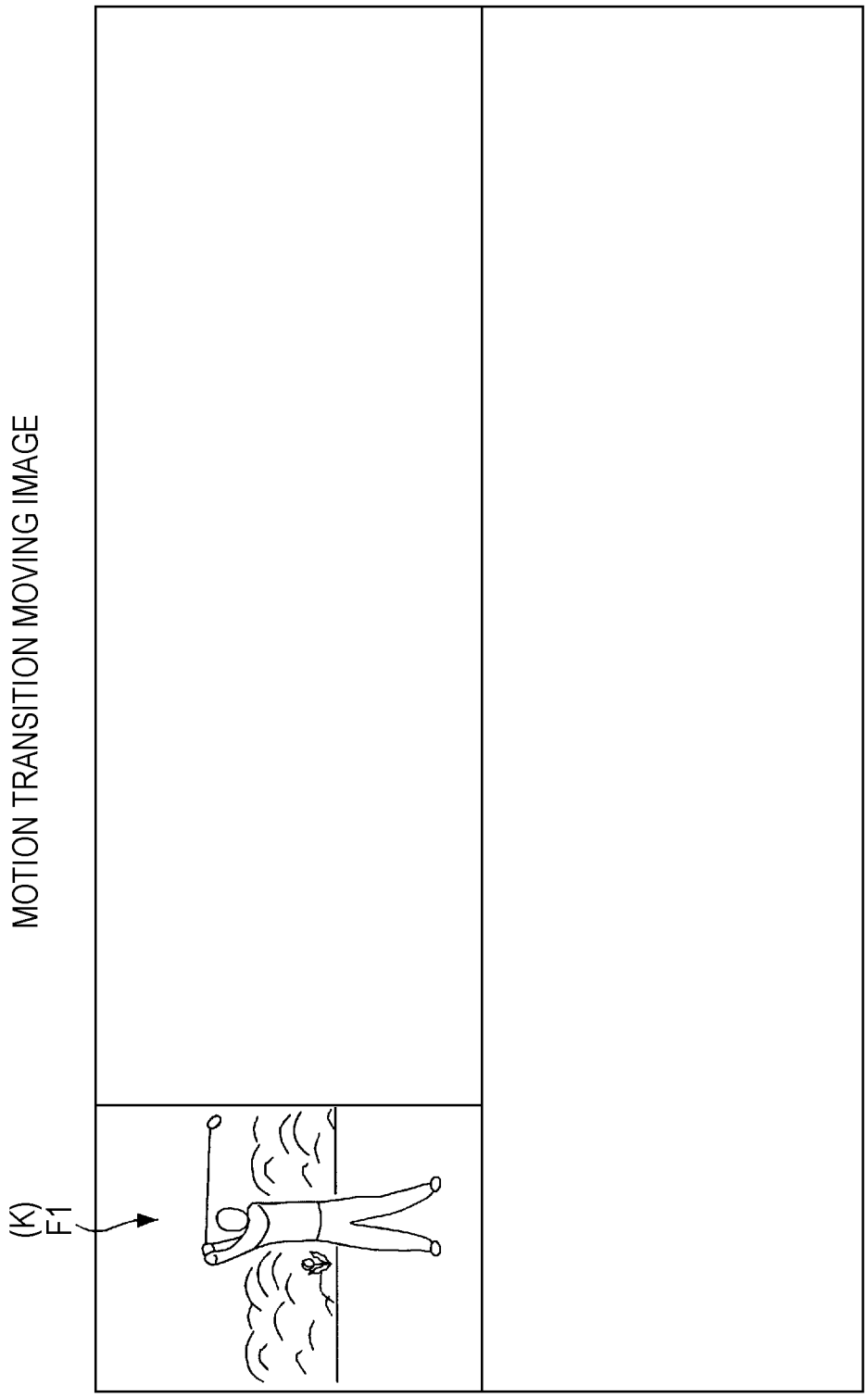
FIG. 6 is an explanatory diagram of a motion transition moving image according to an embodiment.

FIG. 6 shows composited image data at the time of a first frame image data (e.g., a key frame) F1 having been input. Note that in FIG. 6 through FIG. 15, frame image data which has been take as a key frame is denoted with a (K).

Figure 7:
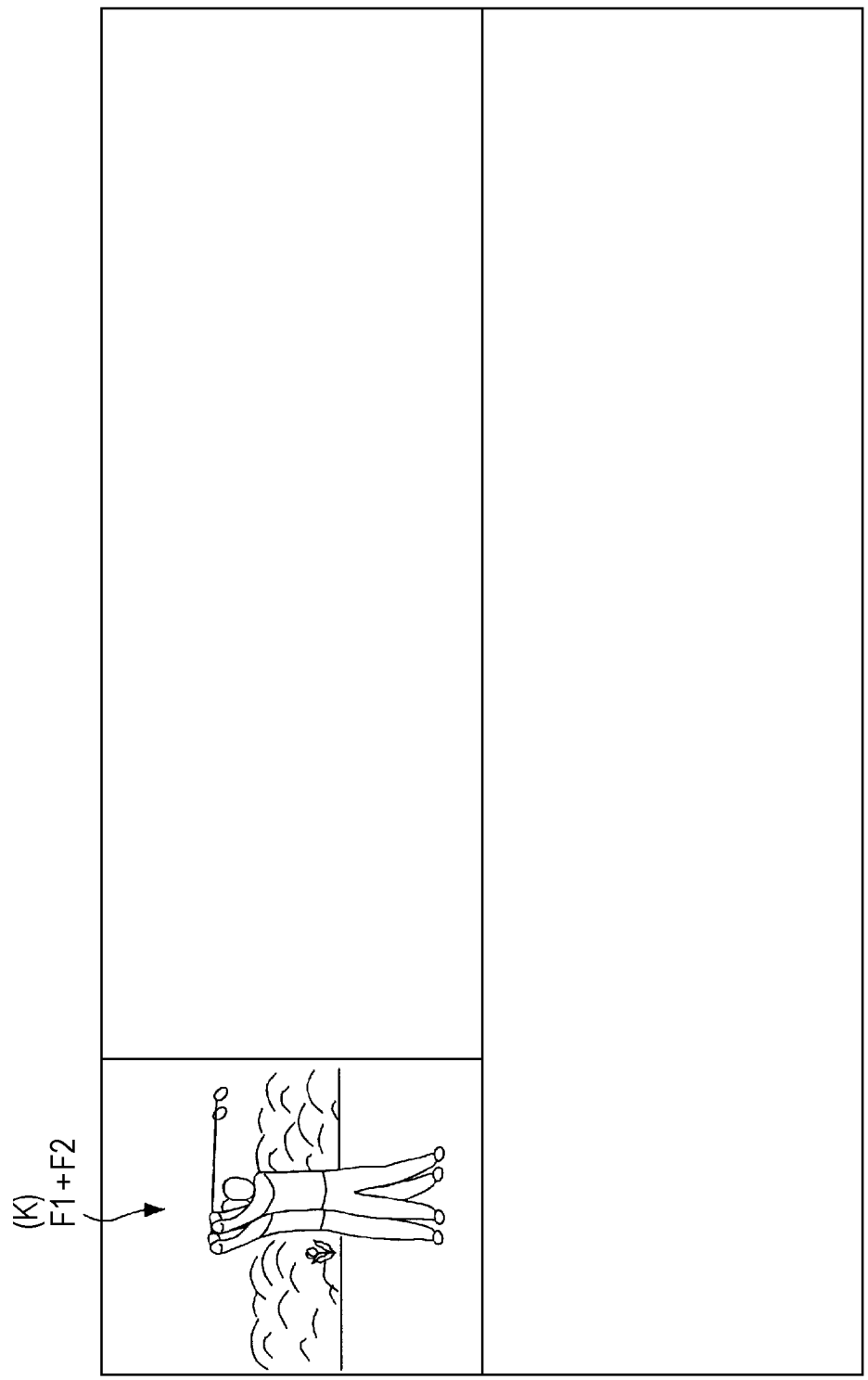
FIG. 7 is an explanatory diagram of a motion transition moving image according to an embodiment.

Next, FIG. 7 shows the composited image data at the time of a second frame image data F2 which is not a key frame (hereinafter, frame image data which is not a key frame will be referred to as "non key frame") having been input. In this case, the non key frame F2 is composited in a pixel region shifted from the key frame F1 by a predetermined amount. Note that for portions where the moving subject overlaps, the motion subject image of the newest frame is always given priority.

Compositing is performed using a technique where input frame image data is composited on the already-existing composited image data. The already-existing composited image data at the point in time of compositing this non key frame F2 is the composited image data such as in FIG. 6.

Figure 8:
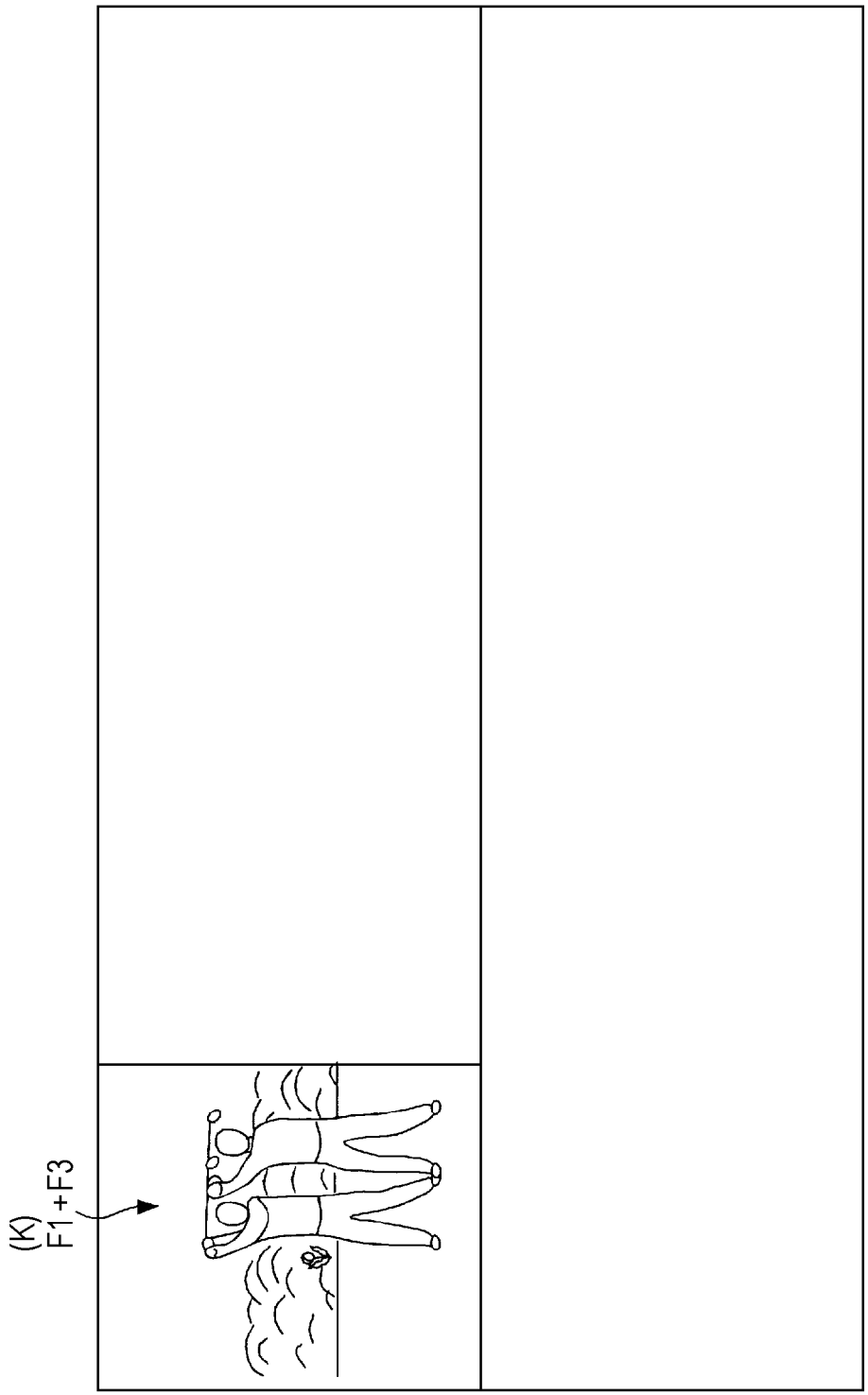
FIG. 8 is an explanatory diagram of a motion transition moving image according to an embodiment.

Next, FIG. 8 shows the composited image data at the time of a third non key frame F3 having been input. In this case, the non key frame F3 is composited in a pixel region shifted from the non key frame F2 in FIG. 7 by a predetermined amount.

Compositing here is performed using a technique where input frame image data is composited on the already-existing composited image data as described above, but the composited image data at the time of a non key frame having been input is not used as already-existing composited image data.

Accordingly, the already-existing composited image data at the time of the non key frame F3 being input as well still is the composited image data in FIG. 6.

That is to say, the non key frame F2 from the last time is not used in compositing, and the non key frame F3 is composited as to the already-existing composited image data at that point in time, so an image is obtained wherein the moving subject is expressed in frame image data F1 and F3 as shown in the drawing.

Although not shown in the drawings, composited image data of the key frame F1+non key frame F4 is generated at the time of a fourth non key frame F4 having been input in the same way, and composited image data of the key frame F1+non key frame F5 is generated at the time of a fifth non key frame F5 having been input in the same way. That is to say, in either case, the input frame image data is composited as to the already-existing composited image data at that point in time.

At the time of the key frame F6 being input as well, this is the same in that compositing is performed as to the already-existing composited image data.

Figure 9:
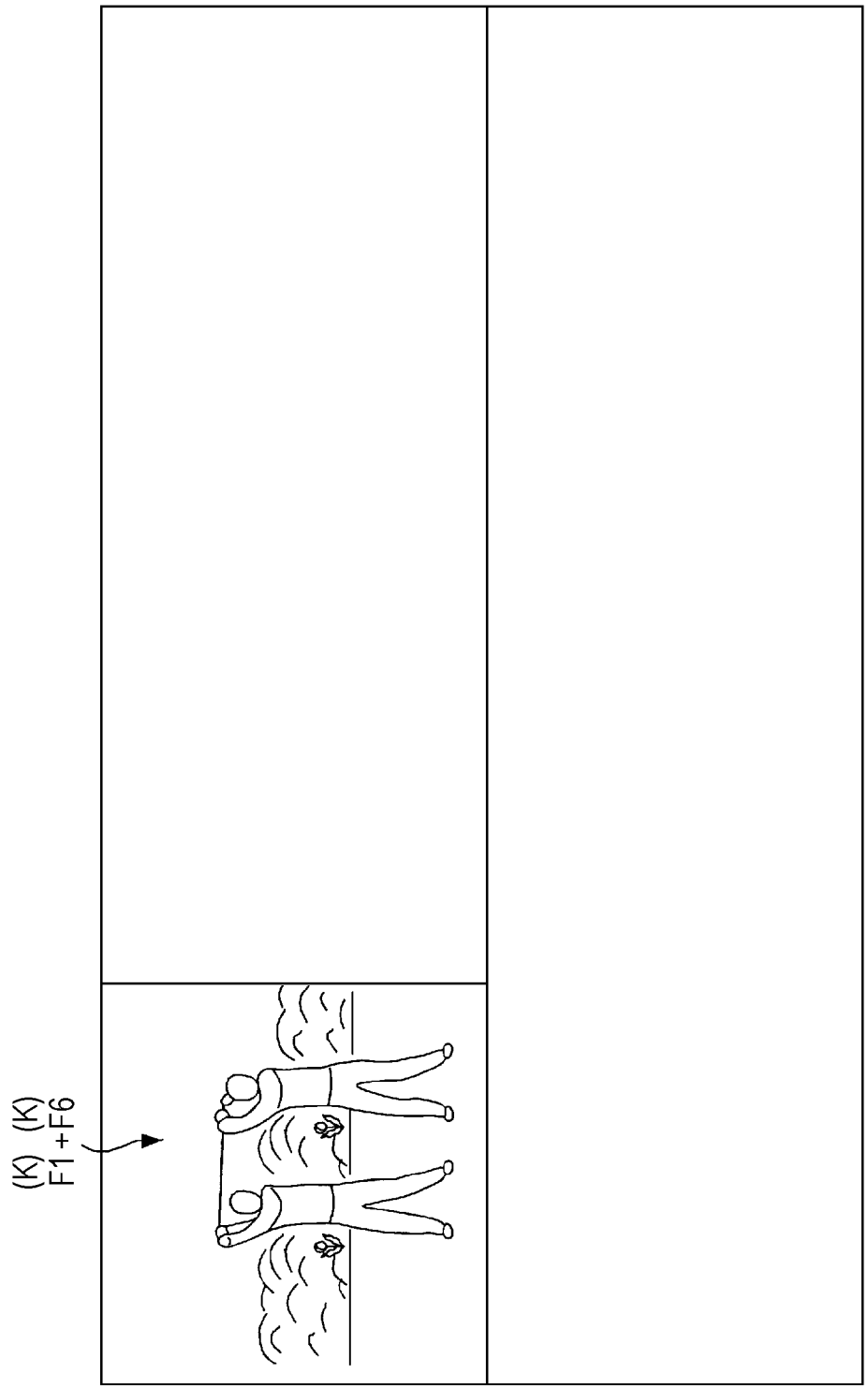
FIG. 9 is an explanatory diagram of a motion transition moving image according to an embodiment.

FIG. 9 is composited image data at the time of the second key frame F6 being input, and the key frame F6 is composited as to the already-existing composited image data (only the key frame F1 in this case).

Note however, at this point in time, the composited image data in this FIG. 9 is also saved as already-existing composited image data.

The already-existing composited image data used for compositing is not restricted to only the composited image data at the time of the key frame input immediately before (composited image data from last time), and the composited image data at the time of input for the key frame therebefore (composited image data from time before last) may be further used.

For example, with a later-described specific processing example, the composited image data from the last time and the composited image data from the time before last are used, so description will be made here as well of using the composited image data from the last time and the composited image data from the time before last.

Note that using already-existing composited image data is to composite with order of priority regarding each pixel at the time of compositing layers, so the range of using composited image data going backwards can be set depending on how much the moving subject overlaps, from this perspective. For example, examples where composited image data from two times before last, composited image data from three times before last, or the like, are used can be conceived.

After the composited image data in FIG. 9, has been generated, the composited image data from the last time (the composited image data in FIG. 9) and the composited image data from the time before last (the composited image data in FIG. 6) are held in the composited image updating/holding unit 5, as already-existing composited image data and used for subsequent compositing processing.

Figure 10:
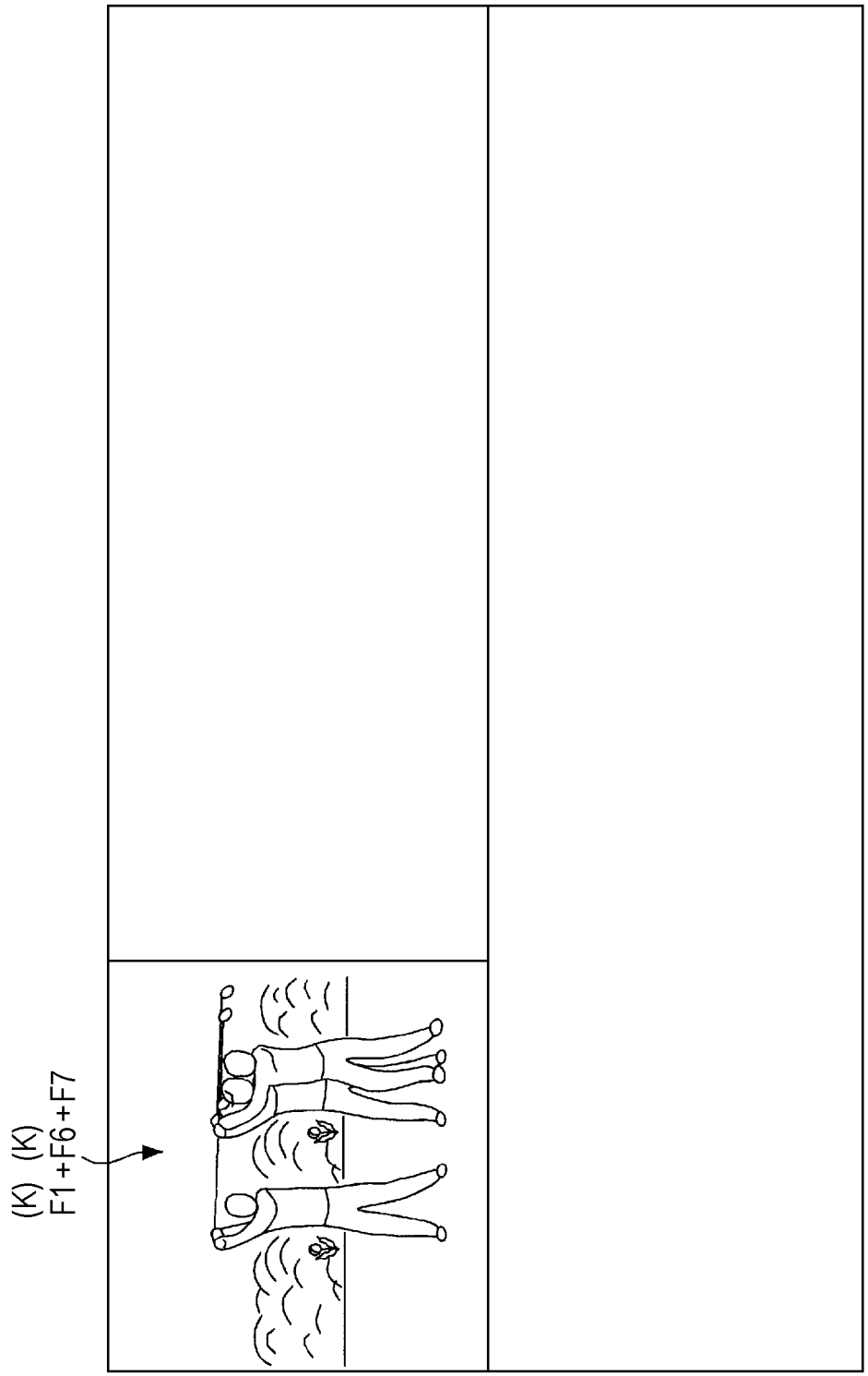
FIG. 10 is an explanatory diagram of a motion transition moving image according to an embodiment.

Next, FIG. 10 shows the composited image data at the time of a non key frame F7 having been input. In this case as well, image of the non key frame F7 is composited as to the already-existing composited image data, thereby generating a composited image of the key frames F1 and F6 and the non key frame F7, as shown in the drawing.

Figure 11:
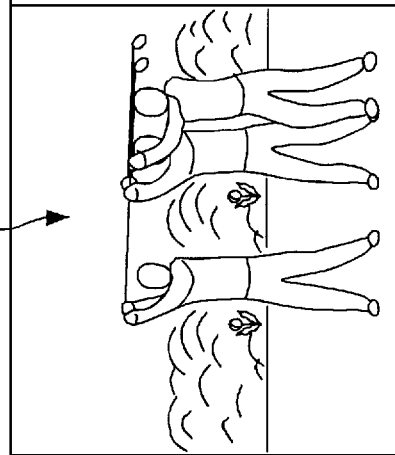
FIG. 11 is an explanatory diagram of a motion transition moving image according to an embodiment.

Further, FIG. 11 shows the composited image data at the time of a non key frame F8 having been input. In this case as well, the image of the non key frame F8 is composited as to the already-existing composited image data, thereby generating a composited image of the key frames F1 and F6 and the non key frame F8, as shown in the drawing.

This holds true for subsequent input of non key frames F9 and F10.

Figure 12:
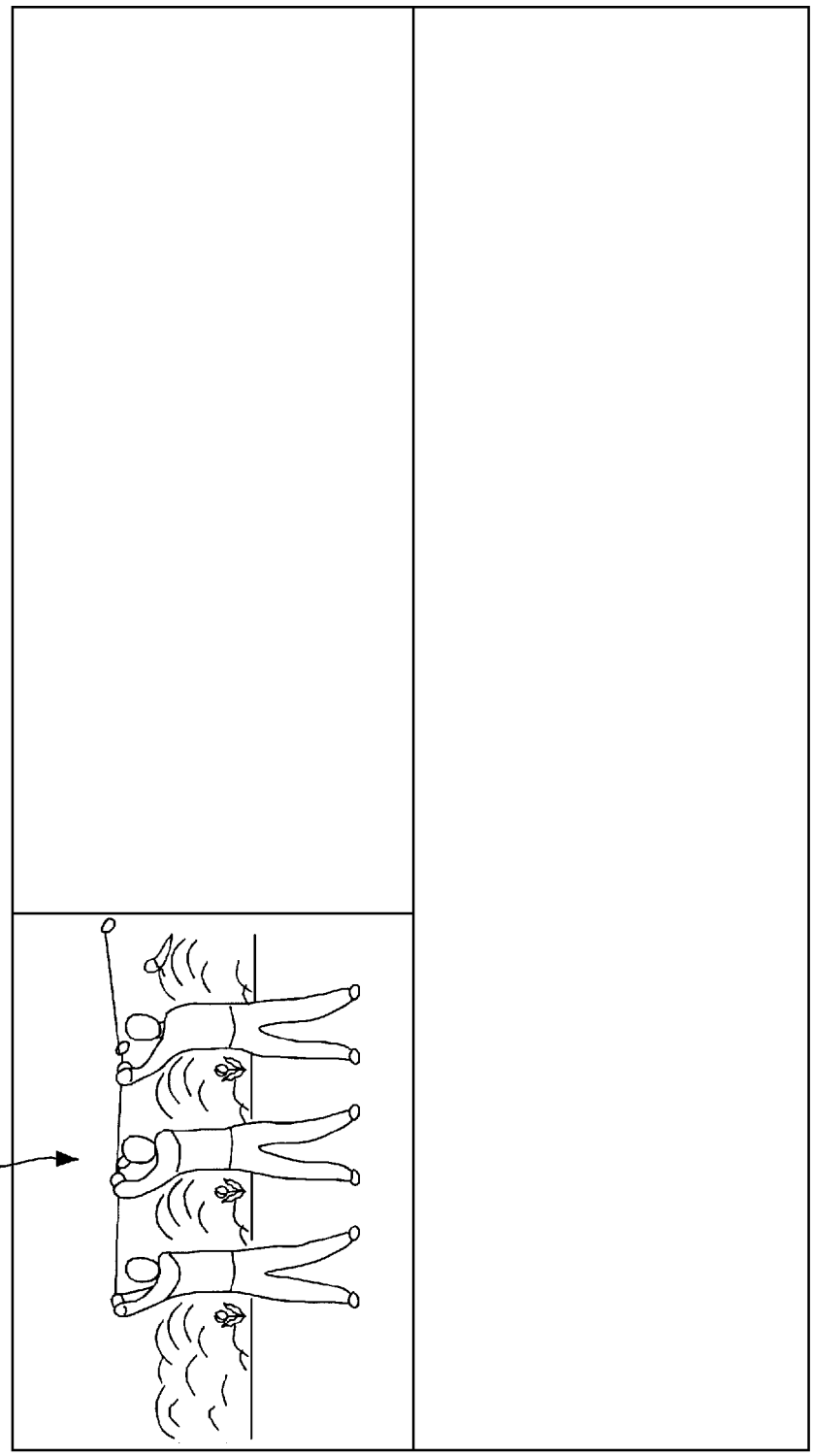
FIG. 12 is an explanatory diagram of a motion transition moving image according to an embodiment.

FIG. 12 is the composited image data at the time of the third key frame F11 being input, where the key frame F6 is composited to the already-existing composited image data.

Note however, that at this point in time, the composited image data in this FIG. 12 is also saved as already-existing composited image data. Also, at this point in time, the composited image data from the last time is updated to the composited image in FIG. 12, and the composited image data from the time before last to the composited image in FIG. 9, as the already-existing composited image data, and held.

Figure 14:
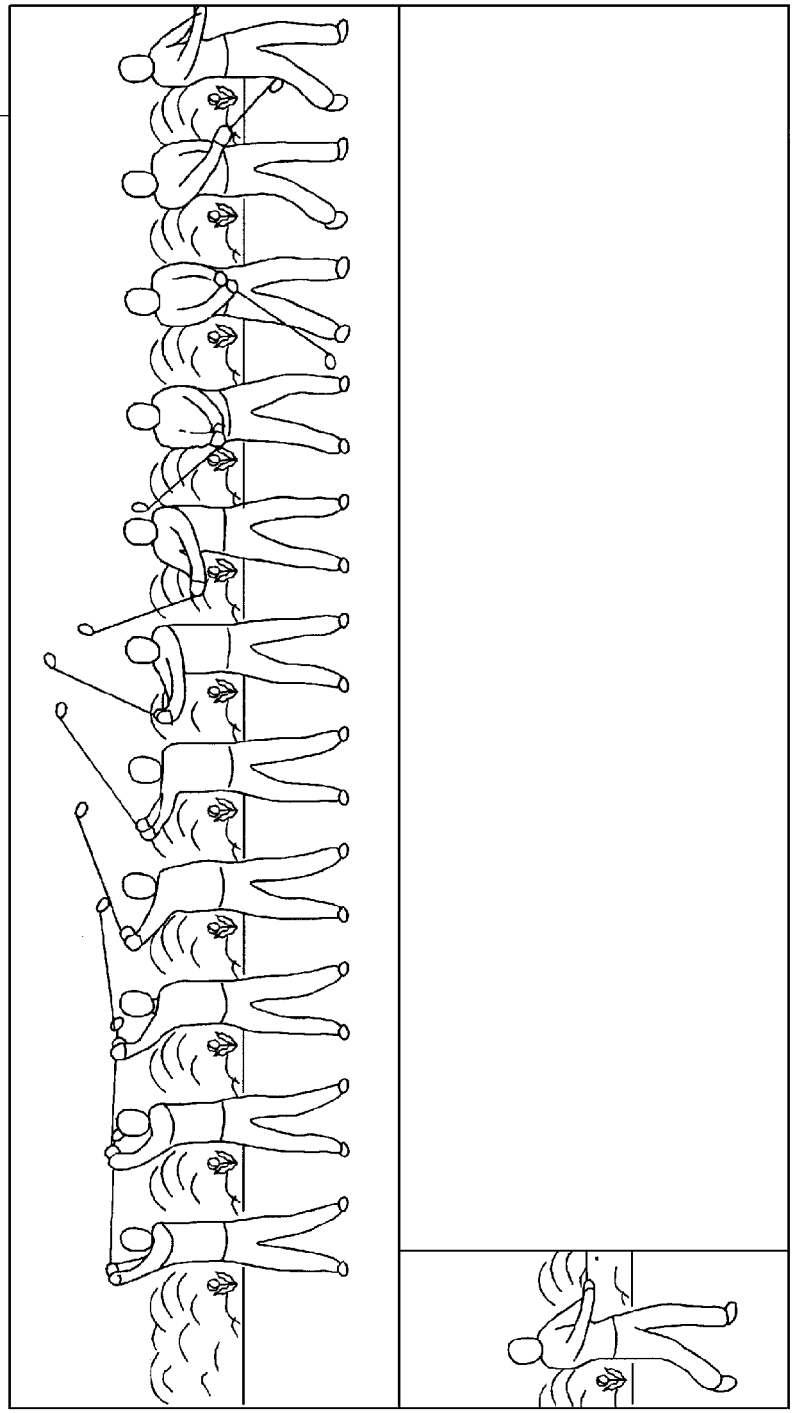
FIG. 14 is an explanatory diagram of a motion transition moving image according to an embodiment.
Figure 15:
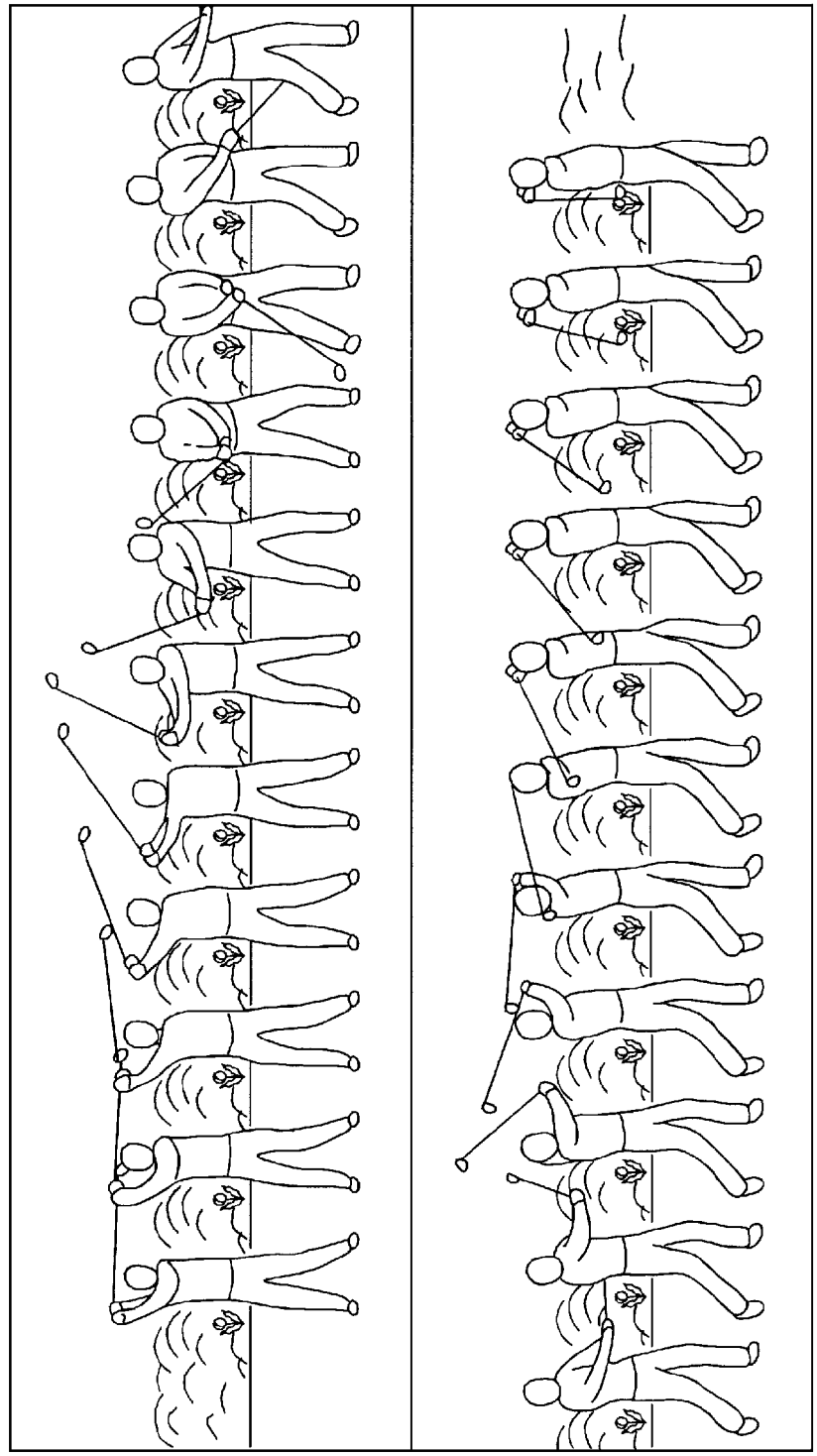
FIG. 15 is an explanatory diagram of a final frame of a motion transition moving image according to an embodiment.

As shown in FIG. 6 through FIG. 12, compositing processing is sequentially performed regarding the input frame image data (key frames and non key frames), and composited image data such as shown in the respective drawings is obtained at each point in time. These composited image data are each output as one frame making up a moving image. Further, the composited image data is generated each time there is input of frame image data thereafter, in the same way, with the moving image output processing as with FIG. 13 . . . FIG. 14 . . . FIG. 15, and so on.

That is to say, the subject images in each frame including non key frames are composited, while retaining the moving subject image of each key frame, and composited image data is output at each point in time.

Accordingly, a moving image expressing motion transition such as a golf swing or the like, i.e., a motion transition image, is output.

An example of processing for generating a motion transition moving image will be described with FIG. 16 and thereafter, by way of an example of such processing for generating a motion transition image.

Figure 16:
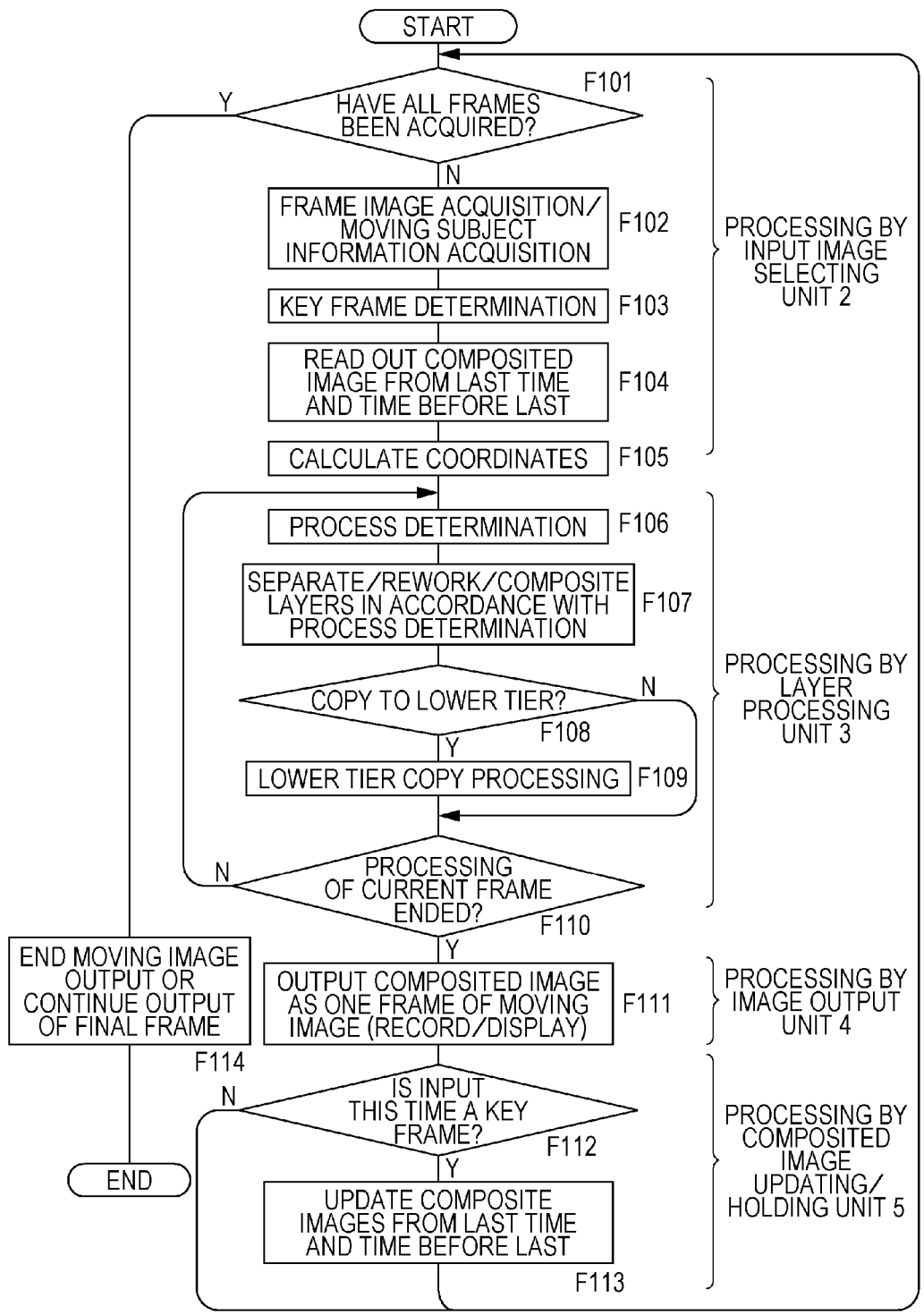
FIG. 16 is a flowchart of composite image generating and recording processing example according to an embodiment.

FIG. 16 illustrates processing executed by the input image selecting unit 2, layer processing unit 3, image output unit 4, and composited image updating/holding unit 5, at the time of generating a motion transition moving image.

Steps F101 through F105 are processing of the input image selecting unit 2.

As described above, the input image selecting unit 2 is supplied with temporally consecutive frame image data from the image input unit 10.

In step F102, each time one frame image data so is supplied, the input image selecting unit 2 performs processing to acquire the frame image data and the moving subject information corresponding to that frame image data from the moving subject information generating unit 11 (or the moving subject information input unit 12).

Note that determination in step F101 is determination regarding whether or not acquisition of a series of frame image data for generating a motion transition moving image, i.e., supply from the image input unit 10, has ended. That is to say, the flow advances from step F101 to F102 until input of a predetermined number of frame image data to be reflected as a motion transition moving image is completed.

Upon acquiring the frame image data and moving subject information in step F102, in step F103 the input image selecting unit 2 selects whether or not to take this frame image data as a key frame. In the event of performing key frame selection such as with FIG. 2 for example, every five frames, such as the first, sixth, eleventh, . . . are taken as key frames.

Note that as described above, the key frames do not necessarily have to be set at equidistant intervals. For example, in the case of an image of a golf swing such as shown in FIG. 6 through FIG. 15, a technique is employed where key frames are set at fine intervals before and after the instant of impact at the ball.

Upon performing key frame determination regarding the input frame image data, in step F104 the input image selecting unit 2 acquires the composited image data from the last time and the composited image data from the time before last, already existing at that point in time.

Note that until compositing processing is performed regarding the frame image data set as the first key frame, neither composited image data from the last time nor composited image data from the time before last exist. Also, no composited image data from the time before last exists unit compositing processing is performed regarding the frame image data set as the second key frame. In the event that at the point in time of step F104 there is saved in the composited image updating/holding unit 5 the composited image data from the last time and composited image data from the time before last, this is acquired in this processing.

In step F105, the input image selecting unit 2 performs coordinate calculating processing for calculating the pixel position by which to reflect the frame image data from this time (key frame or non key frame) in the composited image. That is to say, this is calculating processing for a pixel range to which to fit the frame image data from this time in the size of the final composited image (size of motion transition moving image).

The input image selecting unit 2 outputs the coordinates calculated in this step F105, the frame image data from this time and the moving subject information, the composited image data from the previous time, and the composited image data from the time before last, to the layer processing unit 3.

The layer processing unit 3 performs process determining processing in step F106.

Process determination is processing for determining what sort of compositing processing process is to be executed for each pixel (alternatively, every column, or alternatively, every row), in order to perform efficient compositing processing.

Note that in the event of generating a motion transition moving image in which the subject image transitions in the horizontal direction, as in FIG. 6 through FIG. 15, the process determination processing can be performed every pixel or every column. On the other hand, though not shown in the drawings, in a case of generating a motion transition moving image where the subject image transitions in the vertical direction, the process determination processing can be performed every pixel or every row. Description will be made based on an example of performing process determination for every column, along with the example in FIG. 6 through FIG. 15.

Figure 17:
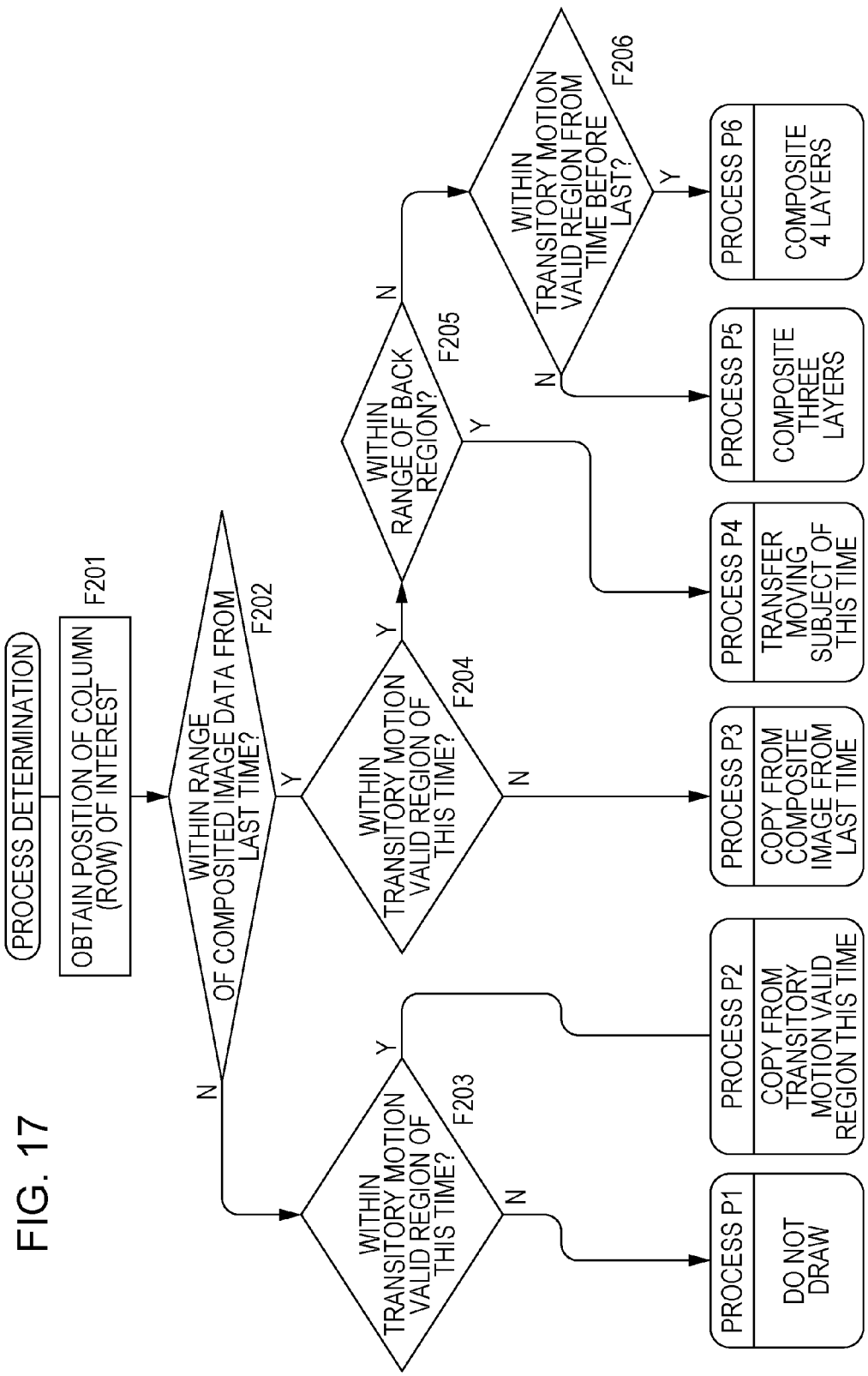
FIG. 17 is a flowchart of process determining processing according to an embodiment.

FIG. 17 show process determining processing performed in step F106.

With the present example, the frame image data from this time, the composited image data from the last time, and the composited image data from the time before last, are used for the compositing processing. In the event of using the two already-existing composited image data, the number of processes to be determined will be six (processes P1 through P6). In the event that the composited image data to be used increases, such as composited image data from two times before last or the like, the number of processes will increase.

Also, with the compositing processing, information of the range of the key frame last time and moving subject information that are included in the composited image data from the last time, and information of the range of the key frame the time before last and moving subject information that are included in the composited image data from the time before last, are used. These are saved in the composited image updating/holding unit 5 attached to the composited image data from the last time and composited image data from the time before last, and can be read out in the above-described step F102.

The process determining process in FIG. 17 is performed for every column of interest (there are cases of rows as described above).

Figure 13:
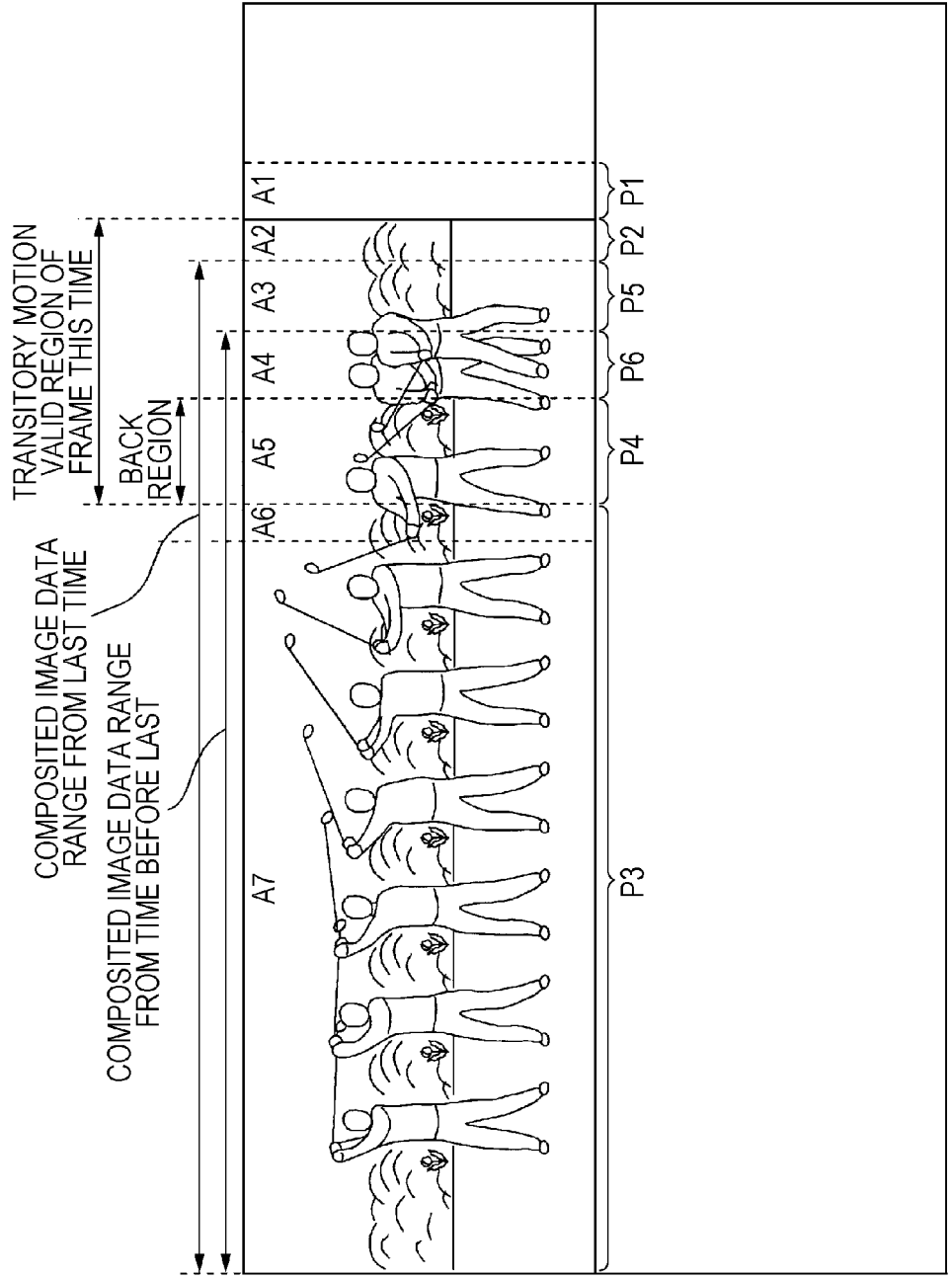
FIG. 13 is an explanatory diagram of a motion transition moving image according to an embodiment.

Each column for which to perform process determination is, with the point in time in FIG. 13 for example, each column in the range of A1 through A7.

Process determination is performed with each column of pixels in this range (in the case of FIG. 13, one pixel column at the upper tier in the composited image data) as a column of interest.

First, in step F201, the layer processing unit 3 takes one column as a column of interest, and obtains the pixel position (coordinate position within the composited image data) thereof.

In step F202, determination is then made regarding whether or not the position of the column of interest is within the range of the composited image data from the last time. The range of the composited image data from the last time is a range of region A3 through region A7 in FIG. 13.

In the event that the column of interest is not within the range of the composited image data from the last time, the layer processing unit 3 advances to step F203, and determination is made regarding whether or not the column of interest is within the transitory motion valid region this time. The transitory motion valid region this time is the transitory motion valid region of the frame image data (key frame or non key frame) input this time (see (b) in FIG. 5), and is a range of the A2 region through A5 region in FIG. 13.

In step F203, in the event that determination has been made that the column of interest is not within the transitory motion valid region this time, the layer processing unit 3 determines to apply process P1 for the relevant column of interest. This is a case where the column of interest is within the A1 region in FIG. 13.

Also, in the event that determination has been made in step F203 that the column of interest is within the transitory motion valid region this time, the layer processing unit 3 determines to apply process P2 for the relevant column of interest. This is a case where the column of interest is within the A2 region in FIG. 13.

Also, in the event that determination is made in step F202 that the column of interest is within the range of the composited image data from the last time, the layer processing unit 3 advances the flow to step F204, and determination is made regarding whether or not the column of interest is within the transitory motion valid region this time. In step F204, in the event that determination has been made that the column of interest is not within the transitory motion valid region this time, the layer processing unit 3 determines to apply process P3 for the relevant column of interest. This is a case where the column of interest is within the A6 and A7 regions in FIG. 13.

Also, in the event that determination has been made in step F204 that the column of interest is within the transitory motion valid region this time, the layer processing unit 3 advances to step F205, and determines whether or not the column of interest is within a back region range. A back region range is a region in the transitory motion valid region which is not included in the remaining background region in (c) in FIG. 5 while to the back side as to the direction of advance A of the motion transition image (case of moving from the left to the right), as indicated by (b) in FIG. 5. Note that in a case of the motion transition advancing from the right to the left, this is the region to the right side within the transitory motion valid region. Also, in the event that the image is such where the motion transition moves from up to down, this is the region to the upper side within the transitory motion valid region.

In the example in FIG. 13, a column within the A5 region is determined to be within the back region.

In step F205, in the event that determination has been made that the column of interest falls in the back region, the layer processing unit 3 determines to apply process P4 for the relevant column of interest. This is a case where the column of interest is within the A5 region in FIG. 13.

In step F205, in the event that determination has been made that this is not the back region, the layer processing unit 3 advances the flow to step F206, and determines whether or not the column of interest is within the region of composited image data from the time before last. The range within the composited image data from the time before last is a range of the A4 region through A7 region in FIG. 13.

In the event that determination is made that the column of interest is not within the range of the composited image data from the time before last, the layer processing unit 3 determines to apply process P5 for the relevant column of interest. This is a case where the column of interest is within the A3 region in FIG. 13.

In the event that determination is made in step F206 that the column of interest is within the range of the composited image data from the time before last, the layer processing unit 3 determines to apply process P6 for the relevant column of interest. This is a case where the column of interest is within the A6 region in FIG. 13.

Each time the process determination in FIG. 17 above is performed for one certain column which is a column of interest in step F106 of FIG. 16, the layer processing unit 3 performs the compositing processing in step F107. Step F107 is processing where compositing of the pixels of the relevant column of interest is performed as a compositing result image, in accordance with process determination results, and layer separation/reworking/compositing is performed as necessary.

Then, while steps F108 and F109 will be described later, the processing of steps F106 through F109 is repeated until determination is made that the processing regarding the current frame image data input this time in step F110 has ended. That is to say, in a case of performing the processing determination processing in increments of columns, this is repeated until process determination and compositing processing is performed regarding all columns.

Compositing processing as to the column of interest in accordance with process determination results will each be described.

Figure 18:
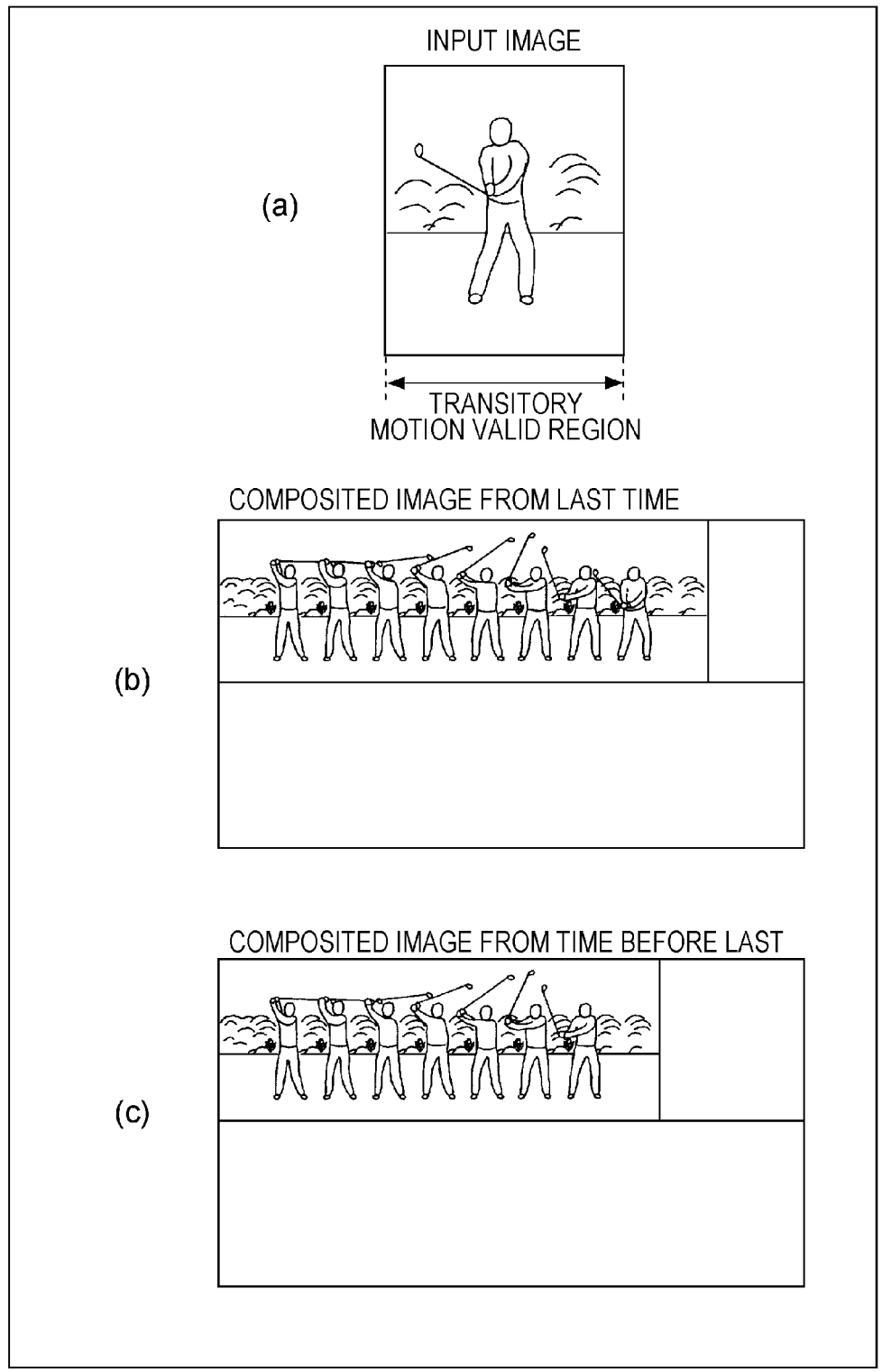
FIG. 18 is an explanatory diagram of image data used for compositing processing according to an embodiment.

First, image data used for compositing processing is shown in FIG. 18.

(a) in FIG. 18 illustrates a transitory motion valid region of an input image (frame image data) input this time in step F102.

(b) in FIG. 18 illustrates composited image data from the last time, already existing at this point in time.

(c) in FIG. 18 illustrates composited image data from the time before last, already existing at this point in time.

Note that these are examples of the input image, composited image data from the last time, and composited image data from the time before last, and the point in time in FIG. 13.

Process P1 is to be processing where drawing is not performed.

Accordingly, in the event that the column of interest is determined to be process P1, in step F107 no particular compositing processing is performed to reflect the pixels in the compositing results.

Columns regarding which process P1 is applied are the columns in the A1 region in FIG. 13, and accordingly nothing is drawn in the A1 region.

Process P2 is to be processing where pixel data is copied from the transitory motion valid region of the frame image data from this time.

Columns regarding which process P2 is applied are the columns in the A2 region in FIG. 13. This A2 region becomes a region in which there is no overlapping with the composited image data from the last time (and composited image data from the time before last). Accordingly, the pixels of the input image from this time can be reflected without change.

Figure 19:
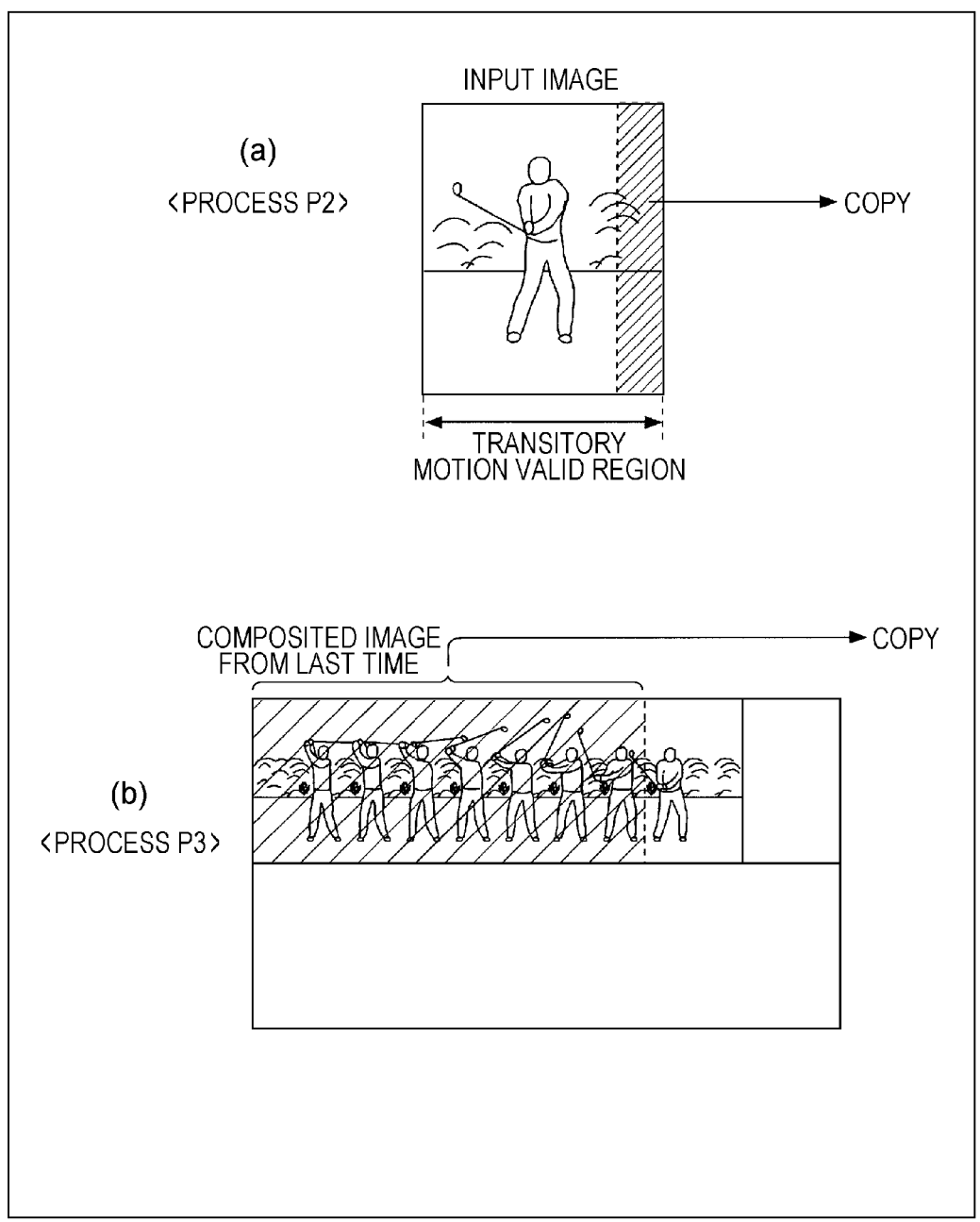
FIG. 19 is an explanatory diagram of processes P2 and P3 according to an embodiment.

Pixels corresponding to the A2 region are the pixels in each column indicated by hatching in the transitory motion valid region in the input image, as indicated in (a) in FIG. 19.

The pixels of each of these columns are copied as pixels of the A2 region in FIG. 13 without change.

Process P3 is to be processing where pixel data is copied from the composited image data from the last time.

Columns regarding which process P3 is applied are the columns in the A6 region and A7 region in FIG. 13. These A6 region and A7 region become regions in which there is no overlapping of the frame image data input this time with the transitory motion valid region. Accordingly, the pixels of the composited image data from the last time can be reflected without change.

Pixels corresponding to the A6 region and A7 region are the pixels in each column indicated by hatching in the composited image data from the last time, as indicated in (b) in FIG. 19.

The pixels of each of the columns of the composited image data from the last time are copied as pixels of the A6 region and A7 region in FIG. 13 without change.

Process P4 is to be processing where pixel data of the moving subject image (moving subject layer) of the frame image data from this time is copied upon the composited image data from the last time.

Columns regarding which process P4 is applied are the columns in the A5 region in FIG. 13. This A5 region becomes the back region of the frame image data input this time. This region is displayed such that only the moving subject of the frame image data this time is displayed overlapped on the composited image data from the last time.

Figure 20:
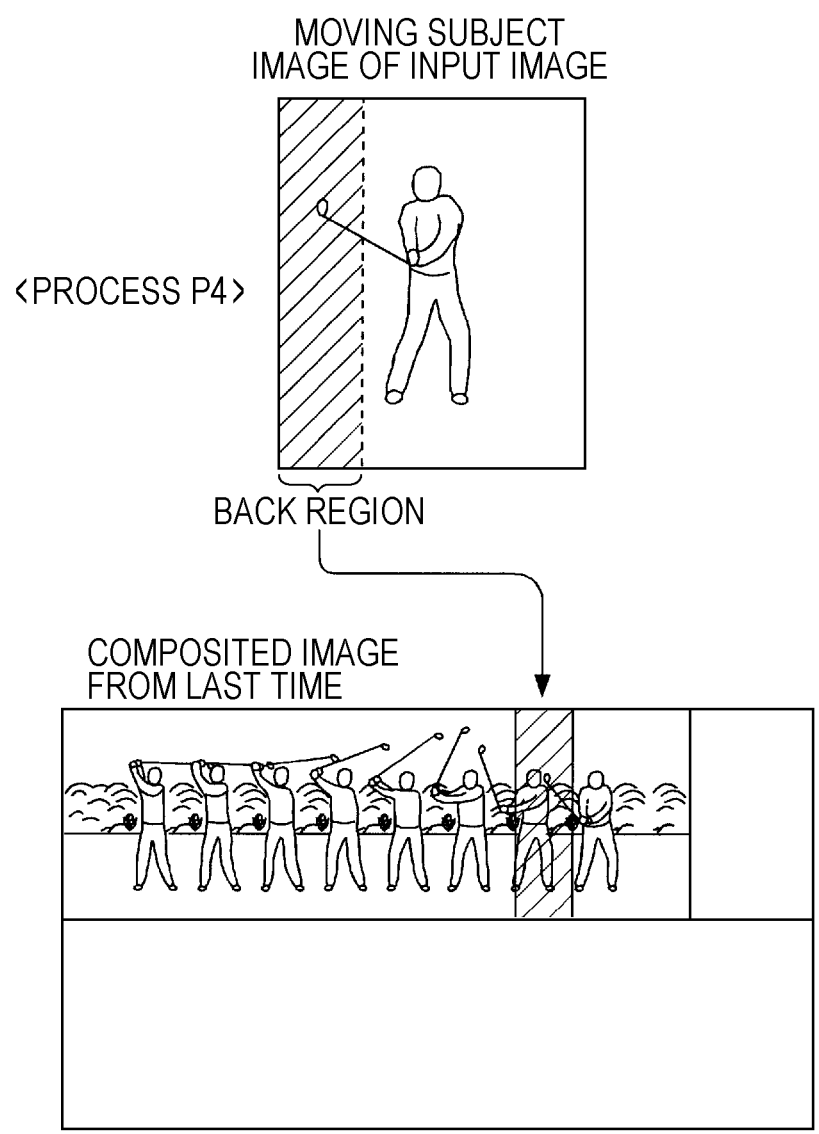
FIG. 20 is an explanatory diagram of process P4 according to an embodiment.

A moving subject image of the input image is shown at the upper tier in FIG. 20. This becomes a moving subject layer after having performed layer separation described with FIG. 3 regarding the input frame image data. That is to say, the layer processing unit 3 performs layer separation of the frame image data input this time using the moving subject information, by the functions of the layer separating unit 31, thereby generating an image of just the moving subject shown in the drawing (image without background).

Of the moving subject image in this FIG. 20, the hatched portion corresponds to the back region. In the pixels of each column falling in this back region, only the pixels making up the moving subject image are transferred to the portion corresponding to the A5 region of the composited image data from the last time shown in the lower tier in FIG. 20 (the hatched portion).

Thus, a state, in which moving subject pixels of the back region of the frame image data from this time have been transferred onto the composited image data from the last time, is reflected as composited image data of the A5 region in FIG. 13.

Process P5 is to be processing where the three layers of the moving subject image of the frame image data input this time, the moving subject image of the key frame from the last time, and the background image of the frame image data input this time, are composited.

Columns regarding which process P5 is applied are the columns in the A3 region in FIG. 13. This A3 region is a portion where the transitory motion valid region of the frame image data input this time and the composited image data from the last time overlap. Accordingly, the these layers are composited with order of priority shown in FIG. 21.

Figure 21:
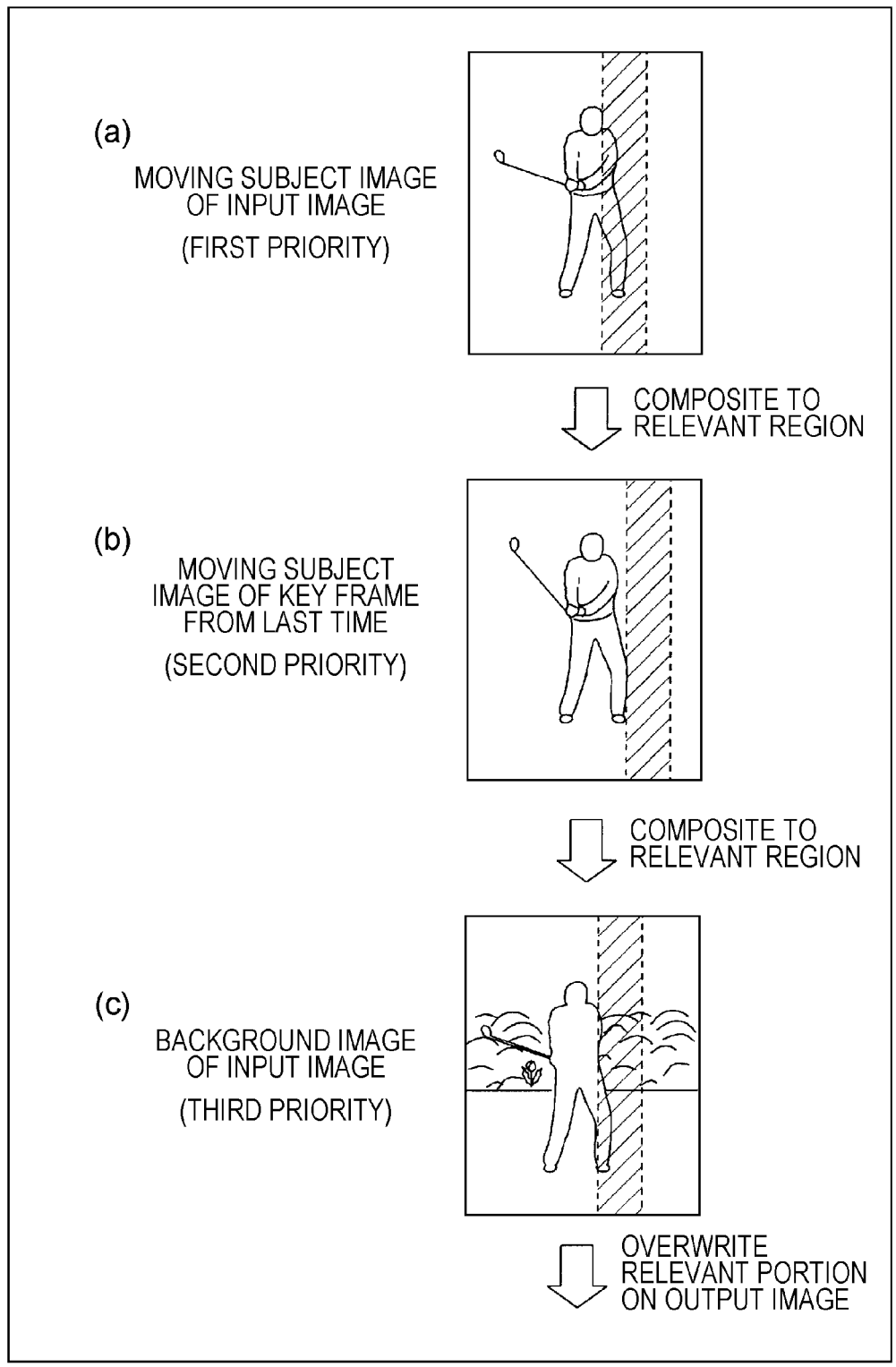
FIG. 21 is an explanatory diagram of process P5 according to an embodiment.

(a) in FIG. 21 shows the moving subject image (moving subject layer) in the input image. Also, (c) in FIG. 21 shows the background image (remaining background layer) in the input image.

The layer processing unit 3 performs the layer separation on the input frame image data described in FIG. 3 by the functions of the layer separating unit 31, the same as with the case of the process P4 described above, and thus obtains the moving subject image and background image.

Also, (b) in FIG. 21 shows the key frame at the time that the composited image data from the last time was generated, i.e., the moving subject image (moving subject layer) of the key frame from the last time. Note that the key frame image from the last time is included in the composited image data from the last time, but extracting of the moving subject image of the key frame from the last time can be extracted using the moving subject information corresponding to the key frame from the last time.

In (a), (b), and (c) in this FIG. 21, the portions corresponding to the region A3 on the image following compositing in FIG. 13 are indicated by hatching.

In the compositing processing of process P5, the pixels of the columns in the hatched portions in (a), (b), and (c) in this FIG. 21 are subjected to layer compositing with the moving subject image of the input image having first priority, the moving subject image of the key frame from the previous time having second priority, and the background image of the input image having third priority.

That is to say, pixels making up the moving subject in the hatched portion of (a) in FIG. 21 are given highest priority. For portions other than the pixels making up the moving subject in the hatched portion of (a) in FIG. 21, if there are pixels making up the moving subject in the hatched portion in (b) in FIG. 21, those pixels are applied. For pixel portions other than these, pixels making up the background image of (c) in FIG. 21 are applied.

Then, a state, in which the pixels of the three layers are composited, is reflected as composited image data of the A3 region in FIG. 13.

Process P6 is to be processing where the four layers of the moving subject image of the frame image data input this time, the moving subject image of the key frame from the last time, the moving subject image of the composited image data from the time before last, and the background image of the frame image data input this time, are composited.

Columns regarding which process P6 is applied are the columns in the A4 region in FIG. 13. This A4 region is a portion where the transitory motion valid region of the frame image data input this time and the composited image data from the last time and composited image data from the time before last overlap. Accordingly, the these four layers are composited with order of priority shown in FIG. 22.

Figure 22:
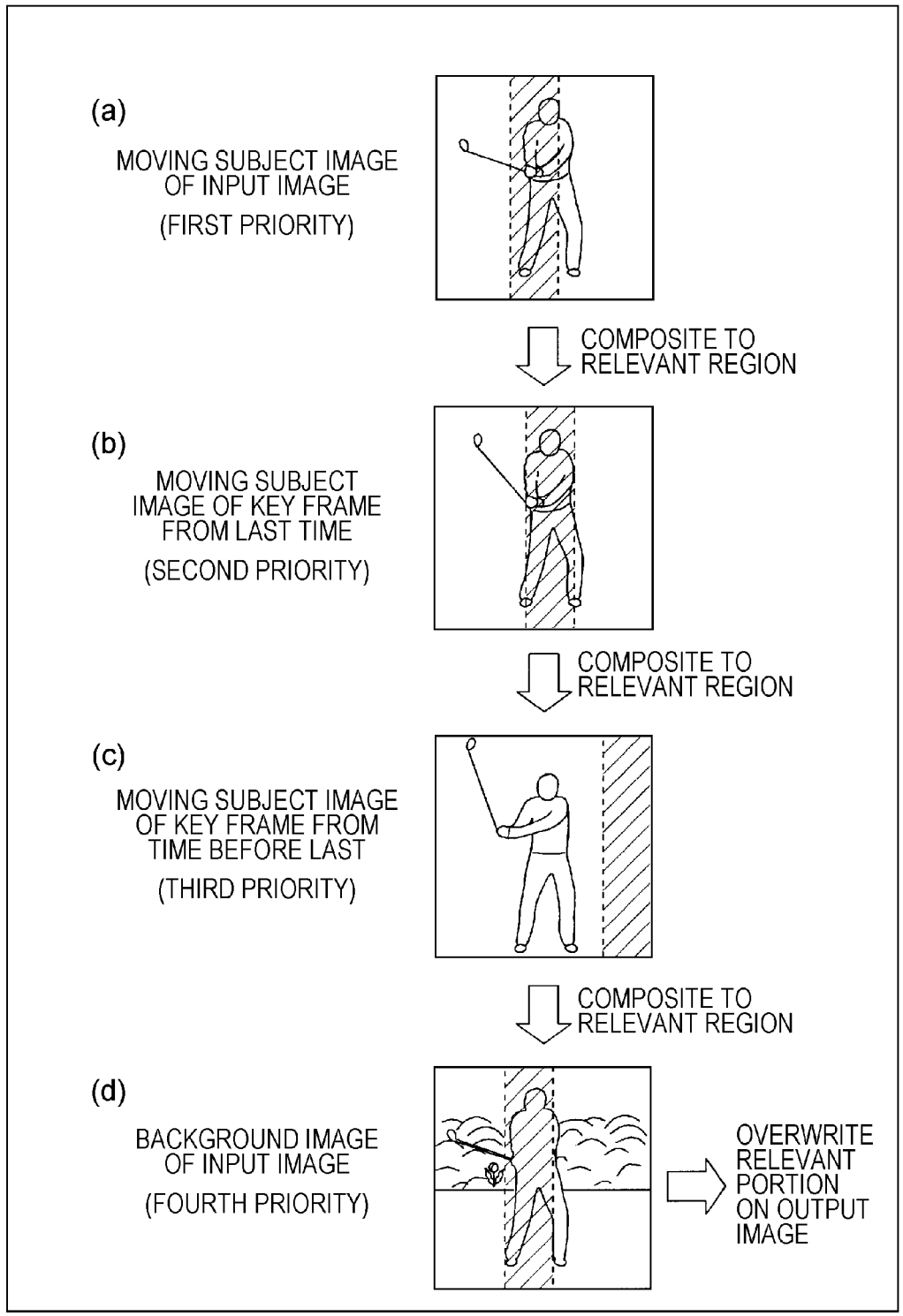
FIG. 22 is an explanatory diagram of process P6 according to an embodiment.

(a) in FIG. 22 shows the moving subject image (moving subject layer) in the input image. Also, (d) in FIG. 22 shows the background image (remaining background layer) in the input image.

Also, (b) in FIG. 22 shows the key frame at the time that the composited image data from the last time was generated, i.e., the moving subject image (moving subject layer) of the key frame from the last time.

Also, (c) in FIG. 22 shows the key frame at the time that the composited image data from the time before last was generated, i.e., the moving subject image (moving subject layer) of the key frame from the time before last.

The layer processing unit 3 performs the layer separation on the input frame image data described in FIG. 3 by the functions of the layer separating unit 31, the same as with the case of the process P4 described above, and thus obtains the moving subject image and background image. Also, the composited image data from the last time and composited image data from the time before last are extracted from the motion transition moving image of the key frame image from the last time and the motion transition moving image of the key frame image from the time before last, each using moving subject information.

In (a), (b), (c), and (d) in this FIG. 22, the portions corresponding to the region A4 on the image following compositing in FIG. 13 are indicated by hatching.

In the compositing processing of process P6, the pixels of the columns in the hatched portions in (a), (b), (c), and (d) in FIG. 22 are subjected to layer compositing with the moving subject image of the input image having first priority, the moving subject image of the key frame from the previous time having second priority, the moving subject image of the key frame from the time before last having third priority, and the background image of the input image having fourth priority.

That is to say, pixels making up the moving subject in the hatched portion of (a) in FIG. 22 are given highest priority. For portions other than the pixels making up the moving subject in the hatched portion of (a) in FIG. 22, if there are pixels making up the moving image in the hatched portion in (b) in FIG. 22, those pixels are applied. Further, if there is a portion where there are no pixels making up the moving subject in the hatched portion of (a)(b) in FIG. 22, and there are pixels making up the moving image in the hatched portion in (c) in FIG. 22, those pixels are applied. For pixel portions other than these, pixels making up the background image of (d) in FIG. 22 are applied.

Then, a state, in which the pixels of the four layers are composited, is reflected as composited image data of the A4 region in FIG. 13.

The compositing processing of process P1 through P6 is performed as described above.

In step F107 in FIG. 16, one of the above processes P1 through P6 is executed as the processing of the column of interest, in accordance with the process determination results of step F106.

Note that the processing of steps F106 through F109 may be repeated in increments of pixels rather than increments of columns.

At the point that processing of any one process is performed as to all columns (all pixels) to be subjected to compositing processing has been performed, composited image data such as shown in FIG. 13 for example, is completed.

At that point, the processing in FIG. 16 advances from step F110 to F111.

In step F111, the layer processing unit 3 supplies the composited image data to the image output unit 4. The image output unit 4 outputs the composited image data supplied thereto to the image recording/playing unit 40 as one frame making up a motion transition moving image.

Note that the image output unit 4 may output one composited image data continuously as multiple frames making up the motion transition moving image, in accordance with time needed for compositing processing or input intervals of the frame image data from the image input unit 10 or the like, or in accordance with to express a moving image which slowly transitions or the like.

In step F112, the processing branches depending on whether or not the frame image data processed this time was a key frame. That is to say, the processing is branched according to the determination result in step F103.

In the event that the frame image data processed this time was a key frame, in step F113 processing is performed to save the composited image data generated this time in the composited image updating/holding unit 5, so as to be used as the composited image data from the last time in the subsequent processing.

The composited image updating/holding unit 5 takes the composited image data from the last time held at that point in time to be composited image data from the time before last, and holds the composited image data newly supplied this time from the image output unit 4 as the composited image data from the last time. Note that moving subject information of the key frame and so forth are also stored therewith.

The flow then returns to step F101, and goes to processing of the next frame image data.

In the process of the processing of the above steps F101 through F113 being repeated for each input of frame image data, a motion transition moving image such as shown in FIG. 6 through FIG. 15 is output.

That is to say, the image recording/playing unit 40 performs recording processing and display processing by the output of the composited image data by the image output unit 4 in step F111.

First, each time that frame image data is input and image compositing is performed, in step F111 the composited image data is output to the display driver 44 of the image recording/playing unit 40 as one frame making up a moving image.

The display driver 44 displays this composited image data on the display unit 45 as one frame of the moving image. As a result, a motion transition moving image such as shown in FIG. 6 through FIG. 15 is output for display to the display unit 45.

That is to say, the process of compositing processing is displayed as it is.

Also, each composited image data is recorded by the output in step F111.

That is to say, the composited image data from the image output unit 4 is supplied to the recording/playing processing unit 42 as recording frame image data.

The recording/playing processing unit 42 processes each of these recording frame image data as each of the frames making up the motion transition moving image, and controls the operations of the recording medium driving unit 43 so as to record in the recording medium as a series of moving image data.

The recording frame image data recorded in the recording medium by the processing of the recording/playing processing unit 42 in FIG. 23 will be described.

Figure 23:
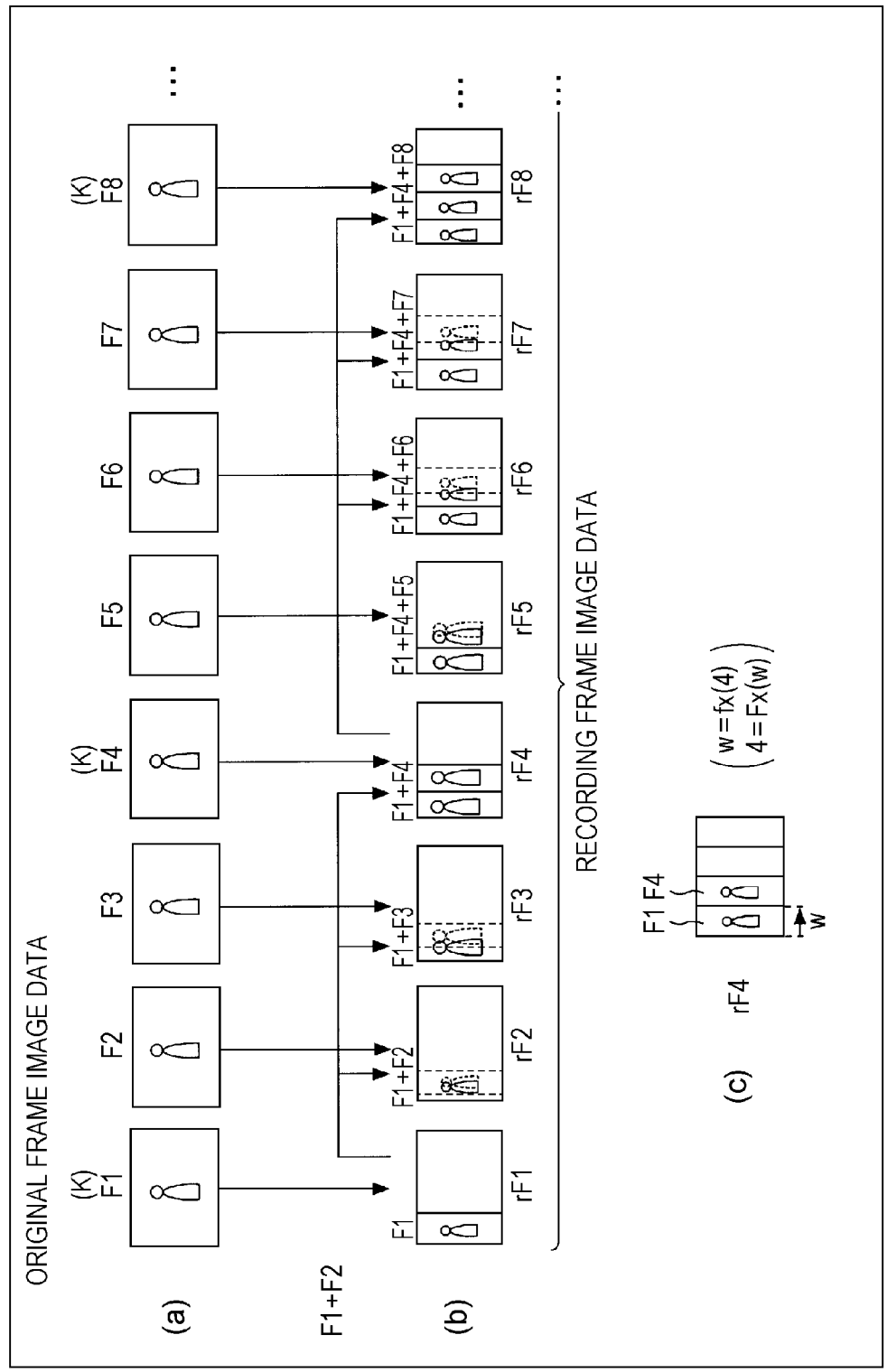
FIG. 23 is an explanatory diagram of an image frame recorded/displayed according to an embodiment.

(a) in FIG. 23 schematically illustrates original frame image data F1, F2, . . . , input to the input image selecting unit 2.

In the processing described above, at the point in time that each of the frames F1, F2, F3 . . . is input, compositing processing is performed for each, and each composited image data (rF1, rF2 . . . ) shown in (b) in FIG. 23 is generated.

Each composited image data in this (b) in FIG. 23 is one frame of image data such as shown in FIG. 6 through FIG. 15, for example.

This composited image data is recorded in the recoding medium as recording frame image data rF1, rF2, rF3 . . . .

Accordingly, each frame forming the series of the moving image as the motion transition moving image is saved.

Note that, as can be seen from this (b) in FIG. 23, not only the composited image data at the time of compositing the key frames, but also the composited image data at the time of compositing the non key frames as well, are recorded as one of the recording frame image data.

In the event that determination is made in step F101 that acquisition of all frames has ended, the processing advances to step F114, the compositing processing ends, and the image output unit 4 ends output of the composited image data. Alternatively, the display unit 45 may continue output of the composited image data of the final frame, such as in FIG. 15, for example. That is to say, the state on the display unit 14 is that where the motion transition moving image of FIG. 6 through FIG. 15 is completed and the final image in FIG. 15 is maintained.

Also, at the point in time, all composited image data so far is in a state of having been recorded in the recording medium as recording frame image data.

According to the above processing, both accurate expression of the moving subject by enlarging the operable range, and detailed expression of motion transition in the temporal direction by arraying a great number of moving subjects, can be realized in automatic generating of a motion transition image.

Particularly, layer compositing accurately expresses each moving subject image without loss of the tip of the golf club for example, and moreover, a great number of moving subject images can be arrayed and motion transition can be expressed in temporally fine intervals.

Accordingly, one's own sport formation, complex movements of wild animals, natural phenomena in a laboratory, and so forth, can be easily and very comprehensibly confirmed. Also, there is no need for manual labor such as cutting and pasting image data, so the user burden is extremely light, and this is very useful.

Also, a motion transition image can be generated and output for display. This motion transition moving image outputs composited image data of each point in time as a moving image, so the visual effects are high, and transition of motion has been comprehensibly captured therein.

Also, by recording the composited image data at each point in time as recording frame image data for the motion transition moving image in the recording medium, the image compositing processes can be dynamically displayed by playing at a later point, so the correlation among the individual images that are composited can be communicated to the user in a manner that is readily understood.

Particularly, playing of the motion transition moving image and playing of images at each motion stage can be performed with operations which are intuitively comprehensible to the user, such as in later-described examples of dragging operations, flicking operations, and pointing operations described later.

Also, with the generating processing example described above, efficient processing is realized by performing compositing processing based on process determination. That is to say, compositing processing in processes P5 and P6 involving composing of layers of three layers and four layers is processing with a relatively great processing load, but these are executed at only necessary pixel regions. Also, regions which are unnecessary in layer compositing can be handled with simple copying processing such as the processes P1, P2, P3, and so forth. Accordingly, processing can be made more efficient and the processing load can be reduced.

Description will be made regarding processing in steps F108 and step F109 in FIG. 16.

The copy processing in step F109 is processing for copying the moving subject at the end of the upper tied as the first moving subject of the lower tier, at the point in time in FIG. 14, for example.

As shown in FIG. 14, a predetermined range of the right edge of the upper tier of the composited image data (in the case of moving from the left to the right) is set as a lower tier copy range.

The layer processing unit 3 then performs process determination, and in step F108 determines whether or not each column (or pixels) composted to the composited image data falls within the lower tier copy range (i.e., the last region of the upper tier). In the event that this falls within the lower tier copy range, in step F109, the pixels of that column are copied to the corresponding position of the lower tier.

By performing this processing, at the time of compositing the image of the lower tier copy range at the upper tier, the same image is composited at the lower tier at the same time, as shown in FIG. 14.

In the display of the motion transition moving image, the same image is displayed at the same time for the last moving subject in the upper tier in FIG. 14 and the first moving subject at the lower tier.

By performing such processing, the moving subject at the lower tier copy range is accurately expressed without a partial interruption. That is to say, depending on the state of the subject, the position of the last image at the upper tier may be interrupted, but even such a subject is appropriately displayed at the lower tier. Also, accordingly, motion transition at the upper tier and motion transition at the lower tier transition in manner that is easy to visually comprehend.

Note that the processing of such steps F108 and F109 is processing necessary only in the case of displaying multiple tiers of motion transition image on the screen, as in the example in FIG. 6 through FIG. 15.

For example, compositing processing may be performed where all are arrayed in the horizontal direction (without making two or more tiers) as a horizontally elongated image, and in this case the processing of steps F108 and F109 is unnecessary.

It is sufficient for the image processing device 1 according to the present embodiment which performs the above processing to be able to acquire multiple frame image data imaged by an imaging apparatus capable of imaging consecutive still images or a moving image. For example, this may be built into an imaging apparatus, or may be built into a playing device which plays multiple frame image data that have been imaged. Further, the this may be built into a device which performs reception/transfer input of the multiple imaged frame image data.

Accordingly, this can be broadly applied to, for example, cellular phones, PDAs (Personal Digital Assistant), personal computers, video players, video editors, and so forth.

[3. Processing Example of Playing Display of Motion Transition Image]

<3-1: Dragging Operation>

As described above, composited image data (recording frame image data) making up a motion transition image is recorded in a recording medium at the time of compositing processing.

By playing and displaying the recording frame image data recorded in this recording medium, the user can optionally view the motion transition image as a moving image even at a point after the compositing processing has ended.

That is to say, in the event that playing of the motion transition image has been instructed by user playing operations from an unshown operating unit, or from the touch panel 46 in accordance with displayed contents, the UI control unit 41 instructs the recording/playing processing unit 42 to perform playing processing.

Thereupon, the recording/playing processing unit 42 causes recording frame image data rF1, rF2 . . . as shown in (b) in FIG. 23 that has been recorded in the recording medium, to be read out to the recording medium driving unit 43, and playing processing is performed and supplied to the display driver 44.

The display driver 44 sequentially displays each supplied recording frame image data rF1, rF2 . . . on the display unit 45.

Thus, a motion transition moving image such as shown in FIG. 6 through FIG. 15 is displayed on the display unit 45.

Accordingly, the user can view not only just the still image serving as the motion transition image such a in FIG. 15, but also can view an image such as a swing form at an optional point, of FIG. 6 through FIG. 15 as a moving image.

With the present example, the user is enabled to view an image of a state which the user desires to view, not only playing of such a motion transition moving image.

For example, in the event of playing the motion transition moving image in FIG. 6 through FIG. 15, the UI control unit 41 plays the series of recording frame image data rF1, rF2 . . . as a moving image, and then continues display output of the recording frame image data rF(z) of the final frame in FIG. 15.

Now, the recording frame image data rF(z) of the final frame such as in FIG. 15 is an image where only key frames are arrayed in generally equidistant intervals.

There will also be cases where the user will want to review between key frame and key frame (i.e., non key frame images).

Accordingly, the present example enables the user to easily view an image of a stage of which viewing is desired, by user operations using the touch panel 46.

First, as an operation technique thereof, a dragging operation will be described.

Figure 24:
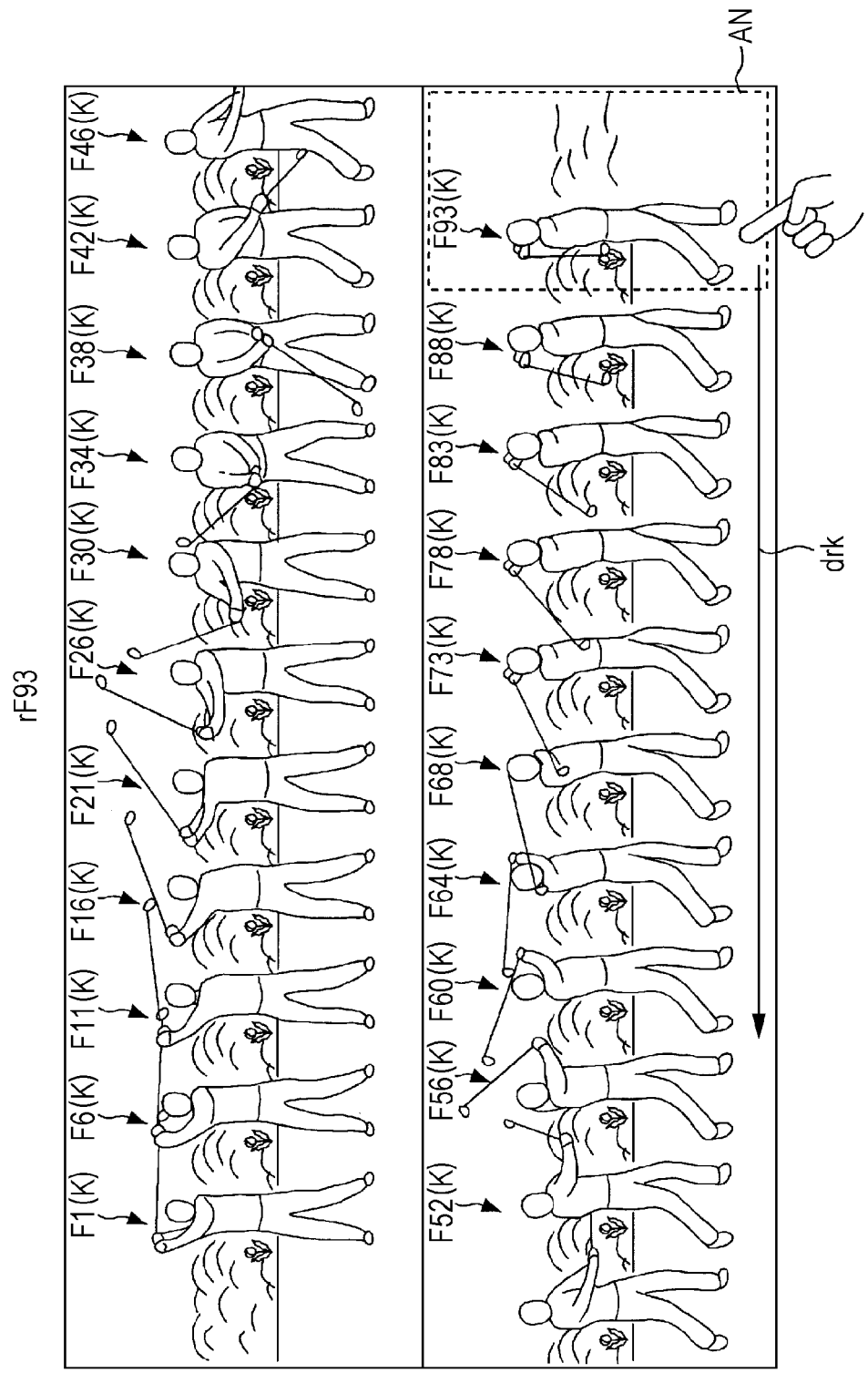
FIG. 24 is an explanatory diagram of a dragging operation according to an embodiment.

FIG. 24 illustrates a state in which recording frame image data rF93 of the final frame is displayed.

Note that this recording frame image data rF93 is composited image data where key frames F1, F6, F11 . . . F93 serving as original frame image data have been composited as shown in the drawing. With respect to the above-described compositing processing, this is due to compositing processing of the frame F93 with the already-existing composited image data (composited image of key frames F1 through F88) at the point in time when the original frame image data F93 was input.

This composited image data is recorded in the recording medium as recording frame image data rF93.

This FIG. 24 illustrates a state in which, for example, the user has played the motion transition moving image, and after moving image playing has been completed, this recording frame image data rF93 which is the final frame is being continuously output for display.

Now, we will say that a region AN indicated by a dashed line frame is the region of the newest frame image data F93 of that displayed.

Note that "newest frame image data" in this case refers to the last frame image data on the temporal axis out of the original frame image data in the display before compositing. Here, the playing image being displayed is non other than the recording frame image data rF93 which is the composited image data, but the region AN of the "newest frame image data" is a region where the moving subject and background image have been placed form the original frame image data F93.

As one example, the region AN of the newest frame image data may be a range of the transitory motion valid region for the frame this time in the case of FIG. 13 (A2 through A5), for example. Alternatively, the range of the regions A3 and A4 where the moving subject is primarily situated may be set as this.

At this time, let us say that the user has performed a dragging operation drk of tracing over the display screen with a finger, from within the region AN toward the left direction, as an operation as to the touch panel 46.

Figure 25:
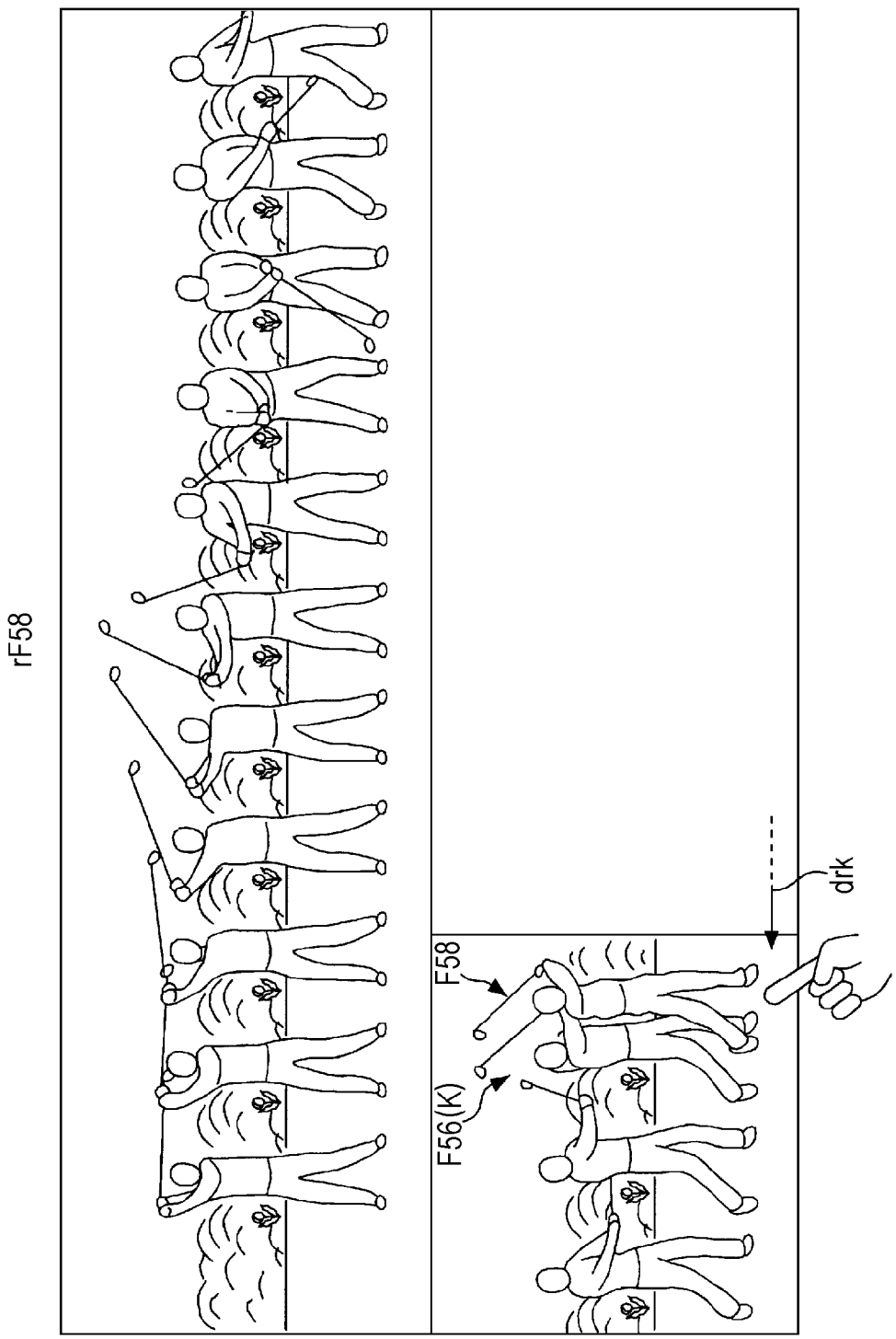
FIG. 25 is an explanatory diagram of a dragging operation according to an embodiment.

As a result, the image being played changes in accordance with the dragging operation drk as shown in FIG. 25. That is to say, a playing image corresponding to the ending position of the dragging operation is output.

With this example, if we say that the ending position of the dragging operation is a position corresponding to the original frame image data F58, up to the composited image data at the time of the original frame image data F58 being composited (recording frame image data rF58) is played.

That is to say, the frames are played in reverse direction on the temporal axis, from the continuous output state of the recording frame image data rF93 to the recording frame image data rF92→rF91→rF90→ . . . , in accordance with the dragging operation. A so-called reverse playing screen is executed in accordance with the pressing position of the finger moving. If the position where the user stops the dragging operation us a position corresponding to the recording frame image data rF58 for example, this reverse playing stops at the state in FIG. 25, and the output of the recording frame image data rF58 is maintained. That is to say, the display is a still image state.

Figure 26:
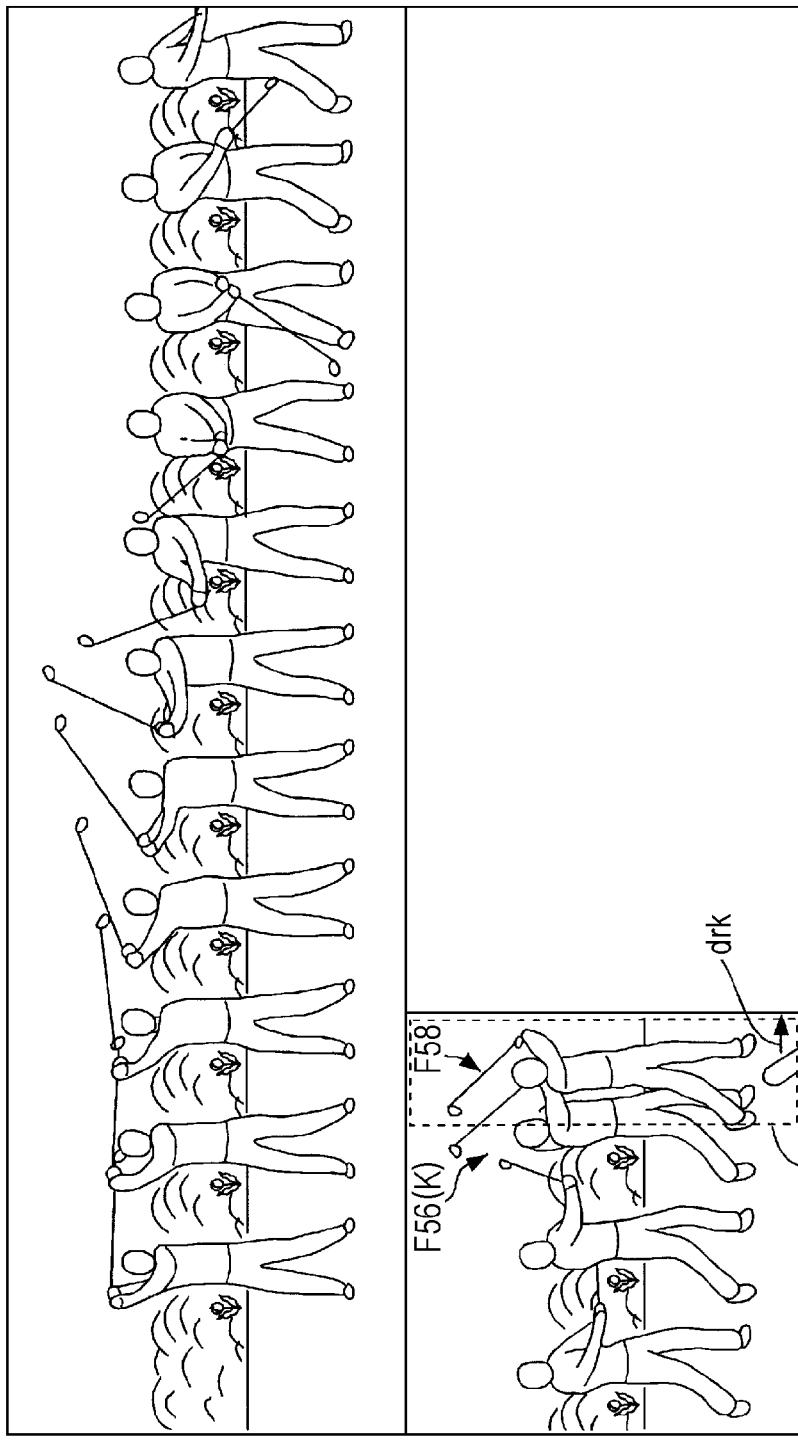
FIG. 26 is an explanatory diagram of a dragging operation according to an embodiment.

Let is say that the user further then performs a dragging operation on the display in FIG. 25 from the newest frame image data region in that display state. As shown in FIG. 26, the region of the original frame image data F58 then becomes the region AN of the newest frame image data.

Let us say that a finger is applied within this region AN and a dragging operation drk is performed just a little to the right.

Figure 27:
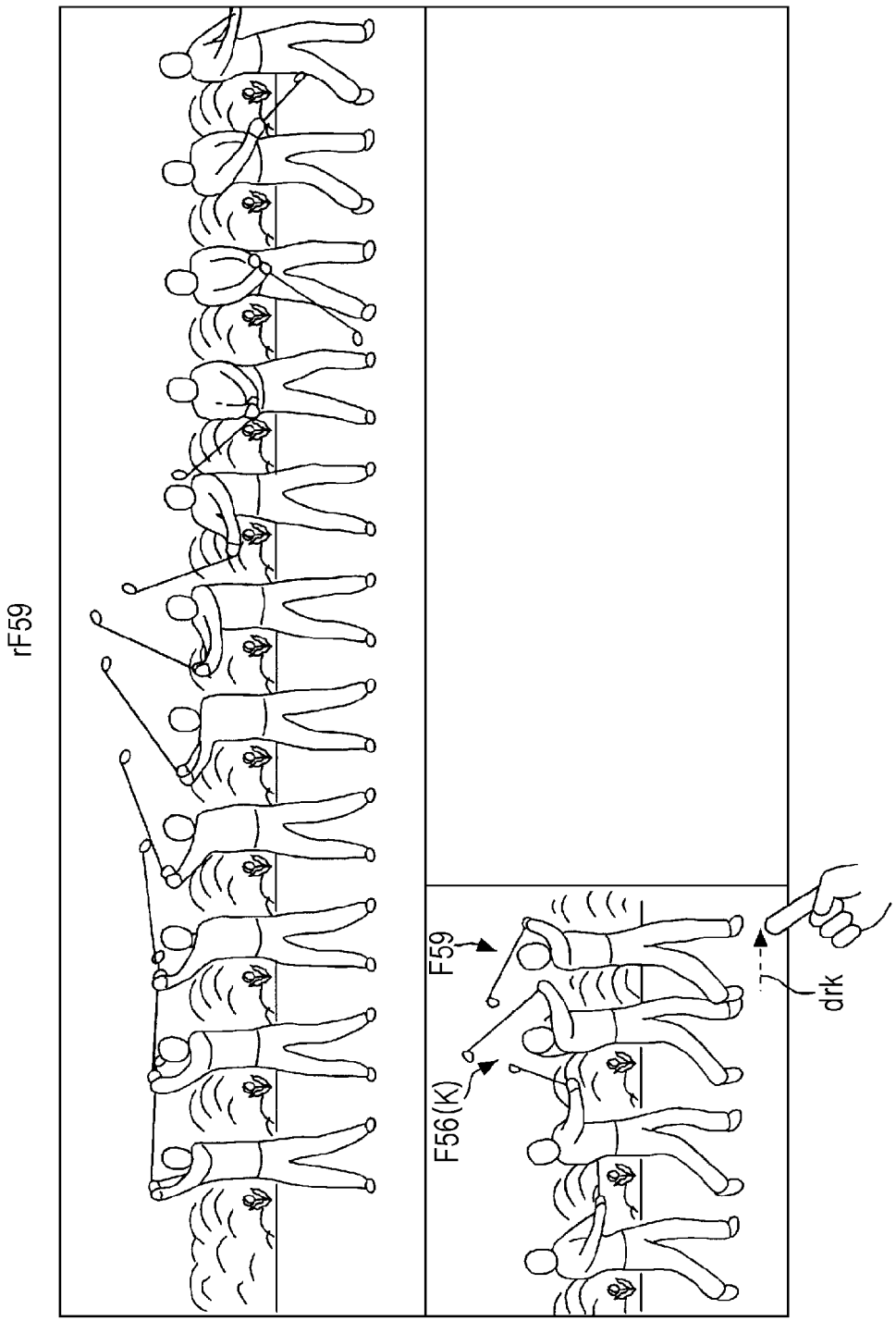
FIG. 27 is an explanatory diagram of a dragging operation according to an embodiment.

If we way that the ending position of that dragging operation is a position corresponding to the original frame image data F59, the recording frame image data rF59 which is the composited image data at the time of input of the original frame image data F59 is played, as in FIG. 27. That is to say, this will be playing where the moving image advances in the forward direction by one frame.

The user can easily play images a stages which the user desires to view from the motion transition image, by dragging operations, as in this FIG. 24 through FIG. 27, for example.

That is to say, during the dragging operation, the moving image can be viewed playing in the forward direction or reverse direction in accordance with the speed of the tracing with the finger, and when the dragging operation ends, a still image corresponding to that ending position can be viewed.

Note that the original frame image data F58 and F59 in the above example are non key frames. As described with FIG. 23, not only composited image data at the time of key frame input but also composited image data at the time of non key frame input is recorded indiscriminately as recording frame image data making up the series of moving image. Accordingly, whether or not the original frame image data was a key frame is irrelevant at the time of playing.

In other words, by recording the composited image data indiscriminate of whether key frame or non key frame enables the user to optionally view images of each state of all original frame image data.

Figure 28:
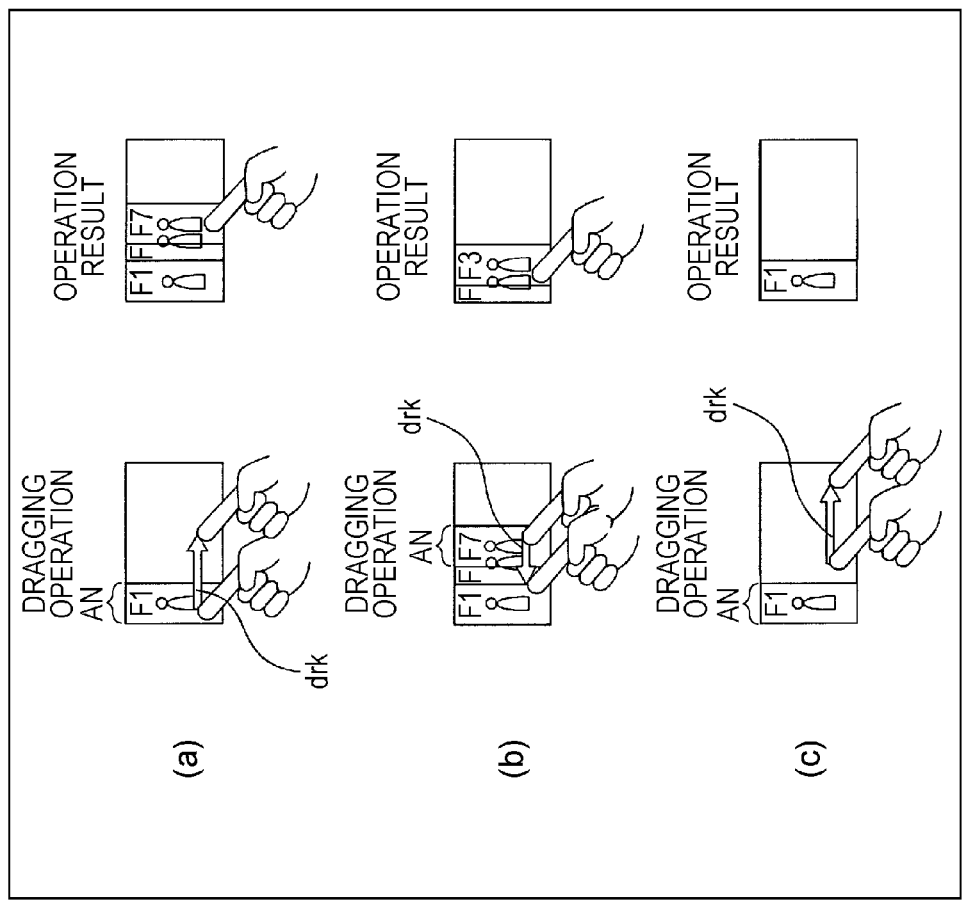
FIG. 28 is an explanatory diagram of cases of dragging operations according to an embodiment.

Display change in accordance with dragging operations is summarized in FIG. 28.

As shown in (a) in FIG. 28, the user performs a dragging operation drk to the right from within the region AN of the newest frame image data on the display, whereby up to the frame corresponding to the ending position of that dragging operation is played displayed as the result of the operation. On the screen this is visually recognized a visual representation of the images of the moving subject being unfolded.

As shown in (b) in FIG. 28, the user performs a dragging operation drk to the left from within the region AN of the newest frame image data on the display, whereby up to the frame corresponding to the ending position of that dragging operation is played displayed in reverse as the result of the operation. On the screen this is visually recognized a visual representation of the images of the moving subject being folded.

On the other hand, (c) in FIG. 28 illustrates a case of the user performing a dragging operation drk at a portion other than within the region AN of the newest frame image data on the display. In this case, one conceivable example would be to invalidate the dragging operation, with no change in the playing image on the display.

Of course, even in such a case, a processing example can be conceived in which playing of each recording frame image data up to the ending position of the dragging operation is performed, for example, may be conceived.

Processing will be described as a playing processing example according to a dragging operation such as described above.

We will say that the processing described below is processing for the UI control unit 41 to control the recording/playing processing unit 42 and so forth in accordance with input at the touch panel 46.

The UI control unit 41 executes playing of recording frame image data at a frame position forward or backward from the frame position of the recording frame image data currently being played and output, in accordance with the dragging operation detected by the touch panel 41.

Note that the correlation between the position on the display (position on the touch panel) and the frame position is comprehended as follows.

Description will be made assuming that the motion transition image is all arrayed in the horizontal direction on one tier as shown in FIG. 28, rather than a display in 2 tiers as shown in FIG. 24.

In this case, we will consider x coordinates as horizontal-direction coordinates on the screen of the display unit 45 (on the touch panel 46).

We will say that, with regard to the series of original frame image data, the x coordinate of the n'th frame Fn is $$x=fx(n).$$

Also, we will say that the inverse transform function thereof is $$N=Fx(x).$$

By using the x coordinate on the touch panel 64, and the function of the frame number n, the recording frame image data to be played can be determined in accordance with the amount of movement of the dragging operation.

Now, as can be understood from the description of FIG. 23, the recording frame image data to be played which corresponds to the position of the original frame image data "F1" is "rF1". In the same way, the recording frame image data to be played which corresponds to the position of the original frame image data "F2" is "rF2". This holds for the subsequent frames as well.

The above function is reasoned as follows.

For example, we will say that the recording frame image data rF4 in (c) in FIG. 23 corresponds to the original frame image data F4, and that the x coordinate value of the drawing position within the recording frame image data rF4 of the original frame image data F4=w.

In this case, since the x coordinate value=w, and the frame number n=4, $$w=fx(4)$$

$$4=Fx(w)$$

hold.

The frame number "4" thus obtained is the frame number of the original frame image data F4, and this indicates the recording frame image data rF4 as a frame number to be played.

Also, in the event of a motion transition moving image in two upper and lower tiers as in FIG. 24, function processing may be performed using a vertical direction y coordinate, but if we say that the x coordinates continue as a continuation from the upper tier to the lower tier without change, the above function can be applied as it is. For example, this is a case where the upper tier has x coordinates of 0 through n and the lower tier has x coordinates of n+1 through m, so that x coordinates of 0 through m have been set. In this case, the y coordinates on the touch panel 46 only need to be used to determine whether the upper tier or lower tier.

Figure 29:
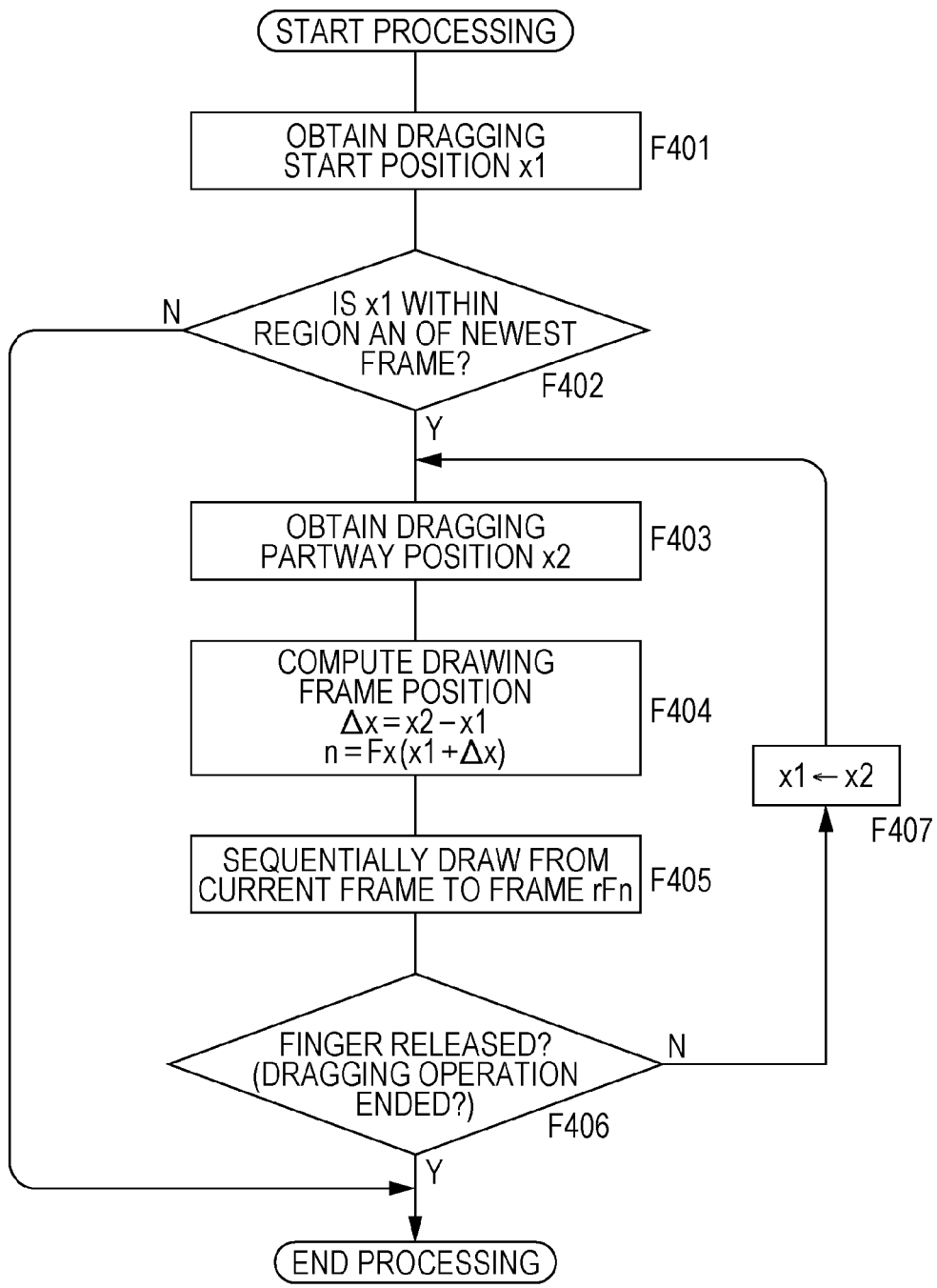
FIG. 29 is a flowchart of processing corresponding to dragging operations according to an embodiment.

FIG. 29 illustrates a processing example of the UI control unit 41, as dragging operation corresponding processing.

In the event that an operation by the touch panel 46 has been detected when playing a certain recording frame image data rFm, in step F401 the UI control unit 41 first obtains x coordinate value x1 as the dragging start position. That is to say, the position where the user first touches the touch panel 46 is taken as the dragging start position, and the x coordinate value thereof is detected.

In step F402, the UI control unit 41 determines whether or not the dragging start position x1 is within the region AN of the newest frame image data in the displayed contents at that point in time.

As shown in (c) in FIG. 28, in the event that the dragging start position x1 is not within the range of the region AN, this dragging operation is invalidated, so in this case the dragging operation corresponding processing of FIG. 29 ends from step F402.

On the other hand, in the event that the dragging start position x1 is within the region AN, the processing of steps F403 through F405 is performed.

In step F403, the UI control unit 41 obtains a dragging partway position x2. That is to say, the x coordinate value of the touch position at this point in time, serving as the touch panel pressing position to which the user has moved by shifting the finger from the dragging start position x1.

In step F404 the UI control unit 41 performs computation of the frame position to draw.

Calculation of $$\Delta x = x2-x1$$

is performed as the dragging movement amount Δx in this case.

Note that in the case of performing a dragging operation to the right direction as in (a) in FIG. 28, the dragging movement amount Δx is a positive value, and in the case of performing a dragging operation to the left direction as in (b) in FIG. 28, the dragging movement amount Δx is a negative value. (case of the motion transition progressing from the left to the right, and the x coordinate value has 0 for the screen left edge and progresses to the right with a positive value)

That is to say, the positive/negative of the dragging movement amount Δx represents the direction of dragging, and the dragging movement amount Δx in this case is a value which represents the dragging direction along with the dragging movement amount.

Then, the frame number n is obtained by function computation of n=Fx (x1+Δx).

Up to the recording frame image data rFn of the frame number n is the frame to be played in accordance to the dragging operation in that time increment.

Accordingly, in step F405 the UI control unit 41 controls the recording/playing processing unit 42 and display driver 44 to execute frame drawing.

That is to say, from a certain recording frame image data rFm being displayed at the point of starting dragging, up to the recording frame image data rFn of the frame number n, is played.

In this case, if rFm<rFn, the recording/playing processing unit 42 performs processing to read each recording frame image data out from the recording medium in the order of recording frame image data rFm→rF(m+1)→rF(m+2) . . . rFN, and supplies this to the display driver 44. The display driver 44 sequentially displays the supplied recording frame image data rFm through rFN on the display unit 45.

Thus, display such as shown in (a) in FIG. 28 is executed.

Also, if rFm>rFn, the recording/playing processing unit 42 performs processing to read each recording frame image data out from the recording medium in the order of recording frame image data rFm→rF(m−1)→rF(m−2) . . . rFN, and supplies this to the display driver 44. The display driver 44 sequentially displays the supplied recording frame image data rFm through rFN on the display unit 45.

Thus, display such as shown in (b) in FIG. 28 is executed.

In step F406, the UI control unit 41 determines whether or not the user has released the finger, i.e., whether or not the dragging operation has ended.

In the event that the dragging operation has ended, the processing ends. In this case, the UI control unit 41 instructs the recording/playing processing unit 42 and display driver 44 to thereafter continue output of the frame image data rFn at the point of ending the dragging operation.

On the other hand, in the event that the dragging operation is continuing, in step F407 the value of x2 is substituted into x1. That is to say, the partway position x2 at the point in time is deemed to be the dragging start position x1 at the next time increment. The flow returns to step F403 again and performs processing of steps F403 through F405 in the same way. Accordingly, playing corresponding to dragging operations still continuing is performed.

By the processing of steps F403 through F405 being performed each time increment, images are unfolded and folded such as in (a) and (b) in FIG. 28, in accordance with continuing motion of finger of the user as a dragging operation.

That is to say, the UI control unit 41 detects dragging operation amount and dragging operation direction detected by the touch panel 41 each time increment. If we say that the frame position of the recording frame image data currently being played and output is the start frame position, the end frame position which is a frame position forward or backward from that start frame position is then determined. Each recording frame image data from the start frame position to the end frame position is then sequentially played.

Due to such dragging corresponding processing, composited image data at each state serving as a motion transition image is played, thereby enabling the compositing process of the image to be dynamically displayed, and also a plying image at a stage in the compositing process which the user desires to view can be provided with easy operations for the user.

Particularly, more intuitive operations can be realized by correlating a position on the temporal axis of the moving image, and a position on the temporal axis according to the touch panel.

Note that an arrangement may be made where determination of step F402 in FIG. 29 is done away with, and even dragging operations outside of the region AN are not invalidated by the above playing processing is performed according to the dragging operation amount and direction. In this case, it can be conceived to take the dragging start position x1 to be the position of the region AN at that point in time.

<3-2: Flicking Operation>

Next, a flicking operation will be described as an example of another operation.

A flicking operation is an operation in which the user flicks over the touch panel 46 with a finger.

Figure 30:
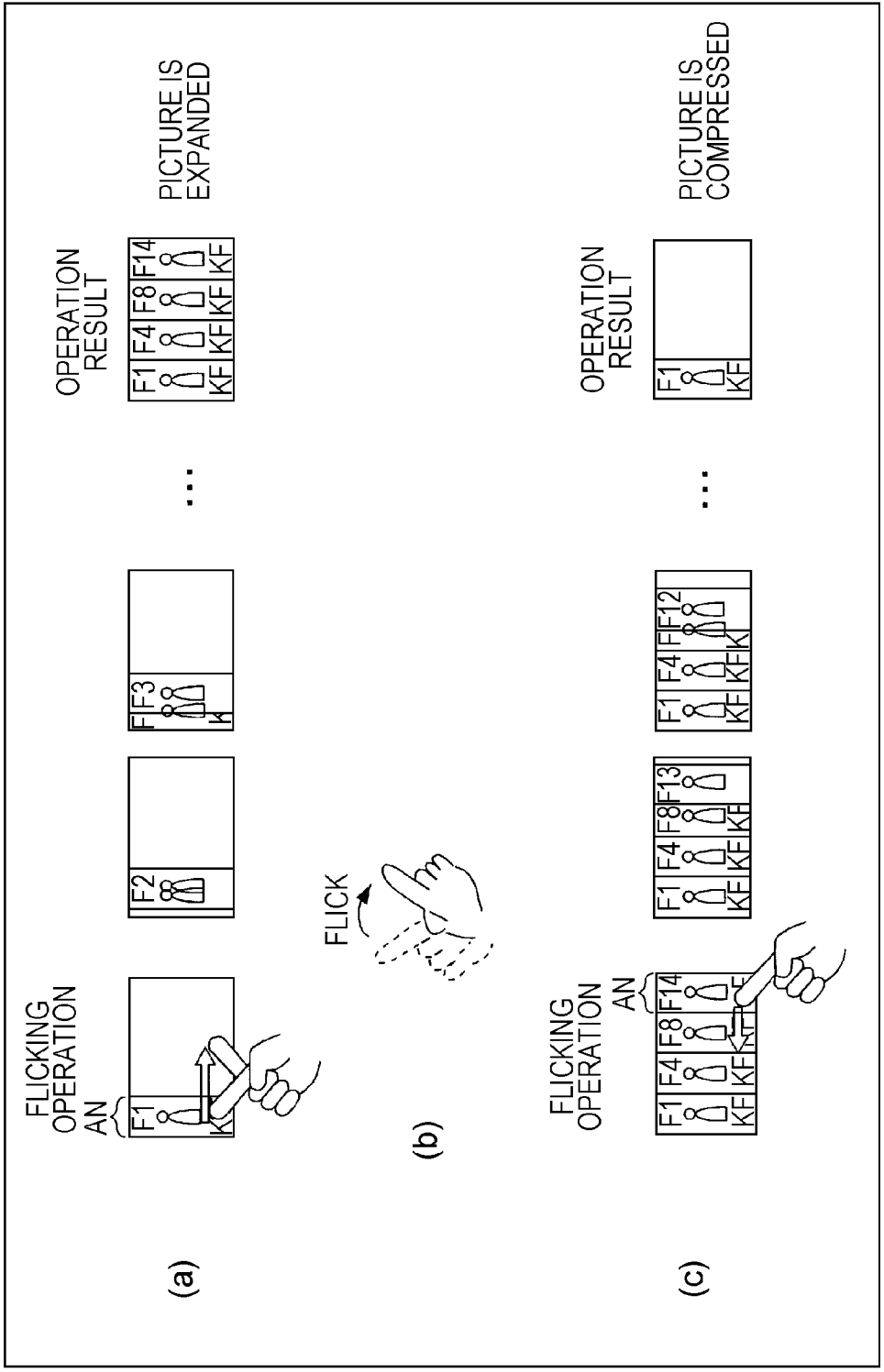
FIG. 30 is an explanatory diagram of a flicking operation according to an embodiment.

FIG. 30 shows a playing form according to a flicking operation.

Let us say that, as shown in (a) in FIG. 30, the user performs a flicking operation to the right from within the region AN of the newest frame image data on the display. That is to say, flicked to the right within the region AN as shown in (b) in FIG. 30.

In this case, up to the predetermined frame corresponding to that flicking operation is played displayed as the result of the operation. On the screen this is visually recognized a visual representation of the images of the moving subject being unfolded.

Also, as shown in (c) in FIG. 30, in the event that the user performs a flicking operation to the left from within the region AN of the newest frame image data on the display, whereby up to the frame corresponding to the ending position of that flicking operation is played displayed in reverse as the result of the operation. On the screen this is visually recognized a visual representation of the images of the moving subject being folded.

Now, while not shown in the drawings, in the event that the user performs a flicking operation at a portion other than within the region AN of the newest frame image data on the display, one conceivable example would to invalidate the flicking operation, with no change in the playing image on the display.

Of course, even in such a case, a processing example can be conceived in which playing of each recording frame image data is performed according to the flicking operation.

The UI control unit 41 thus executes playing of recording frame image data at a frame position forward or backward from the frame position of the recording frame image data currently being played and output, in accordance with the flicking operation detected by the touch panel 46.

Figure 31:
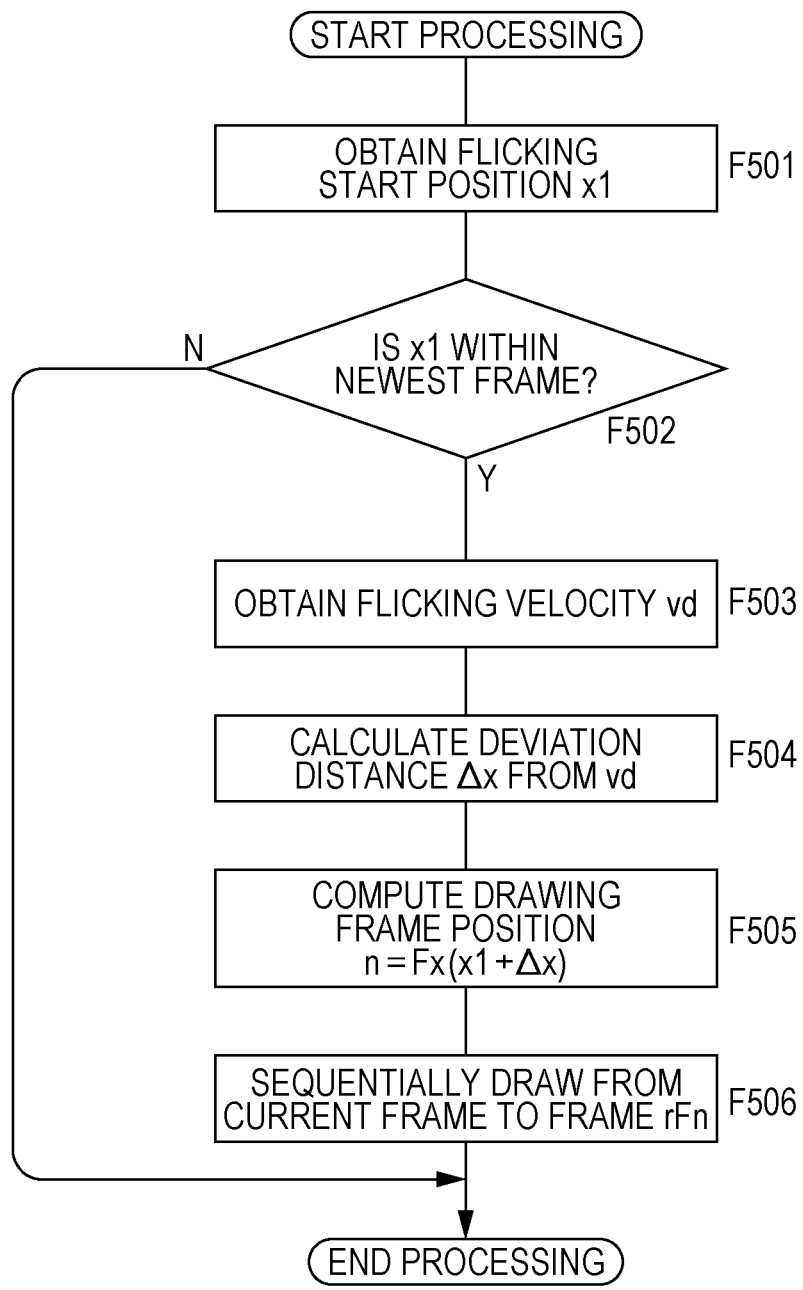
FIG. 31 is a flowchart of processing corresponding to flicking operations according to an embodiment.

FIG. 31 illustrates an example of flicking operation corresponding processing by the UI control unit 41.

In the event that an operation by the touch panel 46 has been detected when playing a certain recording frame image data rFm, in step F501 the UI control unit 41 first obtains x coordinate value x1 as the flicking operation position. That is to say, the position where the user first touches the touch panel 46 is taken as the flicking operation position, and the x coordinate value thereof is detected.

In step F502, the UI control unit 41 determines whether or not the flicking operation position x1 is within the region AN of the newest frame image data in the displayed contents at that point in time.

In the event that the flicking operation position x1 is not within the range of the region AN, this flicking operation is invalidated, so in this case the flicking operation corresponding processing of FIG. 31 ends from step F502.

On the other hand, in the event that the flicking operation position x1 is within the region AN, the flow advances to step F503.

In step F503, the UI control unit 41 obtains a flicking speed vd. For example, at the time of performing the flicking operation, the flicking speed Vd is calculated from minute change amount of the x coordinate of the pressing position over a certain increment of time.

Note that in the case that the flicking direction is to the right direction (the case of (a) in FIG. 30), the flicking speed Vd is made to be a positive value. Also, in the case that the flicking direction is to the left direction (the case of (c) in FIG. 30), the flicking speed Vd is made to be a negative value.

Next, in step F504 the UI control unit 41 calculates positional change distance Δx in accordance with the flicking speed Vd. This positional change distance Δx as used here corresponds to the number of frames to be played.

For example, the number of frames is correlated as to an absolute value of the flicking speed Vd. A linear function or nonlinear function is set such that the faster the flicking speed is, a greater number of frames the positional change distance Δx corresponds to.

That is to say, when the user quickly flicks with the finger, many frames are played, and when the user slowly flicks with the finger, few frames are played.

In a case of quickly flicking to the right direction, the value of the positional change distance Δx is positive and is a great value.

In a case of slowly flicking to the right direction, the value of the positional change distance Δx is positive and is a small value.

In a case of quickly flicking to the left direction, the value of the positional change distance Δx is negative and is value with a great absolute value.

In a case of slowly flicking to the left direction, the value of the positional change distance Δx is negative and is a value with a small absolute value.

In step F505, the UI control unit 41 obtains a frame number n by function computation of n=Fx (x1+Δx).

Up to the recording frame image data rFn with the frame number n are the frames to be played in accordance with the flicking operation this time.

Accordingly, in step F506 the UI control unit 41 controls the recording/playing processing unit 42 and display driver 44 to execute frame drawing.

That is to say, from a certain recording frame image data rFm currently being displayed, up to the recording frame image data rFn of the frame number n, is played.

In this case, if rFm<rFn, the recording/playing processing unit 42 performs processing to read each recording frame image data out from the recording medium in the order of recording frame image data rFm→rF(m+1)→rF(m+2) . . . rFN, and supplies this to the display driver 44. The display driver 44 sequentially displays the supplied recording frame image data rFm through rFN on the display unit 45.

Thus, display such as shown in (a) in FIG. 30 is executed.

Also, if rFm>rFn, the recording/playing processing unit 42 performs processing to read each recording frame image data out from the recording medium in the order of recording frame image data rFm→rF(m−1)→rF(m−2) . . . rFN, and supplies this to the display driver 44. The display driver 44 sequentially displays the supplied recording frame image data rFm through rFN on the display unit 45.

Thus, display such as shown in (c) in FIG. 30 is executed.

The UI control unit 41 thus ends processing according to one flicking operation.

Note that thereafter, the UI control unit 41 instructs the recording/playing processing unit 42 and display driver 44 to continue to output the frame image data rFn at the point of having ended playing according to the flicking operation.

By the flicking operation corresponding processing being performed in this way, images are unfolded and folded such as in (a) (c) in FIG. 30, in accordance with user flicking operations.

That is to say, the UI control unit 41 detects flicking operation speed and flicking operation direction detected by the touch panel 41. If we say that the frame position of the recording frame image data currently being played and output is the start frame position, the end frame position which is a frame position forward or backward from that start frame position is then determined. Each recording frame image data from the start frame position to the end frame position is then sequentially played.

Due to such flicking corresponding processing, composited image data at each state serving as a motion transition image is played, thereby enabling the compositing process of the image to be dynamically displayed, and also a plying image at a stage in the compositing process which the user desires to view can be provided with easy and intuitive operations for the user.

Note that an arrangement may be made where determination of step F502 in FIG. 31 is done away with, and even flicking operations outside of the region AN are not invalidated by the above playing processing is performed according to the flicking operation speed and direction. In this case, it can be conceived to take the flicking operation position x1 to be the position of the region AN at that point in time.

Alternatively, with the case of a flicking operation, processing can be conceived wherein an always-constant positional change distance Δx is used, regardless of the flicking speed.

For example, an example is to always advance playing by 10 frames per each flicking operation.

<3-3: Pointing Operation>

Further, a pointing operation will be described as an example of another operation.

A pointing operation is an operation in which the user touches a certain position on the touch panel 46 with a finger so as to specify it.

Figure 32:
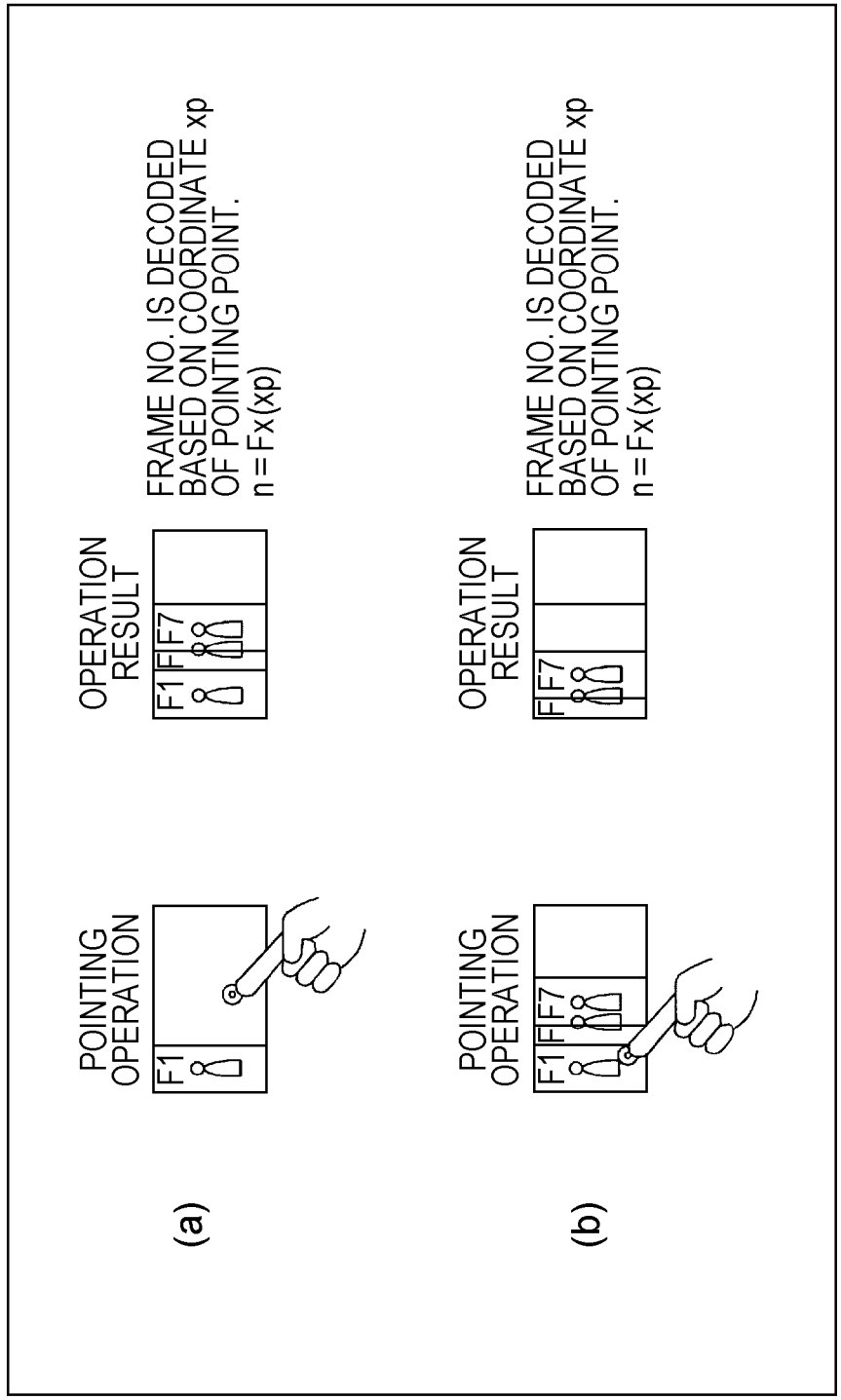
FIG. 32 is an explanatory diagram of a pointing operation according to an embodiment.

FIG. 32 shows a playing form according to a pointing operation.

Let us say that, as shown in (a) in FIG. 32, the user touches a certain position on the display. We will say that for example, the display content at the point in time is a position with nothing displayed. In this case, up to the frame corresponding to that pointing operation is played displayed as the result of the operation. On the screen this is visually recognized a visual representation of the images of the moving subject being unfolded.

Also, as shown in (b) in FIG. 32, in the event that the user performs a pointing operation at a position of certain frame image data on the display, up to the frame corresponding to the pointing operation is played displayed in reverse as the result of the operation. On the screen this is visually recognized a visual representation of the images of the moving subject being folded.

The UI control unit 41 thus executes playing of recording frame image data at a frame position forward or backward from the frame position of the recording frame image data currently being played and output, in accordance with the pointing operation detected by the touch panel 46.

Figure 33:
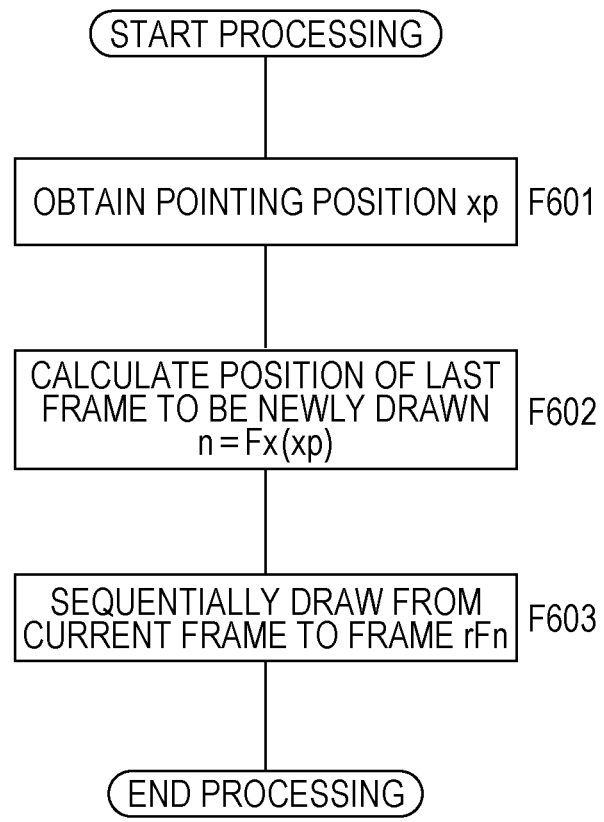
FIG. 33 is a flowchart of processing corresponding to pointing operations according to an embodiment.
Figure 34:
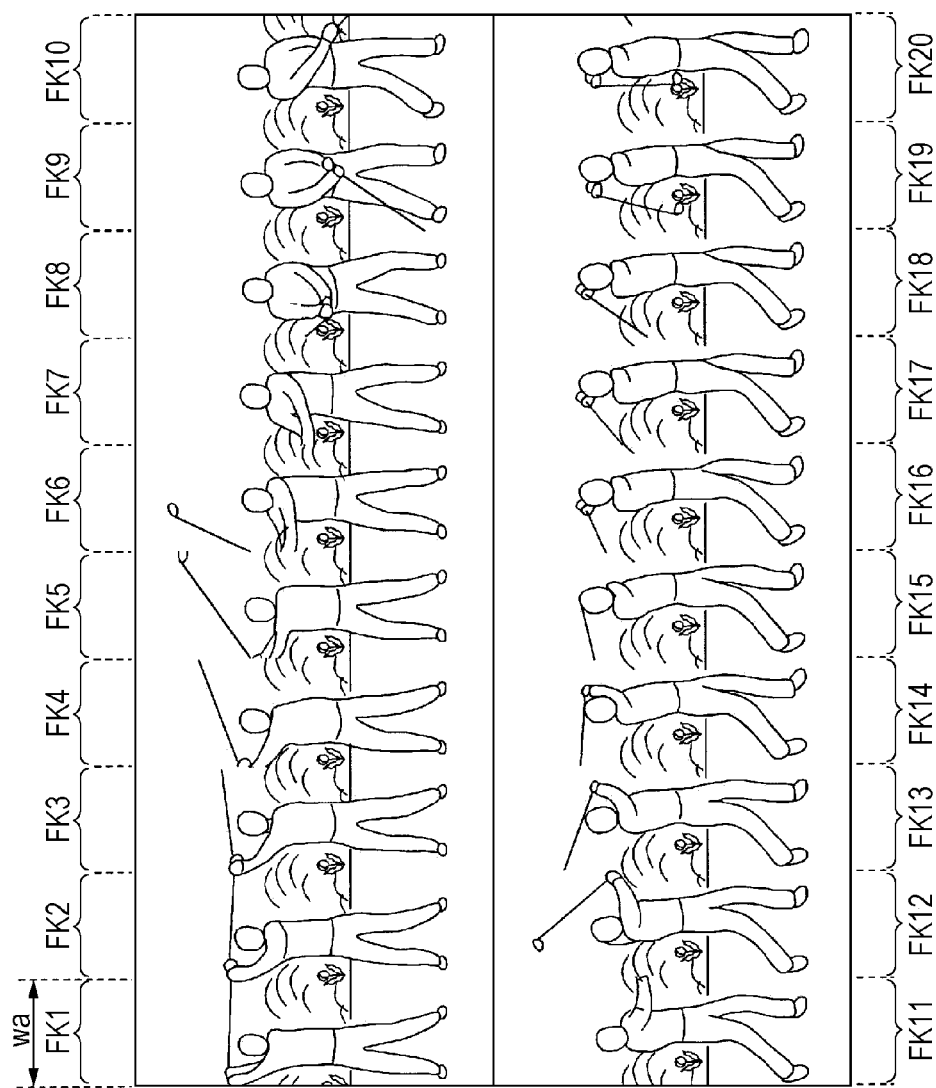
FIG. 34 is an explanatory diagram of a conventional composite image.
Figure 35:
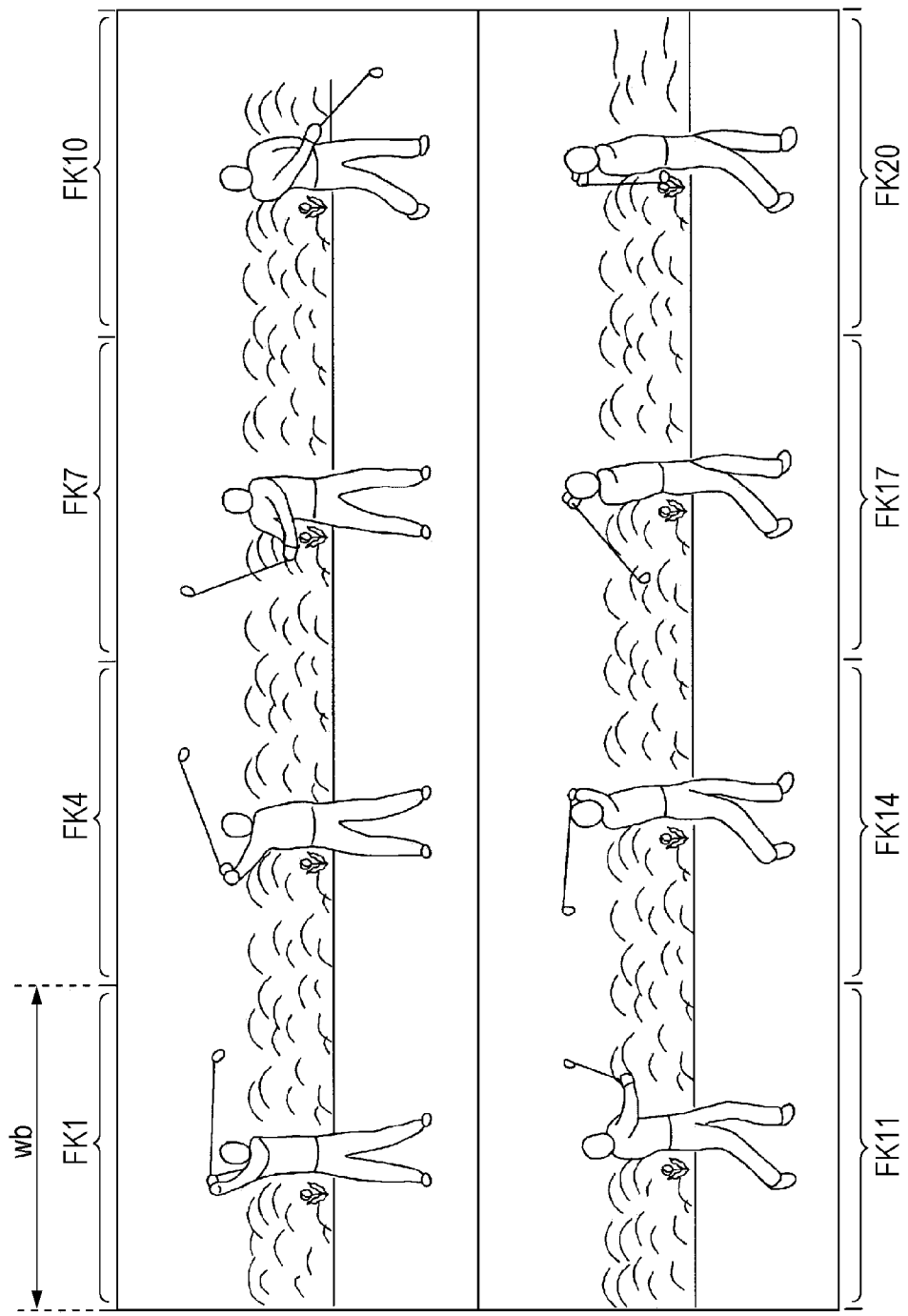
FIG. 35 is an explanatory diagram of a conventional composite image.

FIG. 33 illustrates an example of pointing operation corresponding processing by the UI control unit 41.

In the event that an operation by the touch panel 46 has been detected when playing a certain recording frame image data rFm, in step F601 the UI control unit 41 obtains x coordinate value xp as the pointing operation position. That is to say, the x coordinate value of the position where the user touches the touch panel 46 is detected.

In step F602, the UI control unit 41 performs $$n=Fx(xp)$$

as a function computation using this pointing operation position xp, and obtains the frame number corresponding to the pointing operation position xp.

Up to the recording frame image data rFn with the frame number n are the frames to be played in accordance with the pointing operation this time.

Accordingly, in step F603 the UI control unit 41 controls the recording/playing processing unit 42 and display driver 44 to execute frame drawing.

That is to say, from a certain recording frame image data rFm being currently displayed, up to the recording frame image data rFn of the frame number n, is played.

In this case, if rFm<rFn, the recording/playing processing unit 42 performs processing to read each recording frame image data out from the recording medium in the order of recording frame image data rFm→rF(m+1)→rF(m+2) . . . rFN, and supplies this to the display driver 44. The display driver 44 sequentially displays the supplied recording frame image data rFm through rFN on the display unit 45.

Thus, display such as shown in (a) in FIG. 32 is executed.

Also, if rFm>rFn, the recording/playing processing unit 42 performs processing to read each recording frame image data out from the recording medium in the order of recording frame image data rFm→rF(m−1)→rF(m−2) . . . rFN, and supplies this to the display driver 44. The display driver 44 sequentially displays the supplied recording frame image data rFm through rFN on the display unit 45.

Thus, display such as shown in (b) in FIG. 32 is executed.

The UI control unit 41 thus ends processing according to one pointing operation.

Note that thereafter, the UI control unit 41 instructs the recording/playing processing unit 42 and display driver 44 to continue to output the frame image data rFn at the point of having ended playing according to the pointing operation.

By the pointing operation corresponding processing being performed in this way, images are unfolded and folded such as in (a) (b) in FIG. 32, in accordance with user pointing operations.

That is to say, in accordance with the pointing operation position xp detected by the touch panel 41, if the frame position of the recording frame image data currently being played and output is the start frame position, the UI control unit 41 determines the end frame position which is a frame position forward or backward from that start frame position. Each recording frame image data from the start frame position to the end frame position is then sequentially played.

Due to such pointing corresponding processing, composited image data at each state serving as a motion transition image is played, thereby enabling the compositing process of the image to be dynamically displayed, and also a plying image at a stage in the compositing process which the user desires to view can be provided with easy and intuitive operations for the user.

Note that processing such as follows may also be conceived.

In the event that the pointing operation position xp is an x coordinate value behind the AN position of the currently newest frame image data, i.e., a region where there is no image display as in (a) in FIG. 32, forward playing is performed of a predetermined number of frames. On the other hand, in the event that the pointing operation position xp is an x coordinate value ahead of the AN position of the currently newest frame image data as shown in (b) in FIG. 32, i.e., a position corresponding to frame image data with a small number, reverse playing is performed of a predetermined number of frames. That is to say, this is a processing example where only forward/backward is specified, and the number of playing frames is fixed.

<3-4: Other Operations>

While examples of dragging operations, flicking operations, and pointing operations have been described above, various other operations can be conceived.

For example, as a drag & drop operation, the position where the finger is released is made to be the drop position. It can be conceived that at the drop position, moving image playing is performed of recording frame image data corresponding to the drag start position through the drop position.

Also, with the examples of the above-described dragging operations, flicking operations, and pointing operations, moving image playing is performed of multiple frames wherein a section specified by these operations, but frames in these sections may be thinned out so as to perform intermittent moving image playing.

Alternatively, instead of moving image playing, an arrangement can be conceived wherein recording frame image data corresponding to the dragging end position or pointing operation position is abruptly displayed as a still image.

Also, an arrangement can be conceived wherein two positions are specified by two pointing operations, with moving image playing being performed for each frame corresponding to between these positions.

Also, since the example has been that of the motion transition image arrayed in the horizontal direction, x coordinate values were used in the above processing examples, but with an image where the motion transition image is vertically arrayed, this can be replaced with y coordinate values as matter of course.

Also, which description has been made in the above examples of performing operations using the touch panel 46, but operations can be performed by operation input devices other than a touch panel.

For example, performing dragging operations, flicking operations, and pointing operations using a mouse can be assumed.

Also, operations using a remote controlled an be conceived. For example, by using a remote controller having a click button, an angular velocity sensor, an acceleration sensor or the like, dragging operations, flicking operations, and pointing operations can be easily performed by moving a pointer on a screen, for example. Also, operations can be performed with a laser pointer which casts light on a screen, by providing with a detecting unit which can detect coordinates of light input position on the screen.

[4. Configurations of Other Perspectives as Display Control Device]

In the above embodiments, the image recording/playing unit 40 and UI control unit 41 can be comprehended as being a display control device of the configurations of the following (A), (B), and (C).

(A) A display control device to control display contents of a display screen such that images, representing a same moving subject at different times from each other obtained by consecutively imaging the same moving subject, are simultaneously displayed on each of divided display regions of the display screen having a preset number of regions and having divided display regions situated in a predetermined order.

(B) The display contents are controlled such that images representing the same moving subject displayed in each of the divided display regions are situated in an order corresponding to the time sequence of the same moving subject.

(C) A display control unit is included which performs display control such that, at a time of a display content including images representing the same moving subject at a time different from the display content displayed on the display screen in accordance with user instruction or dynamic playing processing, each image of the same moving subject including the same moving subject at the different time is displayed in each of the divided display regions, in a state of maintaining the order in accordance with the time sequence of the same moving subject.

In this case, each of divided display regions of the display screen having a preset number of regions and having divided display regions situated in a predetermined order, are regions corresponding to the display regions for each frame image data such as shown in FIG. 24, for example.

Images, representing a same moving subject at different times from each other obtained by consecutively imaging the same moving subject, being simultaneously displayed on each of divided display regions, means a display in which a great number of moving subjects are arrayed, such as shown in FIG. 24 through FIG. 27, for example.

Then, the display contents are controlled such that images representing the same moving subject displayed in each of the divided display regions are situated in an order corresponding to the time sequence of the same moving subject. For example, as with each of FIG. 24 through FIG. 27, images of states at each point in time of the same moving subject serving as the same person or the like (e.g., each state in the process of a golf swing) are displayed arrayed on the display in time sequence order.

Further, at a time of a display content including images representing the same moving subject at a time different from the display content displayed on the display screen in accordance with user instruction or dynamic playing processing, means at a time of performing the above-described dragging operation, flicking operation, pointing operation, or the like. Also, dynamic playing processing means various cases where moving images and pseudo moving images are played unrestricted to user instructions.

At such a time, display control is performed such that such that each image of the same moving subject including the same moving subject at the different time, is displayed in each of the divided display regions, in a state of maintaining the order in accordance with the time sequence of the same moving subject. That is to say, when displaying the same moving subject at a different point in time from the state being displayed, display is performed at each of the divided display regions, in a state of maintaining the order in accordance with the time sequence of each moving subject image. This is a case such as changing the display content from FIG. 24 to FIG. 25, for example.

The above has been a description of the configurations of (A), (B), and (C) above by way of examples of the above-described embodiment, but in the case of such configurations, the object of display is not restricted to recording frame image data serving as composited image data.

That is to say, this can be applied to dividing images at each point in time in a same moving subject arrayed in time sequence, onto a screen, and arraying and displaying in time sequence order, regardless of the source of the image.

[5. Program]

While the above embodiment has been described as the image processing device 1, the display control device according to the present invention may be a dedicated device which performs playing display of motion transition images, and also may be applied to various types of devices which perform image display processing. For example, imaging apparatuses, home or business use image recording/playing devices, game devices, video editing devices, and so forth, can be conceived.

Further, realizing the display control device with a general-purpose personal computer or another information processing device can be conceived as a matter of course.

For example, suitable image display processing can be realized with a personal computer or the like, by providing a program which causes a computation processing device to execute processing corresponding to the various operations such as in FIG. 29, FIG. 31, and FIG. 33, for example, as image display processing application software.

That is to say, a program which realizes the display processing of the image processing device 1 is a program which causes a computation processing device to execute the following steps.

That is to say, a recording medium, in which is recorded as a series of recording frame image data, each of composited image data generated by sequentially performing image compositing processing for each input of frame image data, each of the composited image data being enabled of moving image display in which a moving subject image in each frame image data is sequentially placed so as to be arrayed in a predetermined direction.

Caused then to be executed are a step of detecting, during reading out and playing display of certain recording frame image data, a user instruction as to the playing display, and a step of determining a frame position to be played out of the series of recording frame image data, in accordance with a user instruction, causing the playing processing unit to execute playing of the recording frame image data at the determined frame position, and performing display control of the played recording frame image data.

Also, a program which realizes the display processing of the UI control unit 41 for example is a program which causes a computation processing device to execute the following steps.

That is to say, the program controls the display contents such that images, representing a same moving subject at different times from each other obtained by consecutively imaging the same moving subject, are simultaneously displayed on each of divided display regions of a display screen having a preset number of regions and having divided display regions situated in a predetermined order. Also, the display contents are controlled such that images representing the same moving subject displayed in each of the divided display regions are situated in an order corresponding to the time sequence of the same moving subject. Also, display control is executed such that, at a time of a display content including images representing the same moving subject at a time different from the display content displayed on the display screen in accordance with user instruction or dynamic playing processing, each image of the same moving subject including the same moving subject at the different time is displayed in each of the divided display regions, in a state of maintaining the order in accordance with the time sequence of the same moving subject.

Due to programs such as these, the present invention can be easily realized in personal computers, cellular phones, PDAs (Personal Digital Assistant), and other various information processing devices use image data.

Note that these programs can be recorded beforehand in an HDD serving as a recording medium built into a device such as a personal computer, ROM or flash memory in a microcomputer having a CPU, or the like.

Alternatively, these may be temporarily or permanently stored (recorded) in a removable storage medium such as a flexible disk, CD-ROM (Compact Disc Read Only Memory), MO (Magnet optical) disk, DVD, Blu-ray disc, magnetic disk, semiconductor memory, memory card, or the like. Such a removable recording medium can be provided as so-called packaged software.

Also, the program can be installed from the removable recording medium to the personal computer or the like, or can be downloaded from a download site via a network such as a LAN (Local Area Network), the Internet, or the like.

REFERENCE SIGNS LIST

1 image processing device
2 input image selecting unit
3 layer processing unit
4 image output unit
5 composited image updating/holding unit
10 image input unit
11 moving subject information generating unit
12 moving subject information input unit
21 key frame determining unit
22 coordinate calculating unit
31 layer separating unit
32 layer reworking unit
33 layer compositing unit
40 image recording/playing unit
41 UI control unit
42 recording/playing processing unit
43 recording medium driving unit
44 display driver
45 display unit
46 touch panel

The invention claimed is:

1. A display control device, comprising:
at least one memory storing instructions; and
at least one processor configured to execute the instructions to:
cause a display unit to display a plurality of recording frame image data in chronological order based on a user instruction on the display unit from a first position to a second position if the first position is within a most recently input frame image data of currently displayed recording frame image data, and
invalidate a user instruction on the display unit if the first position is outside the most recently input frame image data of currently displayed recording frame image data,
wherein
the second position is a position ahead of or behind the first position in a predetermined direction.

2. The display control device according to claim 1, wherein the at least one processor is further configured to execute the instructions to, in accordance with a dragging operation detected as said user instruction, execute playing of the plurality of recording frame image data from a frame position of the recording frame image data of which playing output is currently being performed, to recording frame image data at a frame position ahead or behind the frame position of the recording frame image data of which playing output is currently being performed, and perform display control of the played recording frame image data.

3. The display control device according to claim 2, wherein the at least one processor is further configured to execute the instructions to determine an end frame position which is a frame position ahead of or behind a start frame position, said frame start position being a frame position of the recording frame image data of which playing output is currently being performed, in accordance with a dragging operation amount per time increment and dragging operation direction detected as said user instruction, execute playing of the recording frame image data from said start frame position to said end frame position sequentially, and perform display control of the played recording frame image data.

4. The display control device according to claim 1, wherein the at least one processor is configured to execute the instructions to:
receive the uninvalidated user instruction on the display unit via a touch panel.

5. The display control device according to claim 1, further comprising the display unit.

6. The display control device according to claim 1, wherein the at least one processor is further configured to execute the instructions to, in accordance with a flicking operation detected as the uninvalidated user instruction, execute playing of the plurality of recording frame image data from a frame position of the recording frame image data of which playing output is currently being performed, to recording frame image data at a frame position ahead or behind the frame position of the recording frame image data of which playing output is currently being performed, and perform display control of the played recording frame image data.

7. The display control device according to claim 6, wherein the at least one processor is further configured to execute the instructions to determine an end frame position which is a frame position ahead of or behind a start frame position, said frame start position being a frame position of the recording frame image data of which playing output is currently being performed, in accordance with a flicking operation speed and flicking operation direction detected as said uninvalidated user instruction, execute playing of the recording frame image data from said start frame position to said end frame position sequentially, and perform display control of the played recording frame image data.

8. A display control method, comprising:
receiving a user instruction on a display;
causing the display to display a plurality of recording frame image data in chronological order if the user instruction is made on a first position and a second position if the first position is within a most recently input frame image data of currently displayed recording frame image data; and invalidating a user instruction on the display if the first position is outside the most recently input frame image data of currently displayed recording frame image data, wherein the second position is a position ahead of or behind the first position in a predetermined direction.

9. A non-transitory computer-readable medium having instructions that, when executed by at least one computer, cause the at least one computer to execute a method comprising:

receiving a user instruction on a display;

causing the display to display a plurality of recording frame image data in chronological order if the user instruction is made on a first position if the first position is within a most recently input frame image data of currently displayed recording frame image data, and a second position; and invalidating a user instruction on the display if the first position is outside the most recently input frame image data of currently displayed recording frame image data, wherein the second position is a position ahead of or behind the first position in a predetermined direction.

10. A display control device, comprising:

at least one memory storing instructions; and at least one processor configured to execute the instructions to:

cause a display unit to display a plurality of recording frame image data in chronological order based on a user instruction on the display unit on a first position if the first position is within a most recently input frame image data of currently displayed recording frame image data; and invalidate a user instruction on the display unit if the first position is outside the most recently input frame image data of currently displayed recording frame image data, wherein the uninvalidated user instruction is made in a direction ahead of or behind the first position.

11. The display control device according to claim 10, further comprising the display unit.

12. A display control method, comprising:

receiving a user instruction on a display;

causing the display to display a plurality of recording frame image data in chronological order if the user instruction is made on a first position if the first position is within a most recently input frame image data of currently displayed recording frame image data; and invalidating a user instruction if the first position is outside the most recently input frame image data of currently displayed recording frame image data, wherein the uninvalidated user instruction is made in a direction ahead of or behind the first position.

13. A non-transitory computer-readable medium having instructions that, when executed by at least one computer, cause the at least one computer to execute a method comprising:

receiving a user instruction on a display; and causing the display to display a plurality of recording frame image data in chronological order if the user instruction is made on a first position if the first position is within a most recently input frame image data of currently displayed recording frame image data; and invalidating a user instruction on the display if the first position is outside the most recently input frame image data of currently displayed recording frame image data, wherein the uninvalidated user instruction is made in a direction ahead of or behind the first position.

\* \* \* \* \*